US012195576B2

(12) United States Patent
Allen et al.

(10) Patent No.: US 12,195,576 B2
(45) Date of Patent: Jan. 14, 2025

(54) POLYOL COMPOSITIONS AND METHODS

(71) Applicant: Saudi Aramco Technologies Company, Dhahran (SA)

(72) Inventors: Scott D. Allen, Fairport, NY (US); Rajeev Kumar, Penfield, NY (US)

(73) Assignee: Saudi Aramco Technologies Company, Dhahran (SA)

( * ) Notice: Subject to any disclaimer, the term of this patent is extended or adjusted under 35 U.S.C. 154(b) by 49 days.

(21) Appl. No.: 17/808,210

(22) Filed: Jun. 22, 2022

(65) Prior Publication Data

US 2023/0026948 A1 Jan. 26, 2023

Related U.S. Application Data

(60) Provisional application No. 63/214,198, filed on Jun. 23, 2021.

(51) Int. Cl.

| | |
|---|---|
| ***C08G 18/44*** | (2006.01) |
| ***C08G 18/12*** | (2006.01) |
| ***C09D 175/08*** | (2006.01) |
| ***C09J 175/08*** | (2006.01) |

(52) U.S. Cl.
CPC ............. *C08G 18/44* (2013.01); *C08G 18/12* (2013.01); *C09D 175/08* (2013.01); *C09J 175/08* (2013.01)

(58) Field of Classification Search
CPC ...................................................... C08G 18/44
See application file for complete search history.

(56) References Cited

U.S. PATENT DOCUMENTS

| | | | | |
|---|---|---|---|---|
| 2,846,408 A | | 8/1958 | Brochhagen et al. | |
| 3,248,415 A | | 4/1966 | Stevens et al. | |
| 3,334,128 A | | 8/1967 | Brown | |
| 3,585,168 A | | 6/1971 | Inoue et al. | |
| 3,900,424 A | | 8/1975 | Inoue et al. | |
| 3,953,383 A | | 4/1976 | Inoue et al. | |
| 4,500,704 A | | 2/1985 | Kruper, Jr. et al. | |
| 4,686,276 A | | 8/1987 | Myers | |
| 4,826,953 A | | 5/1989 | Kuyper et al. | |
| 4,910,256 A | | 3/1990 | Prier | |
| 5,545,706 A | | 8/1996 | Barksby et al. | |
| 5,637,739 A | | 6/1997 | Jacobsen et al. | |
| 5,648,151 A | * | 7/1997 | Mizoguchi ......... | C08G 18/6607 428/317.9 |

(Continued)

FOREIGN PATENT DOCUMENTS

| | | |
|---|---|---|
| CA | 1312398 C | 1/1993 |
| CN | 101020747 A | 8/2007 |

(Continued)

OTHER PUBLICATIONS

KR-20160057617-A_05-2016_English.*

(Continued)

*Primary Examiner* — Michael L Leonard
(74) *Attorney, Agent, or Firm* — Osha Bergman Watanabe & Burton LLP

(57) ABSTRACT

In one aspect, the present invention encompasses blends of structurally different polycarbonate polyols, resulting polyurethanes derived from such blends of polyols, methods of making such polyurethane compositions, and coatings and adhesives derived from such polyurethane compositions.

20 Claims, 4 Drawing Sheets

(56) References Cited

U.S. PATENT DOCUMENTS

| | | | |
|---|---|---|---|
| 5,663,393 | A | 9/1997 | Jacobsen et al. |
| 5,665,890 | A | 9/1997 | Jacobsen et al. |
| 5,880,293 | A | 3/1999 | Godvigovna et al. |
| 5,929,232 | A | 7/1999 | Jacobsen et al. |
| 6,130,340 | A | 10/2000 | Jacobsen et al. |
| 6,133,402 | A | 10/2000 | Coates et al. |
| 6,262,127 | B1 | 7/2001 | Acemoglu et al. |
| 6,309,997 | B1 | 10/2001 | Fujita et al. |
| 6,515,145 | B2 | 2/2003 | Machac, Jr. et al. |
| 6,617,467 | B1 | 9/2003 | Muller et al. |
| 6,639,087 | B2 | 10/2003 | Larrow et al. |
| 6,642,303 | B2 | 11/2003 | Schutze et al. |
| 6,677,268 | B2 | 1/2004 | Hillebrand et al. |
| 6,713,599 | B1 | 3/2004 | Hinz et al. |
| 6,781,006 | B2 | 8/2004 | Larrow et al. |
| 6,844,448 | B2 | 1/2005 | Jacobsen et al. |
| 6,852,865 | B2 | 2/2005 | Coates et al. |
| 6,870,004 | B1 | 3/2005 | Nguyen et al. |
| 6,875,718 | B2 | 4/2005 | Fujita et al. |
| 6,884,750 | B2 | 4/2005 | Kim et al. |
| 6,903,043 | B2 | 6/2005 | Kim et al. |
| 7,145,022 | B2 | 12/2006 | Luinstra et al. |
| 7,148,174 | B2 | 12/2006 | Schulte et al. |
| 7,244,805 | B2 | 7/2007 | Park et al. |
| 7,268,204 | B2 | 9/2007 | Hinz et al. |
| 7,300,903 | B2 | 11/2007 | Fujita et al. |
| 7,304,172 | B2 | 12/2007 | Coates et al. |
| 7,399,822 | B2 | 7/2008 | Coates et al. |
| 7,674,873 | B2 | 3/2010 | Coates et al. |
| 7,723,256 | B2 | 5/2010 | Coates et al. |
| 7,858,729 | B2 | 12/2010 | Allen |
| 7,977,501 | B2 | 7/2011 | Haider et al. |
| 8,163,867 | B2 | 4/2012 | Lee et al. |
| 8,207,365 | B2 | 6/2012 | Zheng et al. |
| 8,232,267 | B2 | 7/2012 | Groves |
| 8,247,520 | B2 | 8/2012 | Allen et al. |
| 8,252,955 | B2 | 8/2012 | Gao et al. |
| 8,461,290 | B2 | 6/2013 | Carpentier et al. |
| 8,470,956 | B2 | 6/2013 | Allen et al. |
| 8,507,733 | B2 | 8/2013 | Ok et al. |
| 8,580,911 | B2 | 11/2013 | Allen et al. |
| 8,598,309 | B2 | 12/2013 | Jeong et al. |
| 8,604,155 | B2 | 12/2013 | Allen et al. |
| 8,633,123 | B2 | 1/2014 | Allen et al. |
| 8,642,721 | B2 | 2/2014 | Ok et al. |
| 8,785,591 | B2 | 7/2014 | Allen et al. |
| 8,791,274 | B2 | 7/2014 | Ok et al. |
| 8,921,508 | B2 | 12/2014 | Allen et al. |
| 8,952,104 | B2 | 2/2015 | Allen |
| 9,029,498 | B2 | 5/2015 | Allen et al. |
| 9,102,800 | B2 | 8/2015 | Allen et al. |
| 9,284,406 | B2 | 3/2016 | Farmer |
| 9,327,280 | B2 | 5/2016 | Lee et al. |
| 9,359,473 | B2 | 6/2016 | Nagao et al. |
| 9,376,531 | B2 | 6/2016 | Allen et al. |
| 9,388,277 | B2 | 7/2016 | Farmer |
| 9,399,701 | B2 | 7/2016 | Allen et al. |
| 9,422,397 | B2 | 8/2016 | Allen et al. |
| 9,453,100 | B2 | 9/2016 | Allen et al. |
| 9,512,259 | B2 | 12/2016 | Allen et al. |
| 9,669,610 | B2 | 6/2017 | Meyer et al. |
| 9,718,917 | B2 | 8/2017 | Wamprecht et al. |
| 9,809,678 | B2 | 11/2017 | Allen et al. |
| 9,834,710 | B2 | 12/2017 | Allen et al. |
| 9,850,345 | B2 | 12/2017 | Farmer |
| 9,884,937 | B2 | 2/2018 | Allen et al. |
| 9,994,760 | B2 | 6/2018 | Allen et al. |
| 10,047,188 | B2 | 8/2018 | Allen et al. |
| 10,138,369 | B2 | 11/2018 | Allen et al. |
| 10,214,614 | B2 | 2/2019 | Coates et al. |
| 10,301,426 | B2 | 5/2019 | Allen et al. |
| 10,351,654 | B2 | 7/2019 | Allen et al. |
| 10,392,556 | B2 | 8/2019 | Allen et al. |
| 10,428,173 | B2 | 10/2019 | Allen et al. |
| 10,836,859 | B2 | 11/2020 | Allen et al. |
| 10,982,036 | B2 | 4/2021 | Allen et al. |
| 11,021,564 | B2 | 6/2021 | Allen et al. |
| 11,059,969 | B2 | 7/2021 | Allen et al. |
| 2006/0089252 | A1 | 4/2006 | Coates et al. |
| 2006/0293501 | A1 | 12/2006 | Coates et al. |
| 2008/0021154 | A1 | 1/2008 | Haider et al. |
| 2008/0051554 | A1 | 2/2008 | Coates et al. |
| 2009/0306239 | A1* | 12/2009 | Mijolovic ............. C08G 18/44 521/172 |
| 2010/0048935 | A1 | 2/2010 | Mijolovic et al. |
| 2010/0121026 | A1 | 5/2010 | Lee et al. |
| 2010/0204437 | A1 | 8/2010 | Coates et al. |
| 2010/0256329 | A1 | 10/2010 | Nozaki et al. |
| 2010/0323201 | A1 | 12/2010 | Son et al. |
| 2011/0087001 | A1 | 4/2011 | Coates et al. |
| 2011/0152497 | A1 | 6/2011 | Allen et al. |
| 2011/0207909 | A1 | 8/2011 | Jeong et al. |
| 2011/0218127 | A1 | 9/2011 | Allen et al. |
| 2011/0230580 | A1 | 9/2011 | Allen et al. |
| 2011/0245424 | A1 | 10/2011 | Jeong et al. |
| 2011/0251355 | A1 | 10/2011 | Jeong et al. |
| 2012/0156410 | A1 | 6/2012 | Allen |
| 2013/0066044 | A1 | 3/2013 | Allen et al. |
| 2013/0244864 | A1 | 9/2013 | Allen et al. |
| 2013/0337204 | A1 | 12/2013 | Michel et al. |
| 2014/0046008 | A1 | 2/2014 | Allen et al. |
| 2014/0066591 | A1 | 3/2014 | Coates et al. |
| 2014/0072806 | A1 | 3/2014 | Allen et al. |
| 2014/0249279 | A1 | 9/2014 | Williams et al. |
| 2015/0083326 | A1 | 3/2015 | Allen et al. |
| 2015/0299386 | A1 | 10/2015 | Allen et al. |
| 2015/0353680 | A1 | 12/2015 | Coates et al. |
| 2016/0115288 | A1 | 4/2016 | Waddington |
| 2016/0264711 | A1 | 9/2016 | Krebs et al. |
| 2016/0264728 | A1 | 9/2016 | Allen et al. |
| 2016/0319064 | A1 | 11/2016 | Allen et al. |
| 2017/0051106 | A1 | 2/2017 | Farmer |
| 2017/0145147 | A1 | 5/2017 | Allen et al. |
| 2017/0198203 | A1 | 7/2017 | Allen et al. |
| 2018/0022869 | A1 | 1/2018 | Allen et al. |
| 2018/0305605 | A1 | 10/2018 | Allen et al. |
| 2018/0334525 | A1 | 11/2018 | Allen et al. |
| 2018/0340038 | A1 | 11/2018 | Allen et al. |
| 2019/0100648 | A1 | 4/2019 | Allen et al. |
| 2019/0202982 | A1 | 7/2019 | Coates et al. |
| 2019/0226123 | A1 | 7/2019 | Wamprecht et al. |
| 2019/0233586 | A1 | 8/2019 | Allen et al. |
| 2019/0322802 | A1 | 10/2019 | Eagan et al. |
| 2020/0048399 | A1 | 2/2020 | Allen et al. |
| 2020/0062900 | A1 | 2/2020 | Farmer |
| 2020/0087436 | A1 | 3/2020 | Allen et al. |
| 2020/0095375 | A1 | 3/2020 | Allen et al. |
| 2020/0095494 | A1 | 3/2020 | Allen et al. |
| 2020/0325296 | A1 | 10/2020 | Waddington |
| 2021/0171708 | A1 | 6/2021 | Allen et al. |
| 2022/0002469 | A1 | 1/2022 | Shen et al. |

FOREIGN PATENT DOCUMENTS

| | | | |
|---|---|---|---|
| CN | 101412809 | A | 4/2009 |
| CN | 102066459 | A | 5/2011 |
| CN | 104987488 | A | 10/2015 |
| CN | 107722908 | A | 2/2018 |
| CN | 107987249 | A | 5/2018 |
| CN | 108018017 | A | 5/2018 |
| CN | 108330712 | A | 7/2018 |
| CN | 110964166 | A | 4/2020 |
| EP | 0222453 | A2 | 5/1987 |
| EP | 0403313 | A2 | 12/1990 |
| EP | 2112187 | A1 | 10/2009 |
| EP | 2146977 | B1 | 11/2012 |
| EP | 2258745 | B1 | 7/2014 |
| EP | 2257559 | B1 | 10/2014 |
| EP | 2917257 | B1 | 9/2019 |
| EP | 3553133 | A1 | 10/2019 |
| EP | 4026863 | A1 | 7/2022 |
| JP | H02-258828 | A | 10/1990 |
| JP | 2575199 | B2 | 1/1997 |
| JP | 2691014 | B2 | 12/1997 |

(56) References Cited

FOREIGN PATENT DOCUMENTS

| | | | | |
|---|---|---|---|---|
| JP | 2005-511753 A | 4/2005 | | |
| JP | 2006002063 A | 1/2006 | | |
| JP | 2008-081518 | 4/2008 | | |
| JP | 2008-280399 A | 11/2008 | | |
| JP | 2008-546785 A | 12/2008 | | |
| JP | 2009-215529 A | 9/2009 | | |
| JP | 2010-202711 A | 9/2010 | | |
| KR | 2005-0113651 A | 12/2005 | | |
| KR | 10-2008-0016198 A | 2/2008 | | |
| KR | 10-0853358 B1 | 8/2008 | | |
| KR | 20160057617 A * | 5/2016 | ............ | C08G 18/44 |
| WO | WO-91/14694 A1 | 10/1991 | | |
| WO | WO-98/04538 A1 | 2/1998 | | |
| WO | WO-99/00444 A1 | 1/1999 | | |
| WO | WO-03/050154 A2 | 6/2003 | | |
| WO | WO-2004/087788 A1 | 10/2004 | | |
| WO | WO-2008/136591 A1 | 11/2008 | | |
| WO | WO-2008/150033 A1 | 12/2008 | | |
| WO | WO-2009/130182 A1 | 10/2009 | | |
| WO | WO-2009/137540 A1 | 11/2009 | | |
| WO | WO-2009/148889 A2 | 12/2009 | | |
| WO | WO-2010/013948 A2 | 2/2010 | | |
| WO | WO-2010/022388 A2 | 2/2010 | | |
| WO | WO-2010/028362 A1 | 3/2010 | | |
| WO | WO-2010/060038 A1 | 5/2010 | | |
| WO | WO-2010/062703 A1 | 6/2010 | | |
| WO | WO-2010/134425 A1 | 11/2010 | | |
| WO | WO-2010/147237 A1 | 12/2010 | | |
| WO | WO-2010/147421 A2 | 12/2010 | | |
| WO | WO-2011/004730 A1 | 1/2011 | | |
| WO | WO-2011/005664 A2 | 1/2011 | | |
| WO | WO-2011/163133 A1 | 12/2011 | | |
| WO | WO-2012/037282 A2 | 3/2012 | | |
| WO | WO-2012/071505 A1 | 5/2012 | | |
| WO | WO-2012/094619 A1 | 7/2012 | | |
| WO | WO-2012/154849 A1 | 11/2012 | | |
| WO | WO-2013/012895 A1 | 1/2013 | | |
| WO | WO-2013/016331 A2 | 1/2013 | | |
| WO | WO-2013/022932 A1 | 2/2013 | | |
| WO | WO-2013/096602 A1 | 6/2013 | | |
| WO | WO-2013/122812 A1 | 8/2013 | | |
| WO | WO-2013/138161 A1 | 9/2013 | | |
| WO | WO-2013/158621 A1 | 10/2013 | | |
| WO | WO-2013/163442 A1 | 10/2013 | | |
| WO | WO-2013/177546 A2 | 11/2013 | | |
| WO | WO-2014/031811 A1 | 2/2014 | | |
| WO | WO-2014/074706 A1 | 5/2014 | | |
| WO | WO-2014/186397 A1 | 11/2014 | | |
| WO | WO-2015/154001 A1 | 10/2015 | | |
| WO | WO-2016/012785 A1 | 1/2016 | | |
| WO | WO-2019/204553 A1 | 10/2019 | | |
| WO | WO-2020/028606 A1 | 2/2020 | | |
| WO | WO-2020/068796 A9 | 7/2020 | | |
| WO | WO-2021/045196 A1 | 3/2021 | | |
| WO | WO-2021/262845 A1 | 12/2021 | | |
| WO | WO-2022/269512 A1 | 12/2022 | | |

OTHER PUBLICATIONS

Ahn Tae-wan, Munundang, Polymer Chemistry, First Edition, 5.4: 175-176 (issued Jun. 30, 2010). No English Translation Available.

Ang, R.R. et al., A review of copolymerization of green house gas carbon dioxide and oxiranes to produce polycarbonate, Journal of Cleaner Production, 102:1-17 (2015).

Bates, S.H. and Miley, J.W., Polyol-Bound Colorants Solve Polyurethane Color Problems, Proceedings of the SPI-30th Annual Technical/Marketing Conference, (1986).

Chen, L., Activation and copolymerization of CO2 by macromolecule-metal complexes, Die Makromolekulare Chemie, Macromolecular Symposia, 59: 75-82 (1992).

Cheng, M et al., Catalytic Reactions Involving C1 Feedstocks: New High-Activity Zn(II)-Based Catalysts for the Alternating Copolymerization of Carbon Dioxide and Epoxides, J. Am. Chem. Soc., 120: 11018-11019 (1998).

Cheng, M et al., Catalytic Reactions Involving C1 Feedstocks: New High-Activity Zn(II)-Based Catalysts for the Alternating Copolymerization of Carbon Dioxide and Epoxides, J. Am. Chem. Soc., 120: 11018-11019 (1998). Supporting Information, 10 pages.

Cheng, M. et al., Single-Site a-Diiminate Zinc Catalysts for the Alternating Copolymerization of CO2 and Epoxides: Catalyst Synthesis and Unprecedented Polymerization Activity, J. Am. Chem. Soc., 123: 8738-8749 (2001).

Coates et al., Cobalt-Based Complexes for the Copolymerization of Propylene Oxide and CO2 : Active and Selective Catalysts for Polycarbonate Synthesis, Angew. Chem. Int. Ed., 42: 5484-5487 (2003).

Coates et al., Electronic and Steric Effects on Catalysts for CO2/ Epoxide Polymerization: Subtle Modifications Resulting in Superior Activities, Angew. Chem. Int. Ed., 41: 2599-2602 (2002).

Coates, G.W. and Moore, D.R., Discrete Metal-Based Catalysts for the Copolymerization of CO2 and Epoxides: Discovery, Reactivity, Optimization, and Mechanism, Angewandte Chemie International Edition, 43: 6618-6639 (2004).

Cohen et al. Alternating Copolymerization of Propylene Oxide and Carbon Dioxide with Highly Efficient and Selective (Salen)Co(III) Catalysts: Effect of Ligand and Cocatalyst Variation, J. Polymer Sci.: Part A, 44: 5182-5191 (2006).

Cohen, C.T. et al., Cobalt Catalysts for the Alternating Copolymerization of Propylene Oxide and Carbon Dioxide: Combining High Activity and Selectivity, J. Am. Chem. Soc., 127: 10869-10878 (2005).

Cyriac, A., et al., Preparation of flame-retarding poly(propylene carbonate), Green Chem., 13(12):3469-3475 (2011).

Darensbourg, D.J. et al., Mechanistic aspects of the copolymerization reaction of carbon dioxide and epoxides, using a chiral salen chromium chloride catalyst, Journal of the American Chemical Society, 124: 6335-6342 (2002).

Darensbourg, D.J., Making plastics from carbon dioxide: salen metal complexes as catalysts for the production of polycarbonates from epoxides and CO2, Chemical Reviews, 107(6):2388-410 (2007).

Gao et al., Copolimerization of Carbon Dioxide and Propylene Oxide with Zinc Glutarate as Catalyst in the Presence of Compounds Containing Active Hydrogen, Journal of Applied Polymer Science, 104, 15-20 (2006).

Gorecki, P. and Kuran, W., Diethylzinc-trihydric phenol catalysts for copolymerization of carbon dioxide and propylene oxide: Activity in Copolymerization and Copolymer destruction processes, Journal of Polymer Science, Part C, 23: 299-304 (1985).

Inoue, S., Immortal Polymerization: The Outset, Development, and Application, Journal of Polymer Science: Part A: Polymer Chemistry, 38: 2861-2871 (2000).

International Search Report for PCT/IB2022/055793, filed Jun. 22, 2022, 5 pages, (mailed Sep. 8, 2022).

International Search Report for PCT/US2009/056220, 3 pages (mailed Nov. 20, 2009).

International Search Report for PCT/US2021/038675, 5 pages (mailed Oct. 26, 2021).

Ionescu, M., Chemistry and Technology of Polyols for Polyurethanes, Rapra Technology Limited, 605 pages (2005).

Jacobsen et al., Electronic Tuning of Asymmetric Catalysts, J. Am. Chem. Soc., 113: 6703-6704 (1991).

Jacobsen et al., Enantioselective Epoxidation of Unfunctionalized Olefins Catalyzed by (Salen) manganese Complexes, J. Am. Chem. Soc., 112, 2801-2803 (1990).

Jacobsen et al., Highly Enantioselective Epoxidation Catalysts Derived from 1,2 Diaminocyclohexane, J. Am. Chem. Soc., 113:7063-7064 (1991).

Jofre-Reche, J. A. et al., Improvement in Adhesion, Abrasion Resistance, and Aging of Polyurethane Coatings Prepared with Polycarbonate Diol for Internal Pipelines, J. Mater. Civ. Eng., 29(10):06017009 (2017).

Kim Sung-Chul et al., Polymer Engineering I, Heejungdang, 18-20 (1994). Best Available. No English Translation Available.

Kuran, W. et al., Alternating copolymerization of carbon dioxide and propylene oxide in the presence of organometallic catalysts, Die Makromolekulare Chemie, 177:11-20 (1976).

(56) References Cited

OTHER PUBLICATIONS

Lee et al., A Highly Active and Recyclable Catalytic System for CO2/Propylene Oxide Copolymerizations, Angew. Chem., 120: 7416-7419 (2008).
Lee et al., Connection of polymer chains using diepoxide in CO2/propylene oxide copolymerizations, Polym. Chem., 2:950-956 (2011).
Lee, Preparation of flame-retarding poly(propylene carbonate), Green Chem., 13: 3469-3475 (2011).
Liu, S. and Wang, X., Polymers from carbon dioxide: Polycarbonates, polyurethanes, Current Opinion in Green and Sustainable Chemistry, 3:61-66 (2017).
Lu et al., Asymmetric Catalysis with CO2: Direct Syntheis of Optically Active Propylene Carbonate from Racemic Epoxides, J. Am. Chem. Soc., 126: 3732-3733 (2004).
Lu et al., Cobalt catalysts for the coupling of CO2 and epoxides to provide polycarbonates and cyclic arbonates, Chem. Soc. Rev., 41: 1462-1484 (2012).
Lu et al., Design of Highly Active Binary Catalyst Systems for CO/Epoxide Copolymerization: Polymer Selectivity, Enantioselectivity, and Stereochemistry Control, J. Am. Chem. Soc., 128: 1664-1674 (2006).
Lu et al., Highly Active, Binary Catalyst Systems for the Alternating Copolymerization of CO2 and Epoxides under Mild Conditions, Angew. Chem. Int. Ed., 43: 3574-3577 (2004).
Lu et al., Mechanistic Aspects of the Copolymerization of CO2 with Epoxides Using a Thermally Stable Single-Site Cobalt(III) Catalyst, J. Am. Chem. Soc., 131: 11509-11518 (2009).
Marbach, J. Zinc glutarate-mediated copolymerization of CO2 and PO—parameter studies using design of experiments, Catal. Sci. Technol., 7: 2897-2905 (2017).
Miley, J.W. and Moore, P.D., Reactive Polymeric Colorants for Polyurethanes, Proceedings of the SPI-26th Annual Technical Conference, (1981).
Moore, P.D. et al., New Uses For Highly Miscible Liquid Polymeric Colorants in the Manufacture of Colored Urethane Systems, Proceedings of the SPI-27th Annual Technical/Marketing Conference, (1982).
Nakajima et al., Asymmetric Oxidation of Sulfides to Sulfoxides by Organic Hydroperoxides with Optically Active Schiff Base-Oxovanadium (IV) Catalysts, Chemistry Letters, 1483-1486 (1986).
Nakano, K. et al., Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).
Nakano, K. et al., Supporting Information, 12 pages (2006). Selective Formation of Polycarbonate over Cyclic Carbonate: Copolymerization of Epoxides with Carbon Dioxide Catalyzed by a Cobalt (III) Complex with a Piperidinium End-Capping Arm, Angew. Chem. Int. Ed., 45: 7274-7277 (2006).
Noordover, B.A.J., Biobased step-growth polymers: chemistry, functionality and applicability, Eindhoven University of Technology, 219 pages (Published Jan. 1, 2008). [Download date Apr. 20, 2018].
Odian, G., Principles of Polymerization, Second Edition, Korean Student Edition, Yeonhap Publishing Company, 1-12 (issued Jul. 20, 1986).
Qin, Y. et al., Recent advances in carbon dioxide based copolymers, Journal of CO2 Utilization, 11:3-9 (2015).
Qin, Z. et al., Cobalt-based complexes for the copolymerization of propylene oxide and CO2: active and selective catalysts for; polycarbonate synthesis, Angewandte Chemie International Edition English, 42(44):5484-7 (2003).
Rieger et al., Recent advances in CO2/epoxide copolymerization—New strategies and cooperative mechanisms, Coordination Chemistry Reviews 255: 1460-1479 (2011).
Smith, C. P. et al., Thermoplastic Polyurethane Elastomers Made from High Molecular Weight POLY-L® Polyols, Journal of Elastomers and Plastics, 24: 306-322 (1992).
Sugimoto et al., Manufacture of alkylene oxide-carbon dioxide copolymers, Database CA [Online] Chemical Abstracts Service, Database accession No. 2008:444531, Abstract (Dec. 31, 2008).
Sugimoto, H. et al., Alternating Copolymerization of Carbon Dioxide and Epoxide Catalyzed by an Aluminum Schiff Base-Ammonium Salt System, Journal of Polymer Science: Part A: Polymer Chemistry, 43: 4172-4186 (2005).
Sujith et al., A Highly Active and Recyclable Catalytic System for CO2/Propylene Oxide Copolymerization, Angew. Chem. Int. Ed., 47: 7306-7309 (2008).
Sujith et al., A Highly Active and Recyclable Catalytic System for CO2/Propylene Oxide Copolymerization, Angew. Chem. Int. Ed., 47: 7306-7309 (2008). Supporting Information.
Van Meerendonk, W.J. et al., Unexpected Side Reactions and Chain Transfer for Zinc-Catalyzed Copolymerization of Cyclohexene Oxide and Carbon Dioxide, Macromolecules, 38: 7306-7313 (2005).
Williams et al., Catalysts for CO2/epoxide Polymerisation, Chem Commun., 47:141-163 (2011).
Yang et al., Rate of Regulated Copolymerization Involving CO2, Journal of Natural Gas Chemistry, 7(2): 149-156 (1998).
Zhang, X. et al., Catalysis as an Enabling Science for Sustainable Polymers, Chem. Rev., 118(2):839-885 (2018).
Zhang, X.H. et al., Highly active double metal cyanide complexes: Effect of central metal and ligand on reaction of epoxide/CO2, Chinese Chemical Letters, 18: 887-890 (2007).

* cited by examiner

POLYOL COMPOSITIONS AND METHODS

CROSS-REFERENCE TO RELATED APPLICATIONS

This application claims priority to U.S. Provisional Application No. 63/214,198 filed on Jun. 23, 2021, the entirety of which is incorporated herein by reference.

FIELD OF INVENTION

This invention pertains to the field of polyol and polyurethane compositions. More particularly, the invention pertains to polyol and polyurethane compositions comprising blends of polycarbonate polyols.

BACKGROUND

Polyurethane compositions, which are derived from the reaction between isocyanates and reactive polymers, are widely used, e.g., in adhesive and coating applications. There remains a need for polyurethane compositions with improved performance characteristics, e.g., strength, flexibility, elongation, etc., in particular for adhesive and coating applications.

SUMMARY OF INVENTION

In some aspects, the present invention provides compositions comprising blends of polycarbonate polyols derived from copolymerization of carbon dioxide and one or more epoxides. In some embodiments, such compositions are useful, e.g., when incorporated into polyurethane compositions, in particular for adhesive and coating applications.

As noted above, polyurethane compositions have been described. Many different combinations of polyols and isocyanates have been used in polyurethane compositions. For example, in certain applications, polyether polyols, polyester polyols, and polycarbonate polyols have been disclosed as preferred polyols in polyurethane compositions. However, each of these traditional polyols exhibits certain drawbacks when incorporated into polyurethane compositions, e.g., in adhesive compositions. For example, polyether polyols are a lower cost polyol used for their flexibility and hydrolytic stability, but polyurethane compositions derived from polyether polyols exhibit low strength and poor weather resistance. Polyester polyols are available in a wide variety structures and generally have good mechanical strength and flexibility; however, polyurethane compositions derived from polyester polyols exhibit low hydrolytic resistance. Although polyester polyols that result in improved hydrolytic resistance may be available, they come at a high cost. Lastly, polycarbonate diols exhibit good performance properties when incorporated into polyurethane compositions, but are the highest cost polyols. Accordingly, in certain aspects, there is a need to provide polyurethane compositions with improved performance characteristics, in particular for adhesive, elastomer, and coating applications.

The present invention encompasses the recognition that blends of polycarbonate polyols within a polyol component of a polyurethane composition can unexpectedly improve the performance profile (e.g., mechanical properties, adhesive properties, and/or shelf-life) of the resulting polyurethane composition. Accordingly, in some aspects, the present invention encompasses polyurethane compositions comprising the reaction product of a polyol component and a polyisocyanate composition. In particular, a polyol component comprises a blend of polycarbonate polyols.

Polycarbonate polyols derived from copolymerization of carbon dioxide and one or more epoxides include substantially alternating polycarbonate polyols. Such polyols, as a result of being derived from copolymerization of carbon dioxide and one or more epoxides, comprise a repeating unit having a structure:

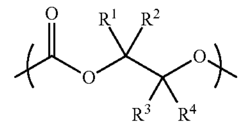

wherein $R^1$, $R^2$, $R^3$, and $R^4$ are as described herein.

As shown by the above structure, polycarbonate polyols derived from copolymerization of carbon dioxide and one or more epoxides comprise repeating carbonate units separated by two carbons.

Furthermore, polyurethane compositions that comprise a polycarbonate polyol derived from copolymerization of carbon dioxide and one or more epoxides, and thus comprising repeating carbonate units separated by two carbons, have been described in, for example, PCT Publication Nos. WO 2010/028362, WO 2013/016331, and WO 2014/074706.

While PCT Publication No. WO 2010/028362 discloses polycarbonate polyols derived from copolymerization of carbon dioxide and one or more epoxides and their incorporation into polyurethane compositions, it is silent with respect to particular blends of polycarbonate polyols.

PCT Publication No. WO 2013/016331 discloses B-side mixtures for the formulation of polyurethane compositions that incorporate a polycarbonate polyol and one or more additional polyols (e.g., a polyether or polyester polyol). In addition, PCT Publication No. WO 2014/074706 discloses polyurethane foams derived from a polycarbonate polyol and a polyether or polyester polyol. However, neither of these disclosures recognizes that particular blends of polycarbonate polyols within a polyurethane composition provides a superior performing material in certain applications, e.g., coatings and adhesives.

In some aspects, the present invention provides the recognition that, for a particular polyurethane composition, a blend of polyols comprising two or more structurally different polycarbonate polyols derived from $CO_2$ and one or more epoxides provides a polyurethane composition with superior performance properties.

When blending two or more polyols to provide a polyurethane composition, it is expected that the performance properties of the resulting polyurethane composition will be an average of the corresponding polyurethane compositions derived solely from each polyol. However, the present invention recognizes that the polyurethane compositions described herein (derived from a blend of polycarbonate polyols) display an unexpected synergistic improvement in performance profile (e.g., performance properties such as lap shear strength, tensile strength, tensile elongation, modulus, hydrolytic stability, and/or thermal stability), compared to the corresponding polyurethane compositions derived solely from each polycarbonate polyol. Additionally or alternatively, the present invention recognizes that the polyurethane compositions described herein (derived from a blend of polycarbonate polyols as described herein) display one or more improved performance properties without sacrificing a proportional decrease in another performance property (e.g., improved tensile strength without proportional decrease in tensile elongation).

In some aspects, the present invention encompasses compositions comprising:

polyol subcomponent (i), which comprises one or more aliphatic polycarbonate polyols having formula PS1:

PS1

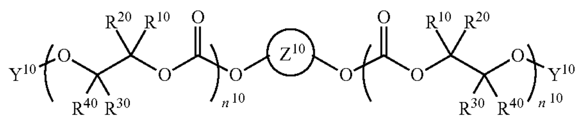

wherein each of $R^{10}$, $R^{20}$, $R^{30}$, $R^{40}$, $Y^{10}$, $n^{10}$, and

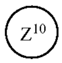

is as described herein; and polyol subcomponent (ii), which comprises one or more aliphatic polycarbonate polyols having formula PS2:

PS2

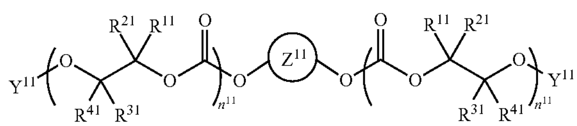

wherein each of $R^{11}$, $R^{21}$, $R^{31}$, $R^{41}$, $Y^{11}$, $n^{11}$, and

is as described herein.

In some aspects, the present invention encompasses polyurethane compositions derived from the reaction product of compositions comprising a blend of polycarbonate polyols described herein, e.g., comprising polyol subcomponent (i) and polyol subcomponent (ii). The polyurethane compositions of the present invention are particularly useful in adhesive and coating applications. In one aspect, polyurethane compositions of the present invention unexpectedly demonstrate improved performance properties (e.g., strength, flexibility, or both), as compared to a reference polyurethane composition.

In some aspects, the present invention encompasses isocyanate-terminated prepolymers derived from a composition comprising a blend of polycarbonate polyols described here, e.g., comprising polyol subcomponent (i) and polyol subcomponent (ii).

In some aspects, the present invention encompasses methods of producing a polyurethane compositions, comprising the steps of:

(a) providing a composition comprising one or more isocyanate reagents;

(b) providing a composition comprising a blend of polycarbonate polyols described here, e.g., comprising polyol subcomponent (i) and polyol subcomponent (ii); and (c) mixing the (a) and (b) compositions and allowing the mixture to cure into the polyurethane composition.

In some embodiments, the present invention encompasses methods of producing a polyurethane composition comprising the steps of:

(a) providing an isocyanate-terminated prepolymer derived from a composition comprising a blend of polycarbonate polyols described here, e.g., comprising polyol subcomponent (i) and polyol subcomponent (ii); and (b) allowing the mixture to cure into the polyurethane composition.

In some aspects, the present invention encompasses methods of improving a performance property of a polyurethane compositions comprising the reaction product of a polyol component and an isocyanate component, the method comprising the step of incorporating a blend of polycarbonate polyols into the polyol component, e.g., polyol subcomponent (i) and polyol subcomponent (ii).

DEFINITIONS

Figure 1A:
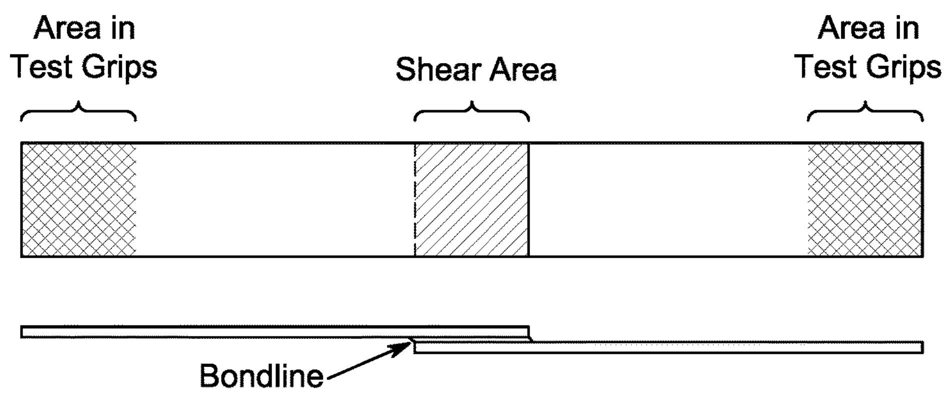
FIG. 1A and FIG. 1B depict sample preparation and single lap joints according to ASTM D1002.

Definitions of specific functional groups and chemical terms are described in more detail below. For purposes of this invention, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry,* 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis,* 3rd Edition, Cambridge University Press, Cambridge, 1987; the entire contents of each of which are incorporated herein by reference.

Certain molecules (e.g., polymers, epoxides, etc.) of the present invention can comprise one or more asymmetric centers, and thus can exist in various stereoisomeric forms, e.g., enantiomers and/or diastereomers. Thus, inventive molecules and compositions thereof may be in the form of an individual enantiomer, diastereomer or geometric isomer, or may be in the form of a mixture of stereoisomers. In certain embodiments, the molecules of the invention are enantiopure molecules. In certain embodiments, mixtures of enantiomers or diastereomers are provided.

Certain molecules described herein may have one or more double bonds that can exist as either the Z or E isomer, unless otherwise indicated. The invention additionally encompasses the molecules as individual isomers substantially free of other isomers and alternatively, as mixtures of various isomers, e.g., racemic mixtures of enantiomers. In addition to the above-mentioned molecules per se, this invention also encompasses compositions comprising one or more molecules.

As used herein, the term "about", when used herein in reference to a value, refers to a value that is similar, in context to the referenced value. In general, those skilled in the art, familiar with the context, will appreciate the relevant degree of variance encompassed by "about" in that context. For example, in some embodiments, the term "about" may encompass a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value, unless otherwise stated or otherwise evident from the context (except where such number would exceed 100% of a possible value).

The term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a stereoisomer may, in some embodiments, be provided substantially free of one or more corresponding stereoisomers, and may also be referred to as "stereochemically enriched."

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetitions of units derived, actually or conceptually, from molecules of low relative molecular mass. In certain embodiments, a polymer is comprised of substantially alternating units derived from $CO_2$ and an epoxide (e.g., poly(ethylene carbonate). In certain embodiments, a polymer of the present invention is a copolymer, terpolymer, heteropolymer, block copolymer, or tapered heteropolymer incorporating two or more different epoxide monomers. With respect to the structural depiction of such higher polymers, the convention of showing enchainment of different monomer units separated by a slash may be used as depicted herein, e.g.,

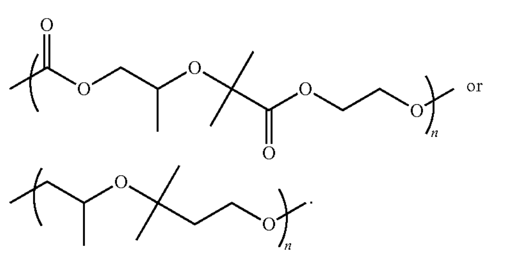

These structures are to be interpreted to encompass copolymers incorporating any ratio of the different monomer units depicted unless otherwise specified. This depiction is also meant to represent random, tapered, block copolymers, and combinations of any two or more of these and all of these are implied unless otherwise specified.

The terms "halo" and "halogen" as used herein refer to an atom selected from fluorine (fluoro, —F), chlorine (chloro, —Cl), bromine (bromo, —Br), and iodine (iodo, —I).

The term "reference" as used herein, described a standard or control relative to which a comparison is performed. For example, in some embodiments, a polymer, composition, sample, or value of interest is compared with a reference or control polymer, composition, sample, or value. In some embodiments, a reference or control is tested and/or determined substantially simultaneously with the testing or determination of interest. In some embodiments, a reference or control is a historical reference or control, optionally embodied in a tangible medium. Typically, as would be understood by those skilled in the art, a reference or control is determined or characterized under comparable conditions or circumstances to those under assessment. Those skilled in the art will appreciate when sufficient similarities are present to justify reliance on and/or comparison to a particular possible reference or control.

DETAILED DESCRIPTION OF CERTAIN EMBODIMENTS

I. Polyol Compositions

In some aspects, the present invention encompasses polyol compositions comprising a blend of polycarbonate polyols that, when incorporated into a polyurethane composition, result in one or more improved performance characteristics, e.g., strength, flexibility, elongation, etc. In some embodiments, the present invention encompasses compositions comprising:

polyol subcomponent (i), which comprises one or more aliphatic polycarbonate polyols having formula PS1:

PS1

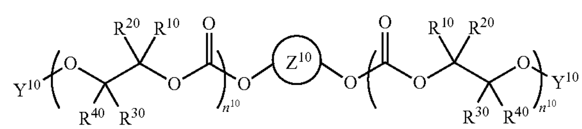

wherein each of $R^{10}$, $R^{20}$, $R^{30}$, $R^{40}$, $Y^{10}$, $n^{10}$, and

is as described herein; and polyol subcomponent (ii), which comprises one or more aliphatic polycarbonate polyols having formula PS2:

PS2

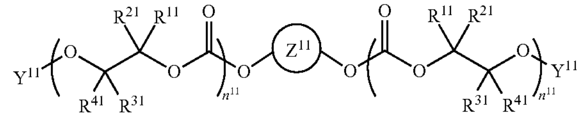

wherein each of $R^{11}$, $R^{21}$, $R^{31}$, $R^{41}$, $Y^{11}$, $n^{11}$, and

is as described herein.

Before describing these compositions in more detail, the polyols and isocyanates from which they are formulated will be more fully described.

A. Aliphatic Polycarbonate Polyols

In certain embodiments, compositions of the present invention comprise a polyol component, wherein the polyol component comprises a blend of polycarbonate polyols. Herein, a polycarbonate polyol refers to a substantially alternating aliphatic polycarbonate polyol. Examples of suitable aliphatic polycarbonate polyols, as well as methods of making them are disclosed in PCT publication WO 2010/028362, the entirety of which is incorporated herein by reference.

It will be appreciated that within the present disclosure, “aliphatic polycarbonate polyols” refers to a composition comprising a mixture of aliphatic polycarbonate polyol chains.

It is advantageous for many of the embodiments described herein that the aliphatic polycarbonate polyols used have a high percentage of reactive end groups. Such reactive end-groups are typically hydroxyl groups, but other reactive functional groups may be present if the polyols are treated to modify the chemistry of the end groups, such modified materials may terminate in amino groups, thiol groups, alkene groups, carboxylate groups, isocyanate groups, silyl groups, epoxy groups and the like. For purposes of this invention, the term “aliphatic polycarbonate polyol” includes both traditional hydroxy-terminated materials as well as these end-group modified compositions (e.g., isocyanate terminated prepolymers).

In certain embodiments, at least 90% of the end groups of the aliphatic polycarbonate polyol composition are reactive end groups. In certain embodiments, at least 95%, at least 96%, at least 97% or at least 98% of the end groups of the aliphatic polycarbonate polyol composition are reactive end groups. In certain embodiments, more than 99%, more than 99.5%, more than 99.7%, or more than 99.8% of the end groups of the aliphatic polycarbonate polyol composition used are reactive end groups. In certain embodiments, more than 99.9% of the end groups of the aliphatic polycarbonate polyol composition used are reactive end groups.

In certain embodiments, at least 90% of the end groups of the aliphatic polycarbonate polyol composition are —OH groups. In certain embodiments, at least 95%, at least 96%, at least 97% or at least 98% of the end groups of the aliphatic polycarbonate polyol composition are —OH groups. In certain embodiments, more than 99%, more than 99.5%, more than 99.7%, or more than 99.8% of the end groups of the aliphatic polycarbonate polyol composition are —OH groups. In certain embodiments, more than 99.9% of the end groups of the aliphatic polycarbonate polyol composition used are —OH groups.

Another way of expressing the —OH end-group content of a polyol composition is by reporting its OH #, which is measured using methods well known in the art. For example, OH #may be measured according to ASTM D4274 or ASTM E1899. In some embodiments, OH #is measured according to ASTM D4274. In some embodiments, OH #is measured according to ASTM E1899.

In certain embodiments, aliphatic polycarbonate polyol compositions used in the present invention have an OH #greater than about 20. In certain embodiments, aliphatic polycarbonate polyol compositions utilized in the present invention have an OH #greater than about 40. In certain embodiments, aliphatic polycarbonate polyol compositions have an OH # greater than about 50, greater than about 75, greater than about 100, or greater than about 120.

In some embodiments, aliphatic polycarbonate polyol compositions have an OH #of between about 40 and about 120. In some embodiments, aliphatic polycarbonate polyol compositions have an OH #of between about 40 and about 100. In some embodiments, aliphatic polycarbonate polyol compositions have an OH #of between about 40 and about 80. In some embodiments, aliphatic polycarbonate polyol compositions have an OH #of between about 40 and about 70. In some embodiments, aliphatic polycarbonate polyol compositions have an OH #of between about 50 and about 60. In some embodiments, aliphatic polycarbonate polyol compositions have an OH #of between about 52 and about 60. In some embodiments, aliphatic polycarbonate polyol compositions have an OH #of between about 54 and about 58. In some embodiments, aliphatic polycarbonate polyol compositions have an OH #of about 50. In some embodiments, aliphatic polycarbonate polyol compositions have an OH #of about 52. In some embodiments, aliphatic polycarbonate polyol compositions have an OH #of about 54. In some embodiments, aliphatic polycarbonate polyol compositions have an OH #of about 56. In some embodiments, aliphatic polycarbonate polyol compositions have an OH #of about 58. In some embodiments, aliphatic polycarbonate polyol compositions have an OH #of about 60.

In some embodiments, aliphatic polycarbonate polyol compositions have an OH #of between about 80 and about 120. In some embodiments, aliphatic polycarbonate polyol compositions have an OH #of between about 100 and about 120. In some embodiments, aliphatic polycarbonate polyol compositions have an OH #of between about 105 and about 115. In some embodiments, aliphatic polycarbonate polyol compositions have an OH #of between about 108 and about 116. In some embodiments, aliphatic polycarbonate polyol compositions have an OH #of between about 110 and about 114. In some embodiments, aliphatic polycarbonate polyol compositions have an OH #of about 108. In some embodiments, aliphatic polycarbonate polyol compositions have an OH #of about 110. In some embodiments, aliphatic polycarbonate polyol compositions have an OH #of about 112. In some embodiments, aliphatic polycarbonate polyol compositions have an OH #of about 114. In some embodiments, aliphatic polycarbonate polyol compositions have an OH #of about 116.

In certain embodiments, it is advantageous if aliphatic polycarbonate polyol compositions have a substantial proportion of primary hydroxyl end groups. These are the norm for compositions comprising poly(ethylene carbonate), but for polyols derived from copolymerization of substituted epoxides with $CO_2$, it is common for some or most of the chain ends to consist of secondary hydroxyl groups. In certain embodiments, such polyol compositions are treated to increase the proportion of primary —OH end groups. This may be accomplished by reacting the secondary hydroxyl groups with reagents such as ethylene oxide, reactive lactones, and the like. In certain embodiments, aliphatic polycarbonate polyol compositions are treated with beta lactones, caprolactone and the like to introduce primary hydroxyl end groups. In certain embodiments, aliphatic polycarbonate polyol compositions are treated with ethylene oxide to introduce primary hydroxyl end groups.

In certain embodiments, aliphatic polycarbonate polyols comprise a copolymer of carbon dioxide and one or more epoxides. In certain embodiments, aliphatic polycarbonate polyols comprise a copolymer of carbon dioxide and ethylene oxide. In certain embodiments, aliphatic polycarbonate polyols comprise a copolymer of carbon dioxide and propylene oxide. In certain embodiments, aliphatic polycarbonate polyols comprise a copolymer of carbon dioxide and 1,2-butene oxide and/or 1,2-hexene oxide. In certain embodiments, aliphatic polycarbonate polyols comprise a copolymer of carbon dioxide and cyclohexene oxide. In certain embodiments, aliphatic polycarbonate polyols comprise a copolymer of carbon dioxide and cyclopentene oxide. In certain embodiments, aliphatic polycarbonate polyols comprise a copolymer of carbon dioxide and 3-vinyl cyclohexene oxide. In certain embodiments, aliphatic polycarbonate polyols comprise a copolymer of carbon dioxide and 3-ethyl cyclohexene oxide.

In certain embodiments, aliphatic polycarbonate polyols comprise a terpolymer of carbon dioxide and ethylene oxide along with one or more additional epoxides selected from the group consisting of propylene oxide, 1,2-butene oxide, 2,3-butene oxide, cyclohexene oxide, 3-vinyl cyclohexene oxide, 3-ethyl cyclohexene oxide, cyclopentene oxide, epichlorohydrin, glicydyl esters, glycidyl ethers, styrene oxides, and epoxides of higher alpha olefins. In certain embodiments, such terpolymers contain a majority of repeat units derived from ethylene oxide with lesser amounts of repeat units derived from one or more additional epoxides. In certain embodiments, terpolymers contain about 50% to about 99.5% ethylene oxide-derived repeat units. In certain embodiments, terpolymers contain greater than about 60% ethylene oxide-derived repeat units. In certain embodiments, terpolymers contain greater than 75% ethylene oxide-derived repeat units. In certain embodiments, terpolymers contain greater than 80% ethylene oxide-derived repeat units. In certain embodiments, terpolymers contain greater than 85% ethylene oxide-derived repeat units. In certain embodiments, terpolymers contain greater than 90% ethylene oxide-derived repeat units. In certain embodiments, terpolymers contain greater than 95% ethylene oxide-derived repeat units.

In some embodiments, aliphatic polycarbonate polyols comprise a copolymer of carbon dioxide and propylene oxide along with one or more additional epoxides selected from the group consisting of ethylene oxide, 1,2-butene oxide, 2,3-butene oxide, cyclohexene oxide, 3-vinyl cyclohexene oxide, cyclopentene oxide, epichlorohydrin, glicydyl esters, glycidyl ethers, styrene oxides, and epoxides of higher alpha olefins. In certain embodiments, such terpolymers contain a majority of repeat units derived from propylene oxide with lesser amounts of repeat units derived from one or more additional epoxides. In certain embodiments, terpolymers contain about 50% to about 99.5% propylene oxide-derived repeat units. In certain embodiments, terpolymers contain greater than 60% propylene oxide-derived repeat units. In certain embodiments, terpolymers contain greater than 75% propylene oxide-derived repeat units. In certain embodiments, terpolymers contain greater than 80% propylene oxide-derived repeat units. In certain embodiments, terpolymers contain greater than 85% propylene oxide-derived repeat units. In certain embodiments, terpolymers contain greater than 90% propylene oxide-derived repeat units. In certain embodiments, terpolymers contain greater than 95% propylene oxide-derived repeat units.

In certain embodiments, aliphatic polycarbonate polyol compositions have a $M_n$ in the range of 500 g/mol to about 50,000 g/mol. In some embodiments, Mn is measured by size-exclusion chromatography. In some embodiments, Mn is measured by gel permeation chromatography. In some embodiments, gel permeation chromatography comprises a polystyrene standard.

In certain embodiments, aliphatic polycarbonate polyol compositions have a Mn between about 500 g/mol and about 40,000 g/mol. In certain embodiments, aliphatic polycarbonate polyol compositions have a Mn less than about 25,000 g/mol. In certain embodiments, aliphatic polycarbonate polyol compositions have a Mn between about 500 g/mol and about 20,000 g/mol. In certain embodiments, aliphatic polycarbonate polyol compositions have a Mn between about 500 g/mol and about 10,000 g/mol. In certain embodiments, aliphatic polycarbonate polyol compositions have a Mn between about 500 g/mol and about 5,000 g/mol. In certain embodiments, aliphatic polycarbonate polyol compositions have a Mn between about 1,000 g/mol and about 5,000 g/mol. In certain embodiments, aliphatic polycarbonate polyol compositions have a Mn between about 5,000 g/mol and about 10,000 g/mol. In certain embodiments, aliphatic polycarbonate polyol compositions have a Mn between about 500 g/mol and about 1,000 g/mol. In certain embodiments, aliphatic polycarbonate polyol compositions have a Mn between about 500 g/mol and about 2,000 g/mol. In certain embodiments, aliphatic polycarbonate polyol compositions have a Mn between about 1,000 g/mol and about 3,000 g/mol. In certain embodiments, aliphatic polycarbonate polyol compositions have a Mn of about 5,000 g/mol. In certain embodiments, aliphatic polycarbonate polyol compositions have a Mn of about 4,000 g/mol. In certain embodiments, aliphatic polycarbonate polyol compositions have a Mn of about 3,000 g/mol. In certain embodiments, aliphatic polycarbonate polyol compositions have a Mn of about 2,500 g/mol. In certain embodiments, aliphatic polycarbonate polyol compositions have a Mn of about 2,000 g/mol. In certain embodiments, aliphatic polycarbonate polyol compositions have a Mn of about 1,500 g/mol. In certain embodiments, aliphatic polycarbonate polyol compositions have a Mn of about 1,000 g/mol. In certain embodiments, aliphatic polycarbonate polyol compositions have a Mn of about 750 g/mol. In certain embodiments, aliphatic polycarbonate polyol compositions have a Mn of about 500 g/mol.

In certain embodiments, aliphatic polycarbonate polyols used are characterized in that they have a narrow molecular weight distribution. This can be indicated by the polydispersity indices (PDI) of the polycarbonate polyols. In certain embodiments, aliphatic polycarbonate polyol compositions (or a subcomponent thereof) have a PDI less than 3. In certain embodiments, aliphatic polycarbonate polyol compositions (or a subcomponent thereof) have a PDI less than 2. In certain embodiments, aliphatic polycarbonate polyol compositions (or a subcomponent thereof) have a PDI less than 1.8. In certain embodiments, aliphatic polycarbonate polyol compositions (or a subcomponent thereof) have a PDI less than 1.5. In certain embodiments, aliphatic polycarbonate polyol compositions (or a subcomponent thereof) have a PDI less than 1.4. In certain embodiments, aliphatic polycarbonate polyol compositions (or a subcomponent thereof) have a PDI between about 1.0 and 1.2. In certain embodiments, aliphatic polycarbonate polyol compositions (or a subcomponent thereof) have a PDI between about 1.0 and 1.1.

In certain embodiments, aliphatic polycarbonate polyol compositions used do not have a narrow PDI. This can be the case if, for example, a polydisperse chain transfer agent is used to initiate an epoxide $CO_2$ copolymerization, or if a plurality of polycarbonate polyol compositions with different molecular weights are blended. In certain embodiments, aliphatic polycarbonate polyol compositions (or a subcomponent thereof) have a PDI greater than 3. In certain embodiments, aliphatic polycarbonate polyol compositions (or a subcomponent thereof) have a PDI greater than 2. In certain embodiments, aliphatic polycarbonate polyol compositions (or a subcomponent thereof) have a PDI greater than 1.8. In certain embodiments, aliphatic polycarbonate polyol compositions (or a subcomponent thereof) have a PDI greater than 1.5. In certain embodiments, aliphatic polycarbonate polyol compositions (or a subcomponent thereof) have a PDI greater than 1.4.

In some embodiments, PDI is measured by size-exclusion chromatography. In some embodiments, PDI is measured by gel permeation chromatography. In some embodiments, gel permeation chromatography comprises a polystyrene standard.

In certain embodiments, aliphatic polycarbonate polyols contain a high percentage of carbonate linkages and a low content of ether linkages. In some embodiments, the percentage of carbonate linkages may be determined by $^{1}H$ or $^{13}C$ NMR spectroscopy. In some embodiments, the percentage of carbonate linkages may be determined by infrared (IR) or Raman spectroscopy.

In certain embodiments, aliphatic polycarbonate polyol compositions of the present invention comprise substantially alternating polymers containing a high percentage of carbonate linkages and a low content of ether linkages. In certain embodiments, aliphatic polycarbonate polyol compositions of the present invention are characterized in that, on average in the composition, the percentage of carbonate linkages is 85% or greater. In certain embodiments, aliphatic polycarbonate polyol compositions of the present invention are characterized in that, on average in the composition, the percentage of carbonate linkages is 90% or greater. In certain embodiments, aliphatic polycarbonate polyol compositions of the present invention are characterized in that, on average in the composition, the percentage of carbonate linkages is 91% or greater. In certain embodiments, aliphatic polycarbonate polyol compositions of the present invention are characterized in that, on average in the composition, the percentage of carbonate linkages is 92% or greater. In certain embodiments, aliphatic polycarbonate polyol compositions of the present invention are characterized in that, on average in the composition, the percentage of carbonate linkages is 93% or greater. In certain embodiments, aliphatic polycarbonate polyol compositions of the present invention are characterized in that, on average in the composition, the percentage of carbonate linkages is 94% or greater. In certain embodiments, aliphatic polycarbonate polyol compositions of the present invention are characterized in that, on average in the composition, the percentage of carbonate linkages is 95% or greater. In certain embodiments, aliphatic polycarbonate polyol compositions of the present invention are characterized in that, on average in the composition, the percentage of carbonate linkages is 96% or greater. In certain embodiments, aliphatic polycarbonate polyol compositions of the present invention are characterized in that, on average in the composition, the percentage of carbonate linkages is 97% or greater. In certain embodiments, aliphatic polycarbonate polyol compositions of the present invention are characterized in that, on average in the composition, the percentage of carbonate linkages is 98% or greater. In certain embodiments, aliphatic polycarbonate polyol compositions of the present invention are characterized in that, on average in the composition, the percentage of carbonate linkages is 99% or greater. In certain embodiments, aliphatic polycarbonate polyol compositions of the present invention are characterized in that, on average in the composition, the percentage of carbonate linkages is 99.5% or greater. Unless otherwise stated, the percentages above exclude ether linkages present in polymerization initiators or chain transfer agents and refer only to the linkages formed during epoxide $CO_2$ copolymerization.

In certain embodiments, aliphatic polycarbonate polyol compositions are characterized in that they contain essentially no ether linkages either within the polymer chains derived from epoxide $CO_2$ copolymerization or within any polymerization initiators, chain transfer agents, or end groups that may be present in the polymer. In certain embodiments, aliphatic polycarbonate polyol compositions are characterized in that they contain, on average, less than one ether linkage per polymer chain within the composition. In certain embodiments, aliphatic polycarbonate polyol compositions are characterized in that they contain essentially no ether linkages.

In certain embodiments, where an aliphatic polycarbonate polyol is derived from mono-substituted epoxides (e.g. such as propylene oxide, 1,2-butylene oxide, epichlorohydrin, epoxidized alpha olefins, or a glycidol derivative), the aliphatic polycarbonate polyol is characterized in that it is regioregular. Regioregularity may be expressed as the percentage of adjacent monomer units that are oriented in a head-to-tail arrangement within the polymer chain. In certain embodiments, aliphatic polycarbonate polyols have a head-to-tail content higher than about 80%. In certain embodiments, the head-to-tail content is higher than about 85%. In certain embodiments, the head-to-tail content is higher than about 90%. In certain embodiments, the head-to-tail content is greater than about 91%, greater than about 92%, greater than about 93%, greater than about 94%, or greater than about 95%. In certain embodiments, the head-to-tail content of the polymer is as determined by proton or carbon-13 NMR spectroscopy.

In certain embodiments, aliphatic polycarbonate polyols have a structure P1:

P1

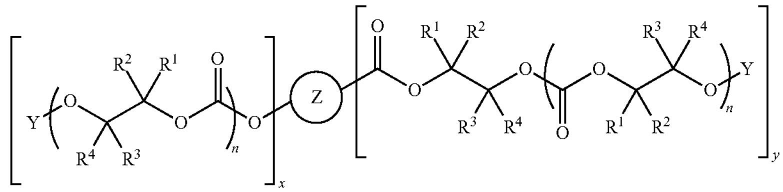

wherein, $R^1$, $R^2$, $R^3$, and $R^4$ are, at each occurrence in the polymer chain, independently selected from the group consisting of —H, fluorine, an optionally substituted $C_{1-30}$ aliphatic group, and an optionally substituted $C_{1-40}$ heteroaliphatic group, and an optionally substituted aryl group, where any two or more of $R^1$, $R^2$, $R^3$, and $R^4$ may optionally be taken together with intervening atoms to form one or more optionally substituted rings optionally containing one or more heteroatoms;

Y is, at each occurrence, independently —H, a reactive group (as defined hereinabove), or a site of attachment to any of the chain-extending moieties or isocyanates described in the classes and subclasses herein;

n is at each occurrence, independently an integer from about 2 to about 50;

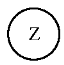

is a covalent bond or a multivalent moiety; and x and y are each independently an integer from 0 to 6, where the sum of x and y is between 2 and 6.

In some embodiments, $R^1$, $R^2$, $R^3$, and $R^4$ are, independently at each occurrence in the polymer chain, selected from the group consisting of hydrogen and optionally substituted $C_1$-$C_6$ aliphatic. In some embodiments, $R^1$, $R^2$, $R^3$, and $R^4$ are, independently at each occurrence in the polymer chain, selected from the group consisting of hydrogen and methyl.

In some embodiments, Y is, at each occurrence, —H or the site of attachment to a chain-extending moiety. In some embodiments Y is —H.

tions are performed in the presence of polyfunctional chain transfer agents as exemplified in published PCT application WO 2010/028362. In certain embodiments, such copolymerizations are performed as exemplified in US 2011/0245424. In certain embodiments, such copolymerizations are performed as exemplified in Green Chem. 2011, 13, 3469-3475.

In certain embodiments, a polyfunctional chain transfer agent has a formula:

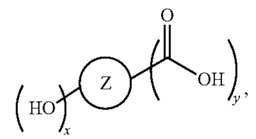

wherein each of

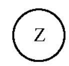

x, and y is as defined above and described in classes and subclasses herein.

In certain embodiments, aliphatic polycarbonate polyols are derived from the copolymerization of one or more epoxides with carbon dioxide in the presence of such polyfunctional chain transfer agents as shown in Scheme 1:

Scheme 1

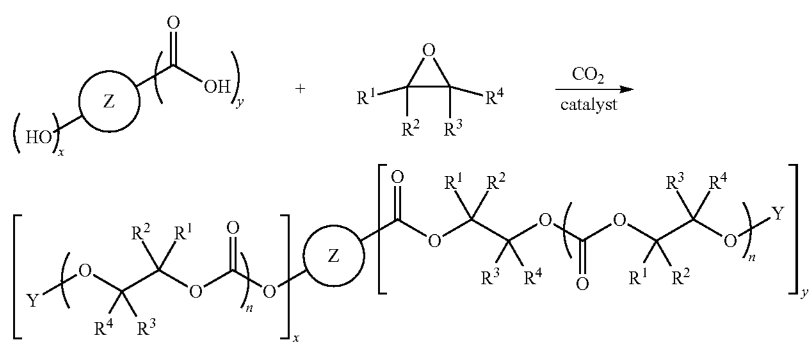

P1

It will be understood that when a composition that comprises an aliphatic polycarbonate polyol has a structure of formulae P1 through P2r-a, the composition may also comprise other polymer species, e.g., those with occurrences where n is 0 or 1.

In certain embodiments, the multivalent moiety

embedded within the aliphatic polycarbonate chain is derived from a polyfunctional chain transfer agent having two or more sites from which epoxide/$CO_2$ copolymerization can occur. In certain embodiments, such copolymeriza- In certain embodiments, aliphatic polycarbonate polyols have a structure of Formula P2:

P2

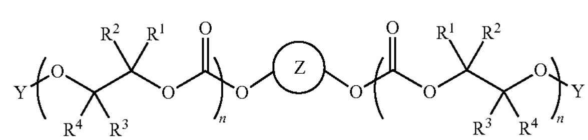

wherein each of $R^1$, $R^2$, $R^3$, $R^4$, Y,

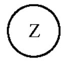

and n is as defined above and described in the classes and subclasses herein.

In certain embodiments where aliphatic polycarbonate polyol chains have a structure P2,

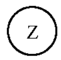

is derived from a dihydric alcohol. In such instances

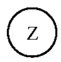

represents the carbon-containing backbone of the dihydric alcohol, while the two oxygen atoms adjacent to

are derived from the —OH groups of the diol. For example, if the polyfunctional chain transfer agent were ethylene glycol, then

would be $—CH_2CH_2—$ and P2 would have the following structure:

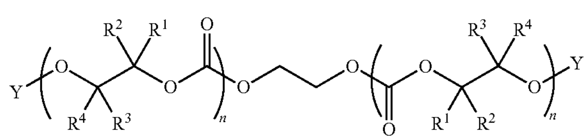

In certain embodiments where

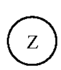

is derived from a dihydric alcohol, the dihydric alcohol comprises a $C_{2-40}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, 1,8-octanediol, 1,10-decanediol, 1,12-dodecanediol, 2,2,4,4-tetramethylcyclobutane-1,3-diol, 1,3-cyclopentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these.

In certain embodiments, where

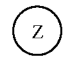

is derived from a dihydric alcohol, the dihydric alcohol is selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly(propylene glycol), such as those having number average molecular weights of from 234 to about 2000 g/mol. In some embodiments,

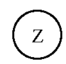

is derived from dipropylene glycol.

In certain embodiments, where

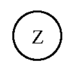

is derived from a dihydric alcohol, the dihydric alcohol comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, where

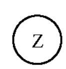

is derived from a dihydric alcohol, the dihydric alcohol comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, polyoxymethylene polymers, and alkoxylated analogs of any of these. In certain embodiments, a polymeric diol has an average molecular weight less than about 2000 g/mol. In some embodiments, a polymeric diol has an average molecular weight of between about 500 g/mol and about 1,500 g/mol. In some embodiments, a polymeric diol has an average molecular weight of between about 750 g/mol and about 1,250 g/mol. In some embodiments, a polymeric diol has an average molecular weight of between about 900 g/mol and about 1,100 g/mol. In some embodiments, a polymeric diol has an average molecular weight of about 1,000 g/mol.

In some embodiments, a polymeric diol is a polyether. In some embodiments, a polymeric diol is polyethylene glycol. In some embodiments, a polymeric diol is polypropylene glycol. In some embodiments, a polymeric diol is a polyester.

In certain embodiments,

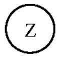

is derived from a polyhydric alcohol with more than two hydroxy groups. In embodiments in which

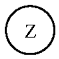

is derived from a polyhydric alcohol with more than two hydroxyl groups, these >2 functional polyols are a component of a polyol mixture containing predominantly polyols with two hydroxyl groups. In certain embodiments, these >2 functional polyols are less than 20% of the total polyol mixture by weight. In certain embodiments, these >2 functional polyols are less than 10% of the total polyol mixture. In certain embodiments, these >2 functional polyols are less than 5% of the total polyol mixture. In certain embodiments, these >2 functional polyols are less than 2% of the total polyol mixture.

In certain embodiments, aliphatic polycarbonate polyol compositions comprise polycarbonate polyols where the moiety

is derived from a triol. In certain embodiments, such polycarbonate polyols have the structure P3:

P3

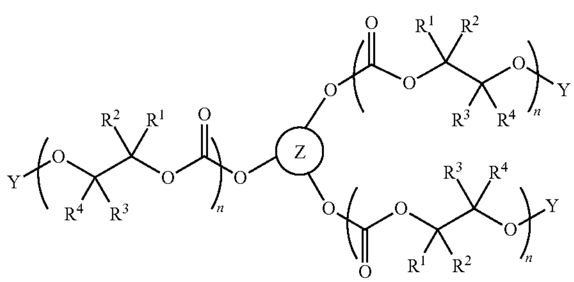

wherein each of $R^1$, $R^2$, $R^3$, $R^4$, Y,

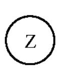

and n is as defined above and described in classes and subclasses herein.

In certain embodiments where

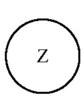

is derived from a triol, the triol is selected from the group consisting of: glycerol, 1,2,4-butanetriol, 2-(hydroxymethyl)-1,3-propanediol; hexane triols, trimethylol propane, trimethylol ethane, trimethylolhexane, 1,2,4-cyclohexanetrimethanol, pentaerythritol mono esters, pentaerythritol mono ethers, and alkoxylated analogs of any of these. In certain embodiments, such alkoxylated derivatives comprise ethoxylated or propoxylated compounds.

In certain embodiments,

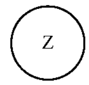

is derived from an alkoxylated derivative of a trifunctional carboxylic acid or trifunctional hydroxy acid. In certain embodiments, alkoxylated derivatives comprise ethoxylated or propoxylated compounds.

In certain embodiments, where

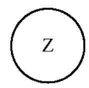

is derived from a polymeric triol, the polymeric triol is selected from the group consisting of polyethers, polyesters, hydroxy-terminated polyolefins, polyether-copolyesters, polyether polycarbonates, polyoxymethylene polymers, polycarbonate-copolyesters, and alkoxylated analogs of any of these. In certain embodiments, the alkoxylated polymeric triols comprise ethoxylated or propoxylated compounds.

In certain embodiments,

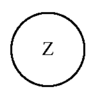

is derived from a polyhydric alcohol with four hydroxy groups.

In certain embodiments, aliphatic polycarbonate polyol compositions comprise polycarbonate polyols where the moiety

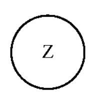

is derived from a tetraol. In certain embodiments, polycarbonate polyols have the structure P4:

P4

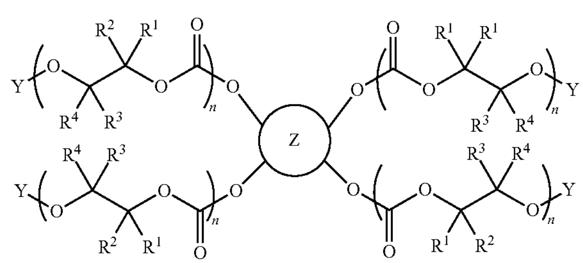

wherein each of $R^1$, $R^2$, $R^3$, $R^4$, Y,

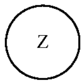

and n is as defined above and described in classes and subclasses herein.

In certain embodiments,

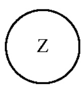

is derived from a polyhydric alcohol with more than four hydroxy groups. In certain embodiments,

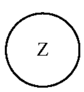

is derived from a polyhydric alcohol with six hydroxy groups. In certain embodiments, a polyhydric alcohol is dipentaerythritol or an alkoxylated analog or other derivative thereof. In certain embodiments, a polyhydric alcohol is sorbitol or an alkoxylated analog thereof.

In certain embodiments, aliphatic polycarbonate polyols have the structure P5:

P5

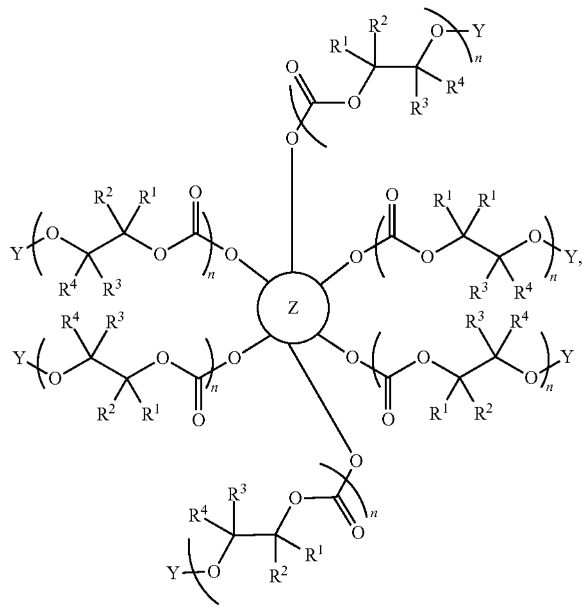

wherein each of $R^1$, $R^2$, $R^3$, $R^4$, Y,

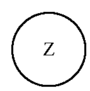

and n is as defined above and described in classes and subclasses herein.

In certain embodiments, aliphatic polycarbonate polyols comprise a combination of bifunctional chains (e.g. aliphatic polycarbonates of formula P2) in combination with higher functional chains (e.g. one or more aliphatic polycarbonates of formulae P3 to P5).

In certain embodiments,

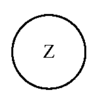

is derived from a hydroxy acid. In certain embodiments, aliphatic polycarbonate polyols have the structure P6:

P6

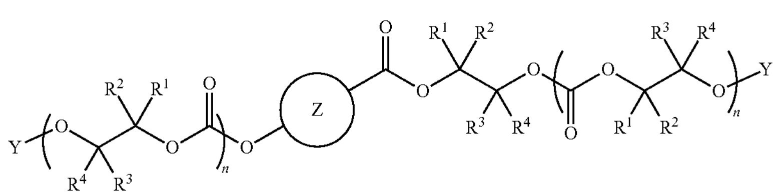

wherein each of $R^1$, $R^2$, $R^3$, $R^4$, Y,

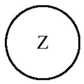

and n is as defined above and described in classes and subclasses herein.

In such instances,

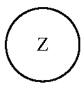

represents the carbon-containing backbone of the hydroxy acid, while ester and carbonate linkages adjacent to

are derived from the $-CO_2H$ group and the hydroxy group of the hydroxy acid. For example, if

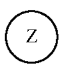

were derived from 3-hydroxypropanoic acid, then

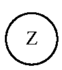

would be $-CH_2CH_2+$ and P6 would have the following structure:

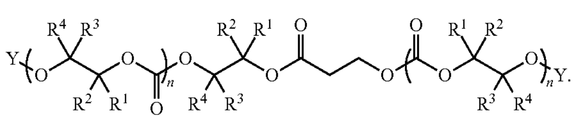

In certain embodiments,

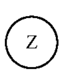

is derived from an optionally substituted $C_{2-40}$ hydroxy acid. In certain embodiments,

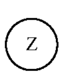

is derived from a polyester. In certain embodiments, such polyesters have a molecular weight less than about 2000 g/mol.

In certain embodiments, a hydroxy acid is an alpha-hydroxy acid. In certain embodiments, a hydroxy acid is selected from the group consisting of: glycolic acid, DL-lactic acid, D-lactic acid, L-lactic, citric acid, and mandelic acid.

In certain embodiments, a hydroxy acid is a beta-hydroxy acid. In certain embodiments, a hydroxy acid is selected from the group consisting of: 3-hydroxypropionic acid, DL 3-hydroxybutryic acid, D-3 hydroxybutryic acid, L-3-hydroxybutyric acid, DL-3-hydroxy valeric acid, D-3-hydroxy valeric acid, L-3-hydroxy valeric acid, salicylic acid, and derivatives of salicylic acid.

In certain embodiments, a hydroxy acid is a α-ω hydroxy acid. In certain embodiments, a hydroxy acid is selected from the group consisting of: of optionally substituted $C_{3-20}$ aliphatic α-ω hydroxy acids and oligomeric esters.

In certain embodiments, a hydroxy acid is selected from the group consisting of:

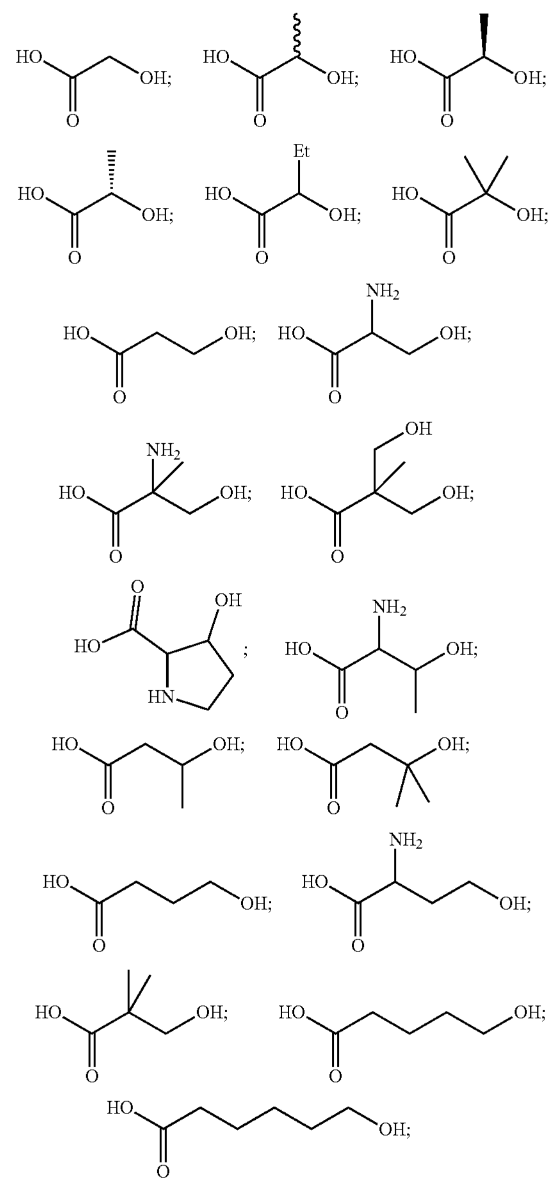

-continued

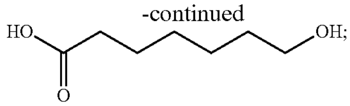

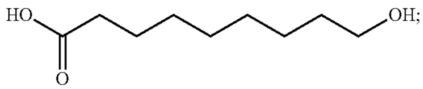

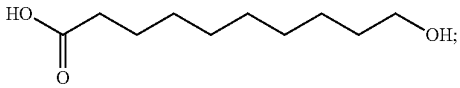

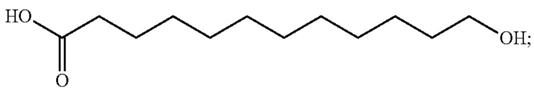

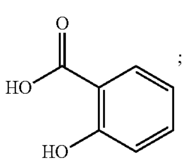

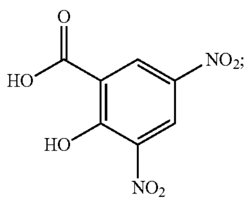

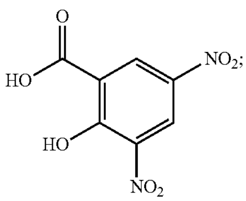

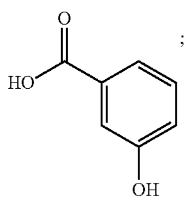

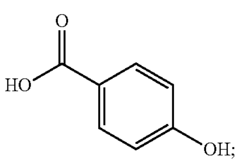

and

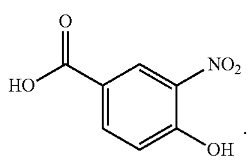

In certain embodiments,

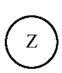

is derived from a polycarboxylic acid. In certain embodiments, aliphatic polycarbonate polyols have the structure P7:

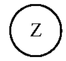

and n is as defined above and described in classes and subclasses herein, and y' is an integer from 1 to 5 inclusive.

In embodiments, where the aliphatic polycarbonate polyols have a structure P7,

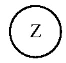

represents the carbon-containing backbone (or a bond in the case of oxalic acid) of a polycarboxylic acid, while ester groups adjacent to

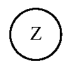

are derived from —$CO_2H$ groups of the polycarboxylic acid. For example, if

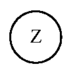

were derived from succinic acid ($HO_2CCH_2CH_2CO_2H$), then

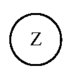

would be —$CH_2CH_2$— and P7 would have the following structure:

P7

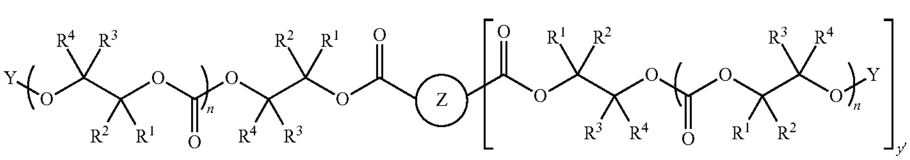

wherein each of $R^1$, $R^2$, $R^3$, $R^4$, Y,

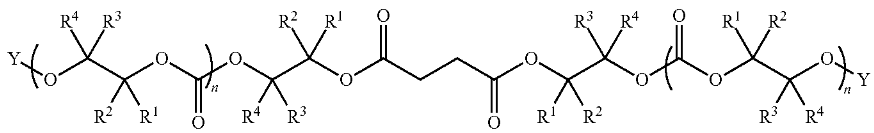

wherein each of $R^1$, $R^2$, $R^3$, $R^4$, Y, and n is as defined above and described in classes and subclasses herein.

In certain embodiments,

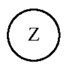

is derived from a dicarboxylic acid. In certain embodiments, aliphatic polycarbonate polyols have the structure P8:

P8

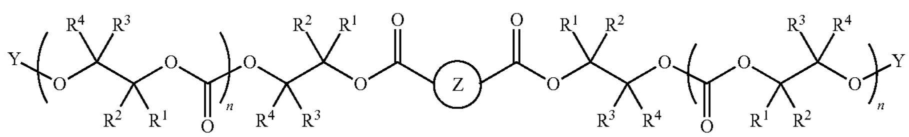

In certain embodiments,

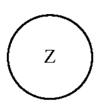

is selected from the group consisting of: phthalic acid, isophthalic acid, terephthalic acid, maleic acid, succinic acid, malonic acid, glutaric acid, adipic acid, pimelic acid, suberic acid, and azelaic acid.

In certain embodiments,

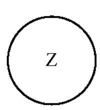

is derived from a diacid selected from the group consisting of:

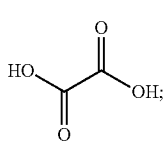

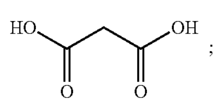

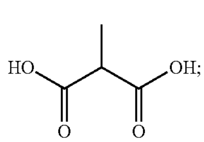

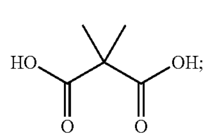

-continued

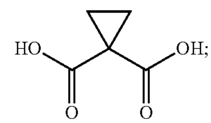

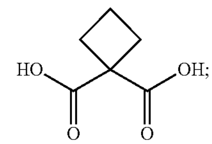

-continued

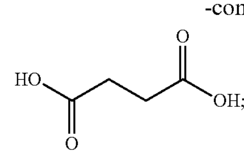

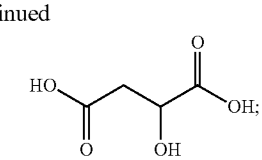

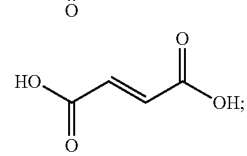

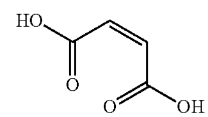

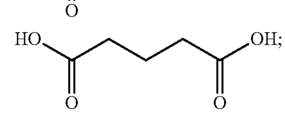

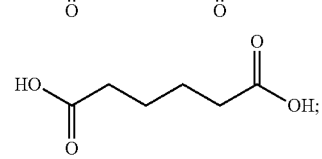

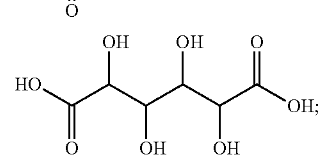

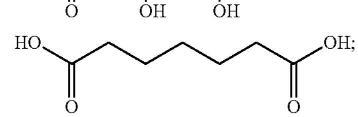

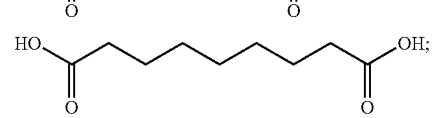

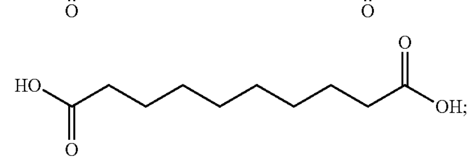

-continued

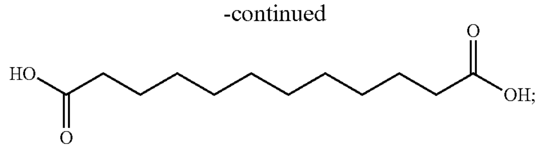

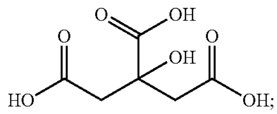

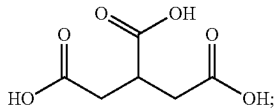

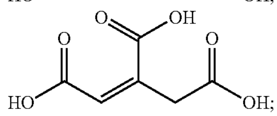

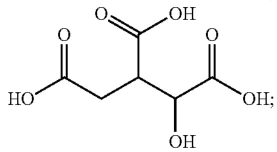

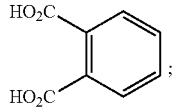

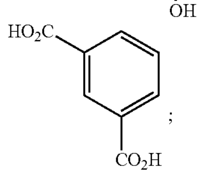

and

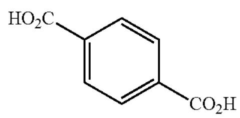

In certain embodiments,

is derived from a phosphorous-containing molecule. In certain embodiments,

has a formula —P(O)(OR)$_k$— where each R is independently an optionally substituted $C_{1-20}$ aliphatic group or an optionally substituted aryl group and k is 0, 1, or 2.

For example, if

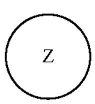

were derived from PhO—P(O)$(OH)_2$, then

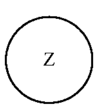

would be —P(O)(OPh)- and P7 would have the following structure:

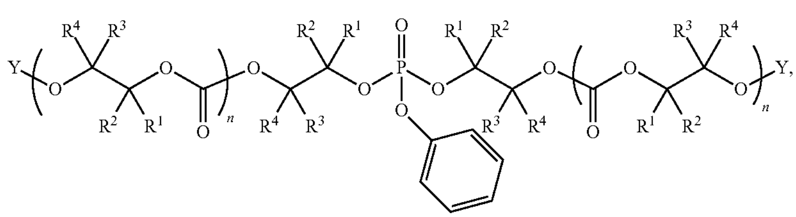

wherein each of $R^1$, $R^2$, $R^3$, $R^4$, Y, and n is as defined above and described in classes and subclasses herein.

In certain embodiments,

is derived from a phosphorous-containing molecule selected from the group consisting of:

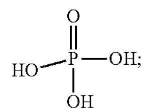

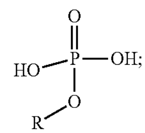

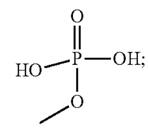

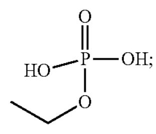

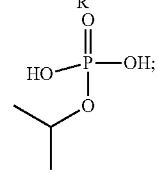

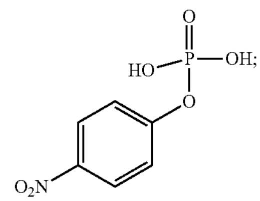

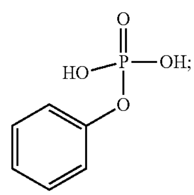

and

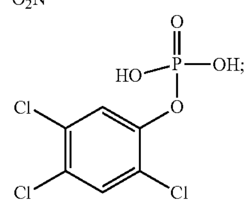

In certain embodiments,

has a formula —P(O)(R)— where R is an optionally substituted $C_{1-20}$ aliphatic group or an optionally substituted aryl group and k is 0, 1, or 2. In certain embodiments,

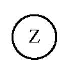

is derived from a phosphorous-containing molecule selected from the group consisting of:

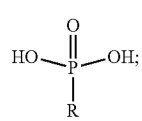

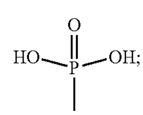

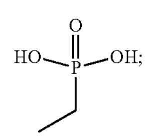

-continued

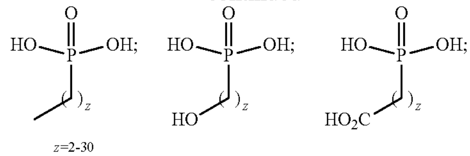

and

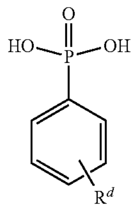

where each of R is as defined above and in the classes and subclasses herein; and $R^d$ is optionally substituted $C_{1-6}$ aliphatic.

In certain embodiments,

has a formula —PR— where R is an optionally substituted $C_{1-20}$ aliphatic group or an optionally substituted aryl group.

In certain embodiments, each

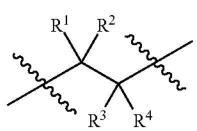

in the structures herein is independently selected from the group consisting of:

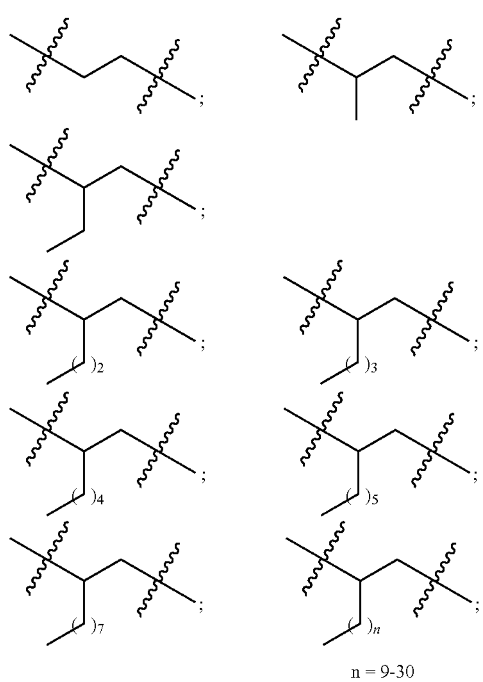

-continued

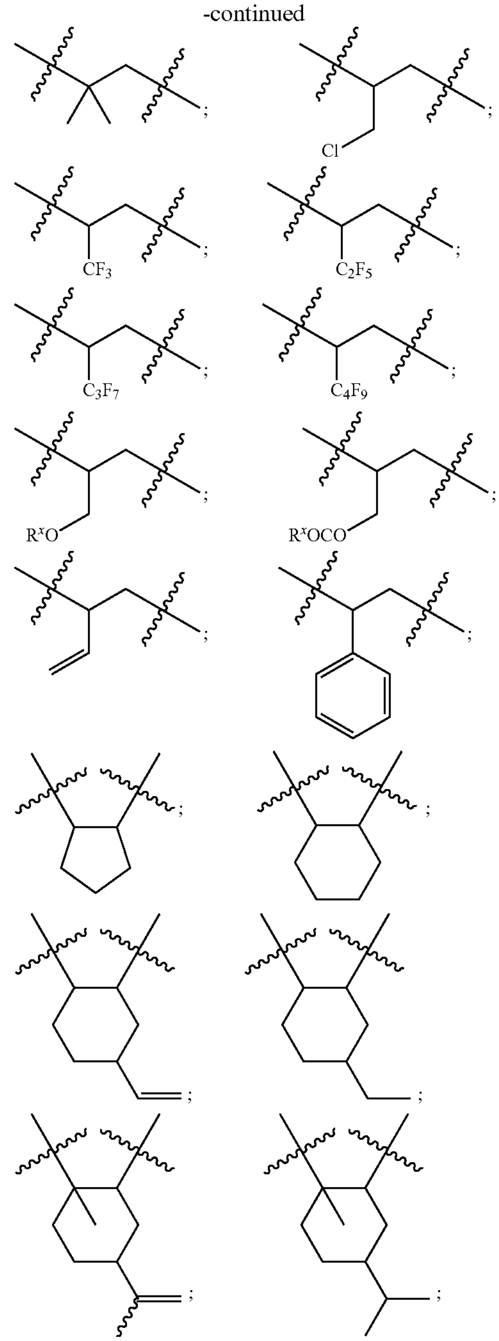

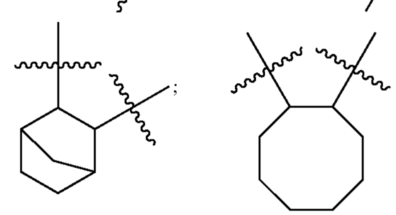

and

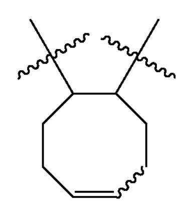

wherein each $R^x$ is independently an optionally substituted moiety selected from the group consisting of $C_{2-20}$ aliphatic, $C_{2-20}$ heteroaliphatic, 3- to 14-membered carbocyclic, 6- to 10-membered aryl, 5- to 10-membered heteroaryl, and 3- to 12-membered heterocyclic.

In certain embodiments, each

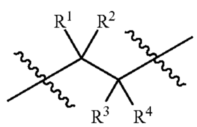

in the structures herein is independently selected from the group consisting of:

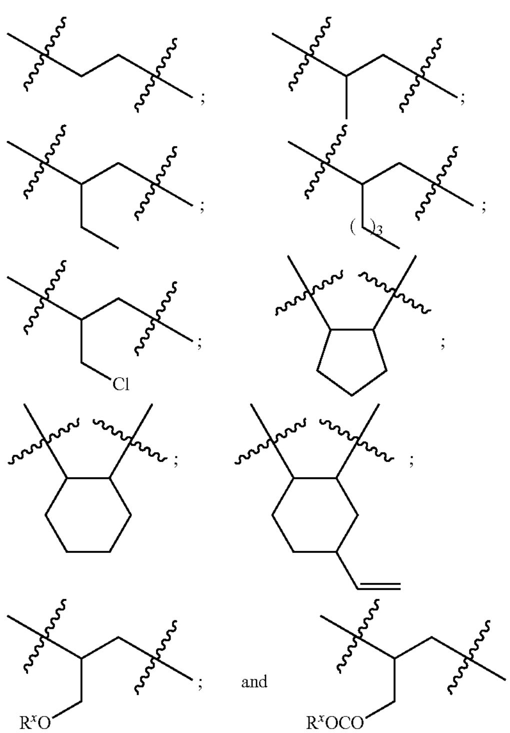

wherein $R^x$ is as defined above and described in classes and subclasses herein.

In certain embodiments, the moiety —Y in the structures herein is —H.

In certain embodiments, —Y comprises an ester linkage to an optionally substituted $C_{2-40}$ linker comprising (e.g., terminated with) an —OH group. In certain embodiments, —Y is selected from the group consisting of:

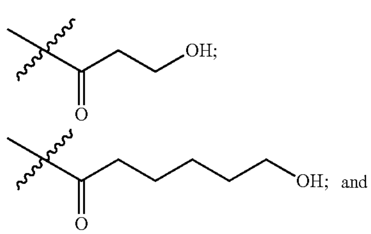

-continued

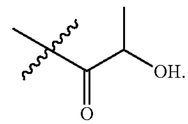

In certain embodiments, —Y comprises an ester linkage to an optionally substituted $C_{2-40}$ linker comprising (e.g., terminated with) an —$CO_2H$ group. In certain embodiments, —Y is selected from the group consisting of:

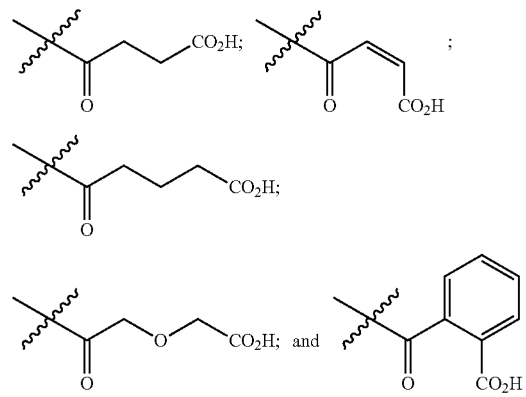

In certain embodiments, the moiety —Y in the structures herein comprises a hydroxy-terminated polymer. In certain embodiments, —Y comprises a hydroxy-terminated polyether. In certain embodiments, —Y comprises

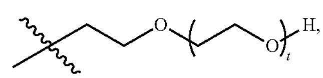

where t is an integer from 1 to 20.

In certain embodiments, —Y comprises a hydroxy-terminated polyester. In certain embodiments, —Y is selected from the group consisting of:

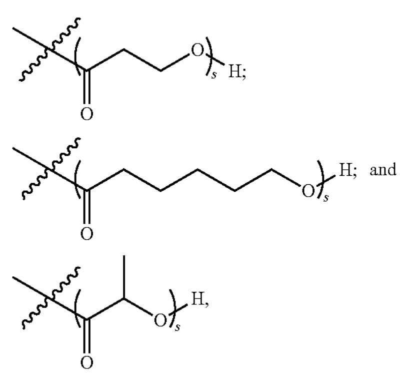

where s is an integer from 2 to 20.

In certain embodiments, aliphatic polycarbonate polyols comprise:

P2a

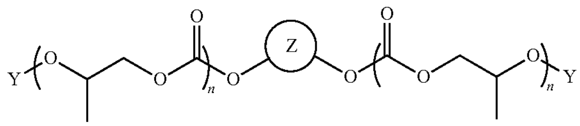

wherein each of

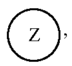

—Y, and n is as defined above and described in classes and subclasses herein.

In certain embodiments, aliphatic polycarbonate polyols comprise:

P2b

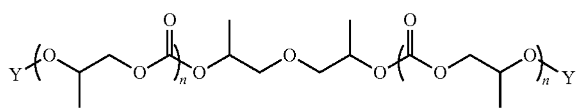

wherein each of —Y and n is as defined above and described in classes and subclasses herein.

In certain embodiments, aliphatic polycarbonate polyols comprise:

P2b′

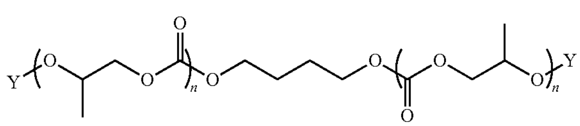

wherein each of —Y and n is as defined above and described in classes and subclasses herein.

In certain embodiments, aliphatic polycarbonate polyols comprise:

P2b″

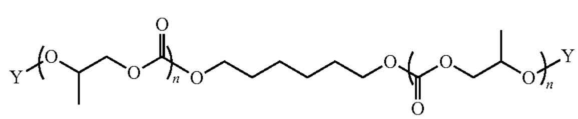

wherein each of —Y and n is as defined above and described in classes and subclasses herein.

In certain embodiments, aliphatic polycarbonate-polyols comprise:

P2c

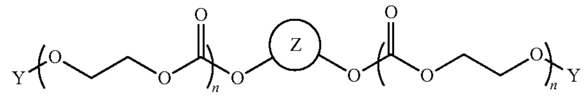

wherein each of

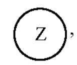

—Y, and n is as defined above and described in classes and subclasses herein.

In certain embodiments, aliphatic polycarbonate polyols comprise:

P2d

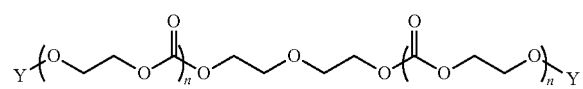

wherein each of —Y and n is as defined above and described in classes and subclasses herein.

In certain embodiments, aliphatic polycarbonate polyols comprise:

P2d′

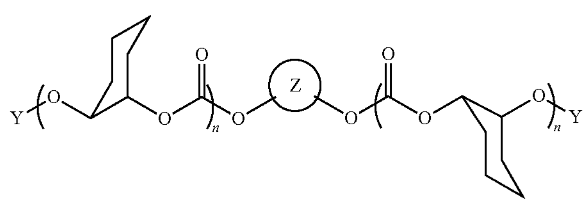

wherein each of

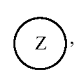

—Y, and n is as defined above and described in classes and subclasses herein.

In certain embodiments, aliphatic polycarbonate polyols comprise:

P2e

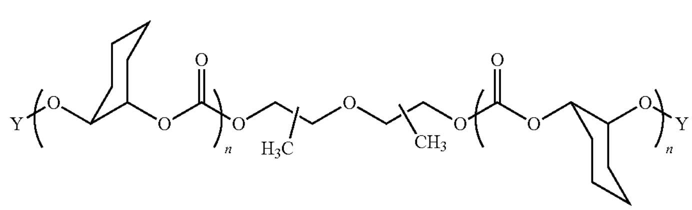

wherein each of —Y and n are is as defined above and described in classes and subclasses herein.

In certain embodiments, aliphatic polycarbonate polyols comprise:

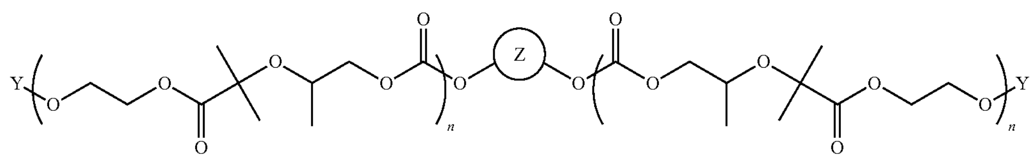

P2f wherein each of

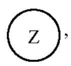

—Y, and n is as defined above and described in classes and subclasses herein.

In certain embodiments, aliphatic polycarbonate polyols comprise:

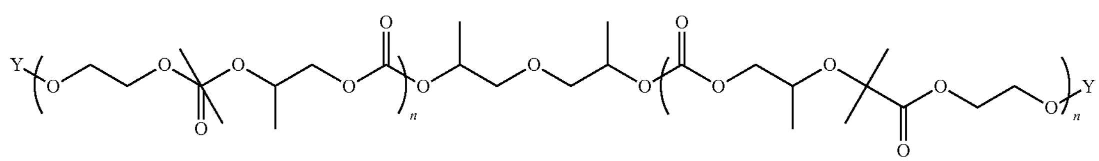

P2g wherein each of —Y and n is as defined above and described in classes and subclasses herein.

In certain embodiments, aliphatic polycarbonate polyols comprise:

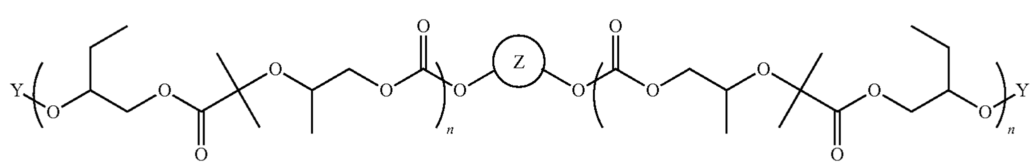

P2h wherein each of

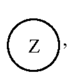

—Y, and n is as defined above and described in classes and subclasses herein.

In certain embodiments, aliphatic polycarbonate polyols comprise:

P2i

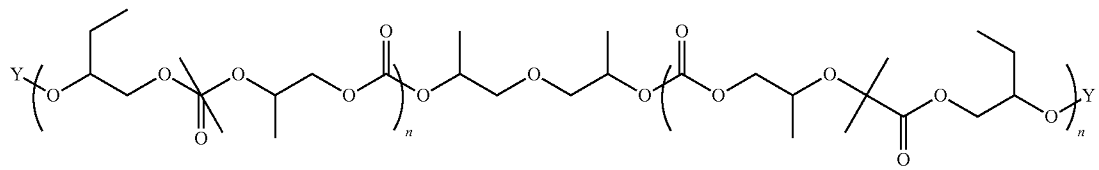

wherein each of —Y and n is as defined above and described in classes and subclasses herein.

In certain embodiments, aliphatic polycarbonate polyols comprise:

P2j

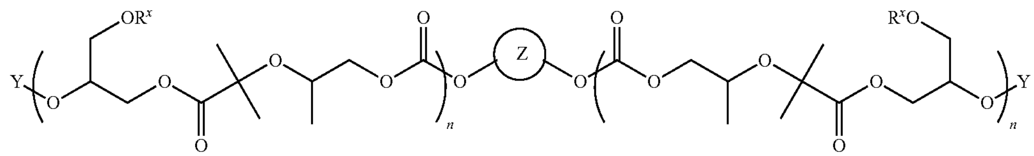

wherein each of

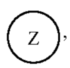

—Y, $R^x$, and n is as defined above and described in classes and subclasses herein.

In certain embodiments, aliphatic polycarbonate polyols comprise:

P2k

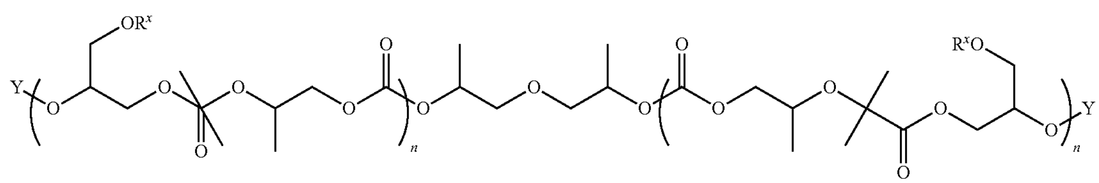

wherein each of —Y, $R^x$, and n is as defined above and described in classes and subclasses herein.

In certain embodiments, aliphatic polycarbonate polyols comprise:

P2l

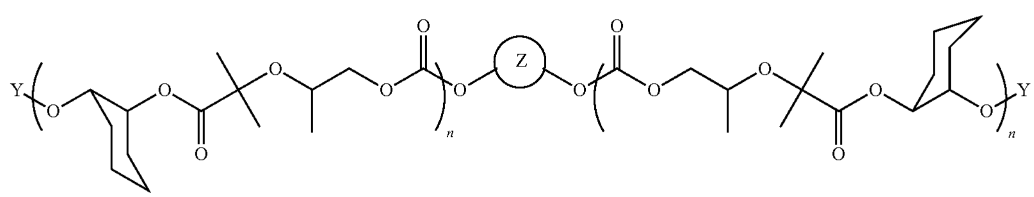

wherein each of

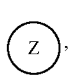

—Y, and n is as defined above and described in classes and subclasses herein.

In certain embodiments, aliphatic polycarbonate polyols comprise:

P2l-a

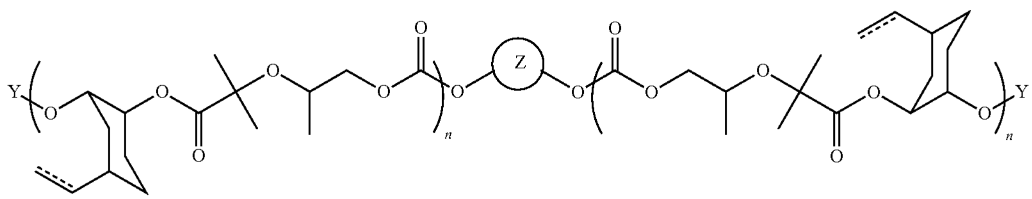

wherein each of

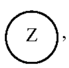,

—Y, and n are is as defined above and described in classes and subclasses herein; and each == independently represents a single or double bond.

In certain embodiments, aliphatic polycarbonate polyols comprise:

P2m

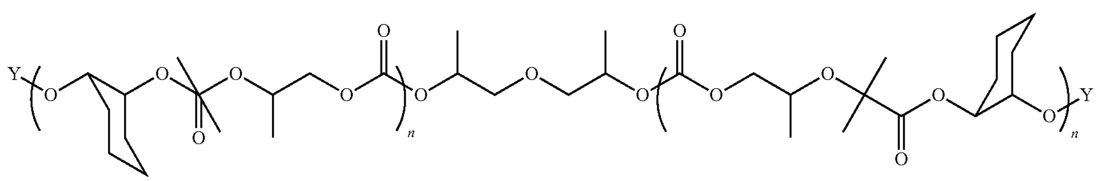

wherein each of —Y and n is as defined above and described in classes and subclasses herein.

In certain embodiments, aliphatic polycarbonate polyols comprise:

P2m-a

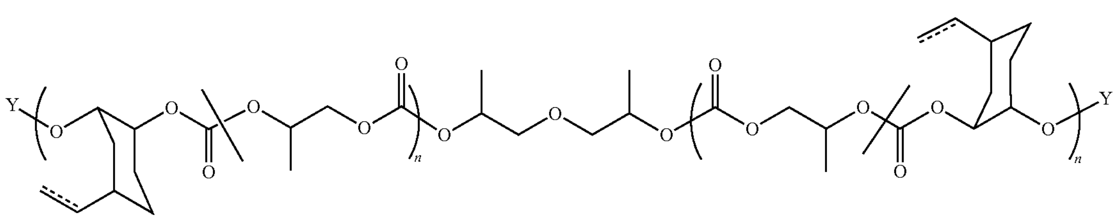

wherein each of —Y, == , and n is as defined above and described in classes and subclasses herein.

In certain embodiments, aliphatic polycarbonate polyols comprise:

P2n

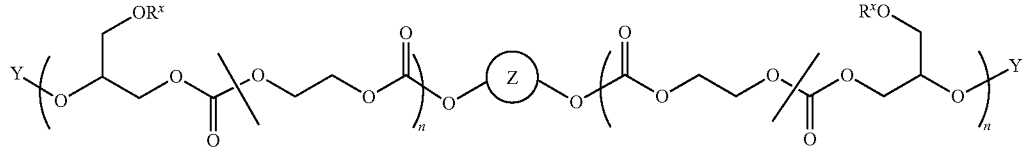

wherein each of

—Y and n is as defined above and described in classes and subclasses herein.

In certain embodiments, aliphatic polycarbonate polyols comprise:

P2o

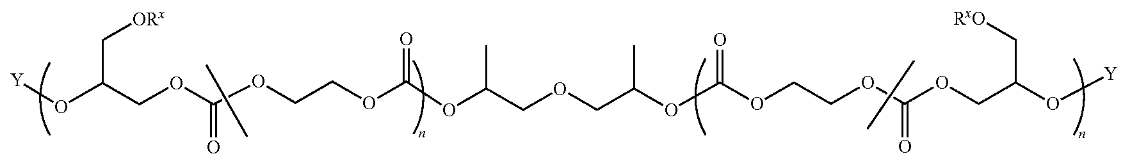

wherein each of —Y, $R^x$, and n is as defined above and described in classes and subclasses herein.

In certain embodiments, aliphatic polycarbonate polyols comprise:

P2p

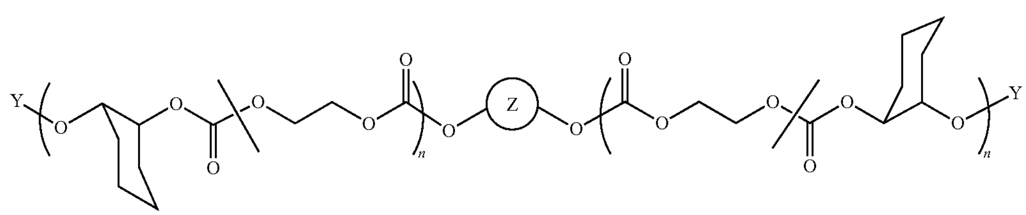

wherein each of

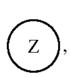

—Y, and n is as defined above and described in classes and subclasses herein.

In certain embodiments, aliphatic polycarbonate polyols comprise:

P2p-a

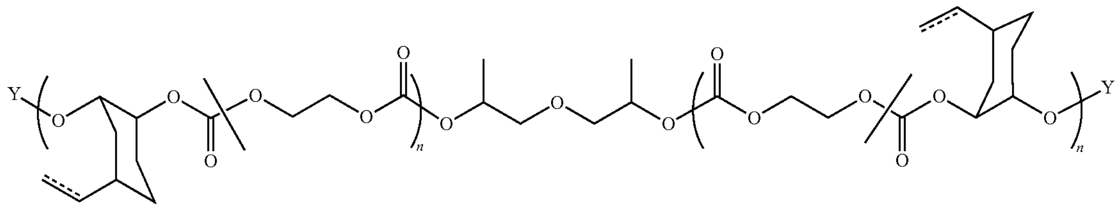

wherein each of —Y, ⎓, and n is as defined above and described in classes and subclasses herein.

In certain embodiments, aliphatic polycarbonate polyols comprise:

P2q

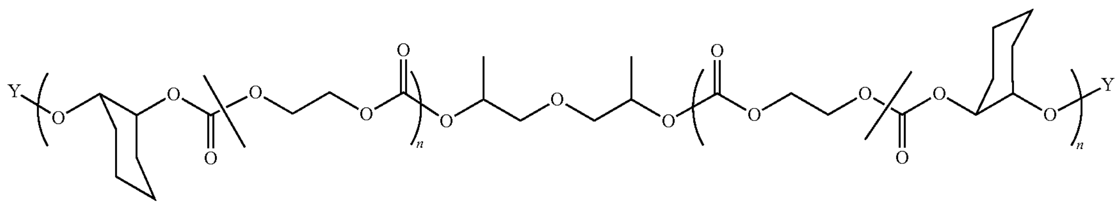

wherein each of —Y and n is as defined above and described in classes and subclasses herein.

In certain embodiments, aliphatic polycarbonate polyols comprise:

P2q-a

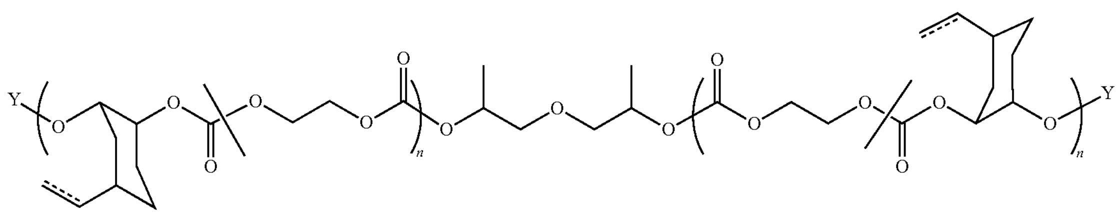

wherein each of —Y, ⎓, and n is as defined above and described in classes and subclasses herein.

In certain embodiments, aliphatic polycarbonate polyols comprise:

P2r

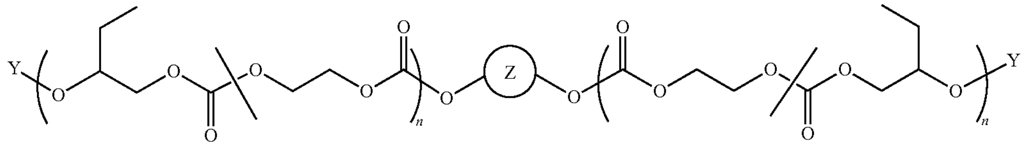

wherein each of

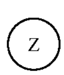

—Y, and n is as defined above and described in classes and subclasses herein.

In certain embodiments, aliphatic polycarbonate polyols comprise:

P2r-a

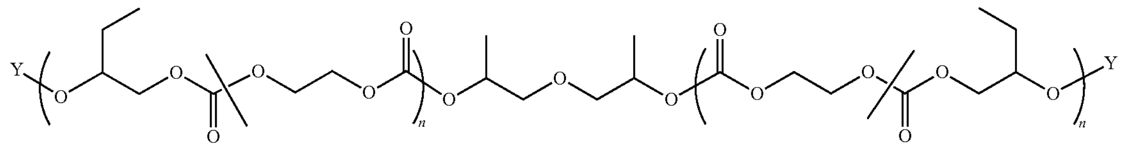

wherein each of —Y and n is as defined above and described in classes and subclasses herein.

In certain embodiments, in aliphatic polycarbonate polyols of structures P2a, P2c, P2d, P2f, P2h, P2j, P2l, P2l-a, P2n, P2p, and P2r,

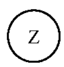

is selected from the group consisting of: ethylene glycol; diethylene glycol, triethylene glycol, 1,3 propane diol; 1,4 butane diol, hexylene glycol, 1,6 hexane diol, neopentyl glycol, propylene glycol, dipropylene glycol, tripropylene glycol, and alkoxylated derivatives of any of these.

In certain embodiments, in aliphatic polycarbonates of structures P2a, through P2r-a, —Y is —H.

For polycarbonates comprising repeat units derived from two or more epoxides, such as those represented by structures P2f through P2r-a, depicted above, it is to be understood that the structures drawn may represent mixtures of positional isomers or regioisomers that are not explicitly depicted. For example, the polymer repeat unit adjacent to either end group of the polycarbonate chains can be derived from either one of the two epoxides comprising the copolymers. Thus, while the polymers may be drawn with a particular repeat unit attached to an end group, the terminal repeat units might be derived from either of the two epoxides and a given polymer composition might comprise a mixture of all of the possibilities in varying ratios. The ratio of these end-groups can be influenced by several factors including the ratio of the different epoxides used in the polymerization, the structure of the catalyst used, the reaction conditions used (i.e temperature pressure, etc.) as well as by the timing of addition of reaction components. Similarly, while the drawings above may show a defined regiochemistry for repeat units derived from substituted epoxides, the polymer compositions will, in some cases, contain mixtures of regioisomers. The regioselectivity of a given polymerization can be influenced by numerous factors including the structure of the catalyst used and the reaction conditions employed. To clarify, this means that the composition represented by structure P2r above, may contain a mixture of several compounds as shown in the diagram below. This diagram shows the isomers graphically for polymer P2r, where the structures below the depiction of the chain show each regio- and positional isomer possible for the monomer unit adjacent to the chain transfer agent and the end groups on each side of the main polymer chain. Each end group on the polymer may be independently selected from the groups shown on the left or right while the central portion of the polymer including the chain transfer agent and its two adjacent monomer units may be independently selected from the groups shown. In certain embodiments, the polycarbonate polyol composition comprises a mixture of all possible combinations of these. In other embodiments, the polycarbonate polyol composition is enriched in one or more of these.

P2r

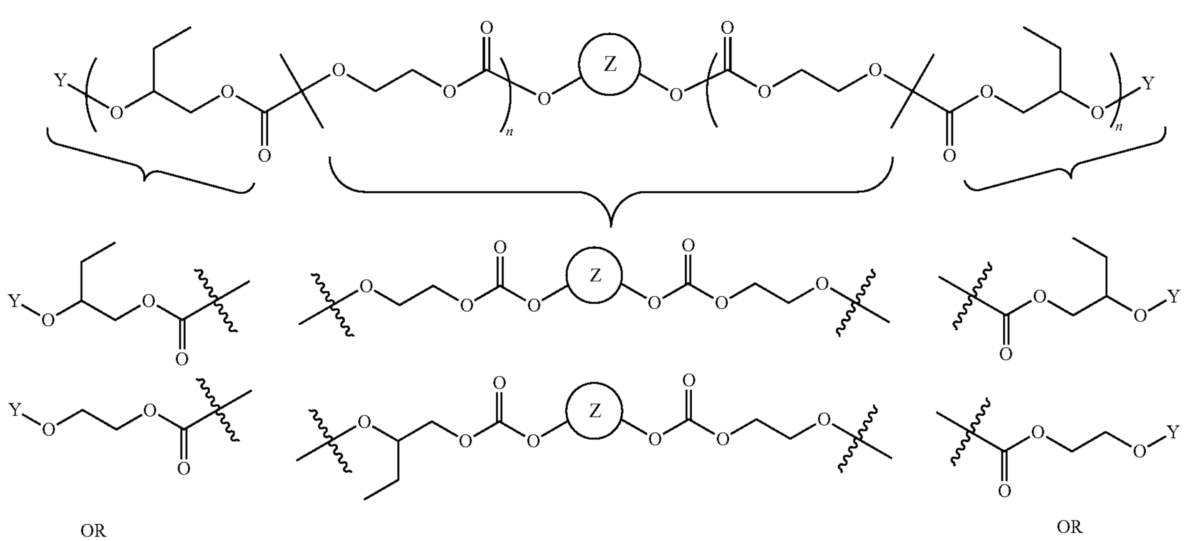

-continued
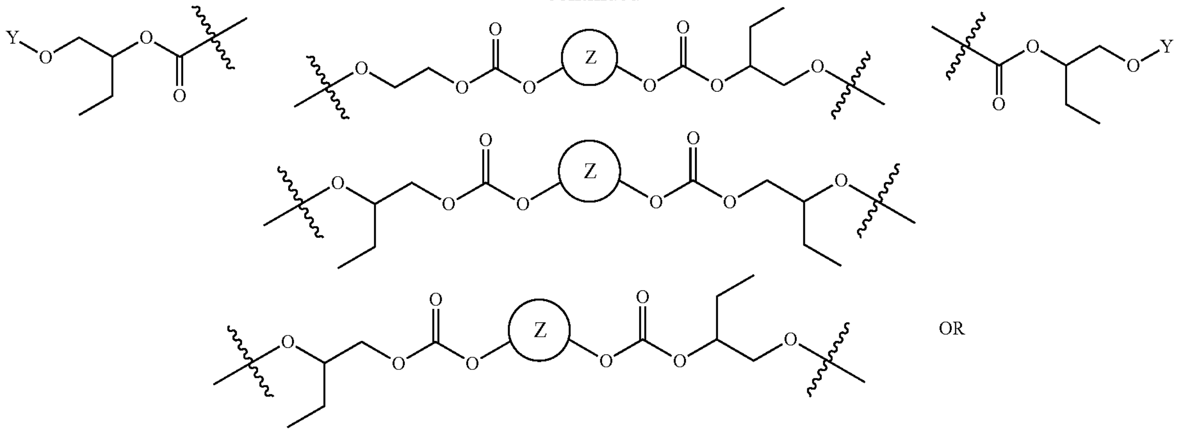
OR
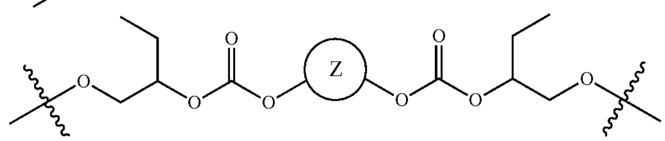
In certain embodiments, aliphatic polycarbonate polyols are selected from the group consisting of Q1, Q2, Q3, Q4, Q5, Q6, and mixtures of any two or more of these.
Q1
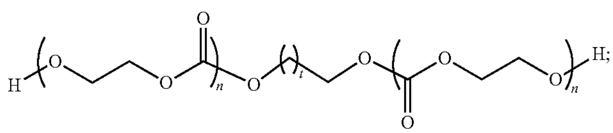
Q2
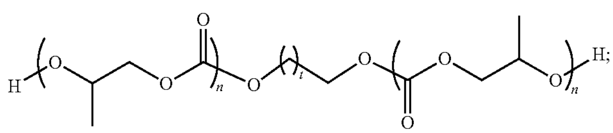
Q3
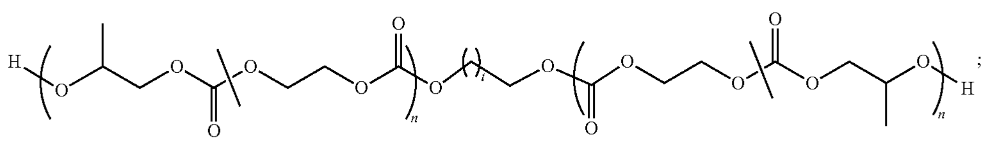
Q4
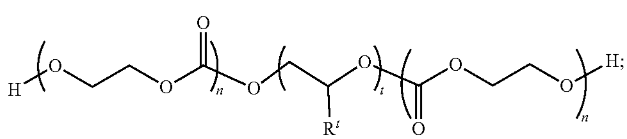
Q5
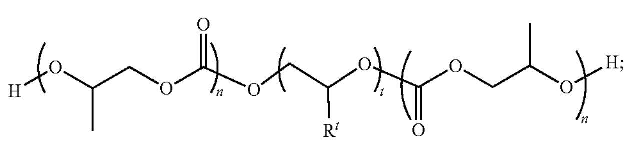
and
Q6
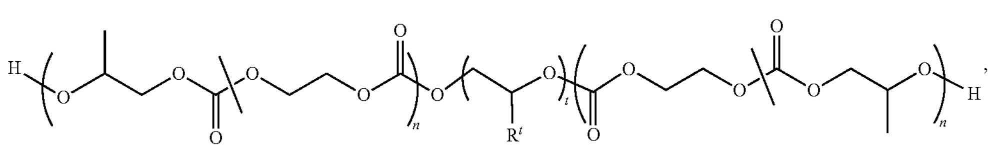
wherein, t is an integer from 1 to 12 inclusive, and $R^t$ is independently at each occurrence —H, or —$CH_3$.

In certain embodiments, an aliphatic polycarbonate polyol is selected from the group consisting of:

Poly(ethylene carbonate) of formula Q1 having an average molecular weight number of between about 500 g/mol and about 3,000 g/mol, a polydispersity index less than about 1.25, at least 85% carbonate linkages, and at least 98% —OH end groups;

Poly(ethylene carbonate) of formula Q1 having an average molecular weight number of about 500 g/mol, a polydispersity index less than about 1.25, at least 85% carbonate linkages, and at least 98% —OH end groups;

Poly(ethylene carbonate) of formula Q1 having an average molecular weight number of about 1,000 g/mol, a polydispersity index less than about 1.25, at least 85% carbonate linkages, and at least 98% —OH end groups;

Poly(ethylene carbonate) of formula Q1 having an average molecular weight number of about 2,000 g/mol, a polydispersity index less than about 1.25, at least 85% carbonate linkages, and at least 98% —OH end groups;

Poly(ethylene carbonate) of formula Q1 having an average molecular weight number of about 3,000 g/mol, a polydispersity index less than about 1.25, at least 85% carbonate linkages, and at least 98% —OH end groups;

Poly(propylene carbonate) of formula Q2 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q2 having an average molecular weight number of about 500 g/mol, a polydispersity index less than about 1.25, at least 95% carbonate linkages, and at least 98% —OH end groups;

Poly(propylene carbonate) of formula Q2 having an average molecular weight number of about 1,000 g/mol, a polydispersity index less than about 1.25, at least 95% carbonate linkages, and at least 98% —OH end groups;

Poly(propylene carbonate) of formula Q2 having an average molecular weight number of about 2,000 g/mol, a polydispersity index less than about 1.25, at least 95% carbonate linkages, and at least 98% —OH end groups;

Poly(propylene carbonate) of formula Q2 having an average molecular weight number of about 3,000 g/mol, a polydispersity index less than about 1.25, at least 95% carbonate linkages, and at least 98% —OH end groups;

Poly(ethylene-co-propylene carbonate) of formula Q3 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q3 having an average molecular weight number of about 500 g/mol, a polydispersity index less than about 1.25, at least 90% carbonate linkages, and at least 98% —OH end groups;

Poly(ethylene-co-propylene carbonate) of formula Q3 having an average molecular weight number of about 1,000 g/mol, a polydispersity index less than about 1.25, at least 90% carbonate linkages, and at least 98% —OH end groups;

Poly(ethylene-co-propylene carbonate) of formula Q3 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q3 having an average molecular weight number of about 3,000 g/mol, a polydispersity index less than about 1.25, at least 95% carbonate linkages, and at least 98% —OH end groups;

Poly(ethylene carbonate) of formula Q4 having an average molecular weight number of between about 500 g/mol and about 3,000 g/mol (e.g. each n is between about 4 and about 16), a polydispersity index less than about 1.25, at least 95% carbonate linkages, and at least 98% —OH end groups;

Poly(ethylene carbonate) of formula Q4 having an average molecular weight number of about 500 g/mol, a polydispersity index less than about 1.25, at least 85% carbonate linkages, and at least 98% —OH end groups;

Poly(ethylene carbonate) of formula Q4 having an average molecular weight number of about 1,000 g/mol, a polydispersity index less than about 1.25, at least 85% carbonate linkages, and at least 98% —OH end groups;

Poly(ethylene carbonate) of formula Q4 having an average molecular weight number of about 2,000 g/mol, a polydispersity index less than about 1.25, at least 85% carbonate linkages, and at least 98% —OH end groups;

Poly(ethylene carbonate) of formula Q4 having an average molecular weight number of about 3,000 g/mol, a polydispersity index less than about 1.25, at least 85% carbonate linkages, and at least 98% —OH end groups.

Poly(propylene carbonate) of formula Q5 having an average molecular weight number of between about 500 g/mol and about 3,000 g/mol, a polydispersity index less than about 1.25, at least 95% carbonate linkages, and at least 98% —OH end groups;

Poly(propylene carbonate) of formula Q5 having an average molecular weight number of about 500 g/mol, a polydispersity index less than about 1.25, at least 95% carbonate linkages, and at least 98% —OH end groups;

Poly(propylene carbonate) of formula Q5 having an average molecular weight number of about 1,000 g/mol, a polydispersity index less than about 1.25, at least 95% carbonate linkages, and at least 98% —OH end groups;

Poly(propylene carbonate) of formula Q5 having an average molecular weight number of about 2,000 g/mol, a polydispersity index less than about 1.25, at least 95% carbonate linkages, and at least 98% —OH end groups;

Poly(propylene carbonate) of formula Q5 having an average molecular weight number of about 3,000 g/mol, a polydispersity index less than about 1.25, at least 95% carbonate linkages, and at least 98% —OH end groups;

Poly(ethylene-co-propylene carbonate) of formula Q6 having an average molecular weight number of between about 500 g/mol and about 3,000 g/mol, a polydispersity index less than about 1.25, at least 90% carbonate linkages, and at least 98% —OH end groups;

Poly(ethylene-co-propylene carbonate) of formula Q6 having an average molecular weight number of about 500 g/mol, a polydispersity index less than about 1.25, at least 90% carbonate linkages, and at least 98% —OH end groups;

Poly(ethylene-co-propylene carbonate) of formula Q6 having an average molecular weight number of about 1,000 g/mol, a polydispersity index less than about 1.25, at least 90% carbonate linkages, and at least 98% —OH end groups;

Poly(ethylene-co-propylene carbonate) of formula Q6 having an average molecular weight number of about 2,000 g/mol (e.g. n is on average between about 10 and about 11), a polydispersity index less than about 1.25, at least 90% carbonate linkages, and at least 98% —OH end groups;

Poly(ethylene-co-propylene carbonate) of formula Q6 having an average molecular weight number of about 3,000 g/mol, a polydispersity index less than about 1.25, at least 95% carbonate linkages, and at least 98% —OH end groups; and Mixtures of any two or more of these.

In certain embodiments, the

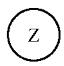

in the embedded chain transfer agent is a moiety derived from a polymeric diol or higher polyhydric alcohol. In certain embodiments, such polymeric alcohols are polyether or polyester polyols. In certain embodiments

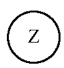

is a polyether polyol comprising ethylene glycol or propylene glycol repeating units (—$OCH_2CH_2O$—, or —$OCH_2CH(CH_3)O$—) or combinations of these. In certain embodiments,

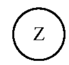

is a polyester polyol comprising the reaction product of a diol and a diacid, or a material derived from ring-opening polymerization of one or more lactones.

In certain embodiments where

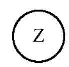

comprises a polyether diol, an aliphatic polycarbonate polyol has a structure Q7:

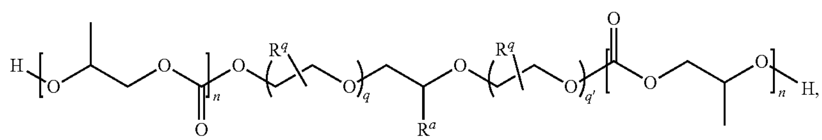

Q7 wherein, $R^q$ is at each occurrence in the polymer chain independently —H or —$CH_3$;

$R^a$ is —H, or —$CH_3$;

q and q' are independently an integer from about 0 to about 40; and and n is as defined above and in the examples and embodiments herein.

In certain embodiments, an aliphatic polycarbonate polyol is selected from the group consisting of:

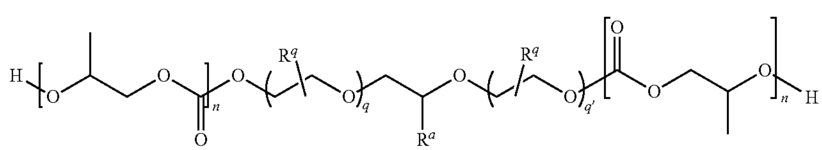

Q7a

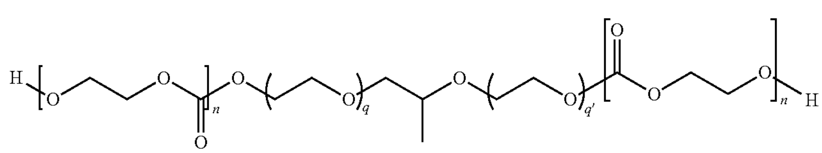

Q7b

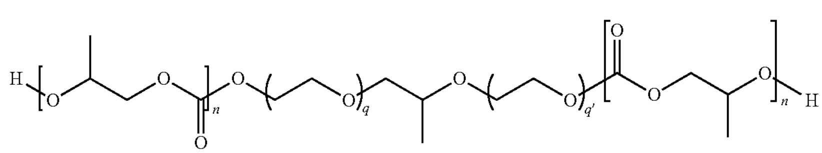

Q7c

-continued

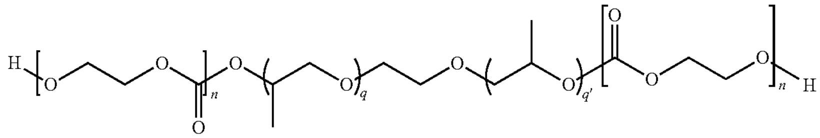

Q7d

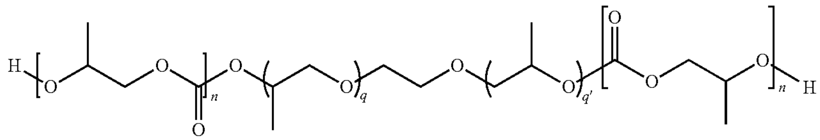

Q7e

In certain embodiments, where aliphatic polycarbonate polyols comprise polymer chains conforming to structure Q7, the moiety

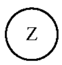

is derived from a commercially available polyether polyol such as those typically used in the formulation of polyurethane compositions.

In certain embodiments, where

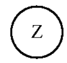

comprises a polyester diol, an aliphatic polycarbonate polyol has a structure Q8:

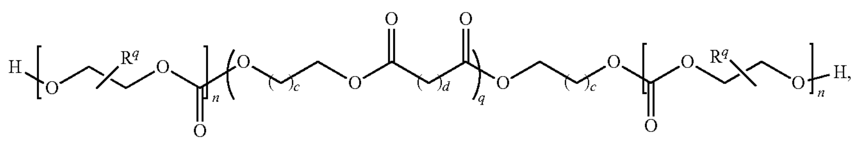

Q8 wherein, c at each occurrence in the polymer chain independently is an integer from 0 to 6;

d at each occurrence in the polymer chain independently is an integer from 1 to 11; and each of $R^q$, n, and q is as defined above and in the examples and embodiments herein.

In certain embodiments, an aliphatic polycarbonate polyol is selected from the group consisting of:

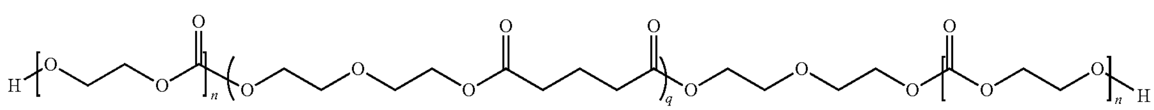

Q8a

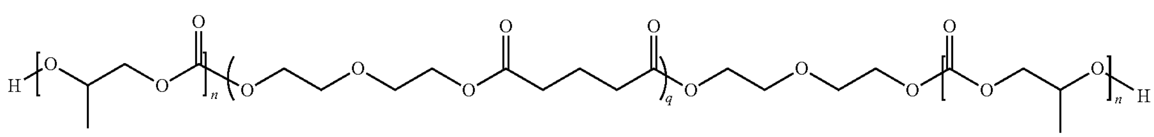

Q8b

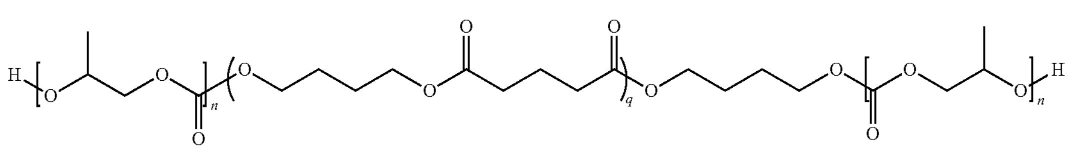

Q8c

-continued

Q8d

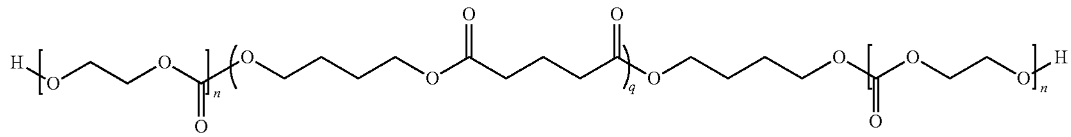

Q8e

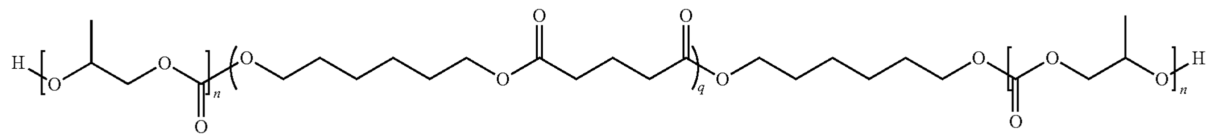

Q8f

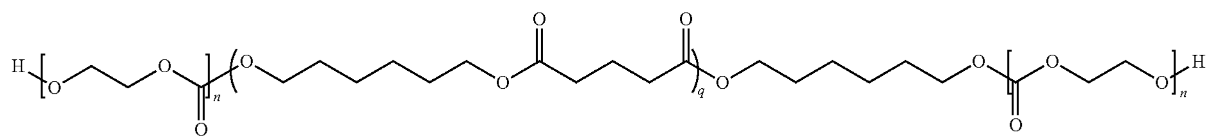

In certain embodiments, where aliphatic polycarbonate polyols comprise polymer chains conforming to structure Q8, the moiety

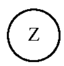

is derived from a commercially available polyester polyol such as those typically used in the formulation of polyurethane compositions.

In certain embodiments, aliphatic polycarbonate polyols have a structure PS1:

PS1

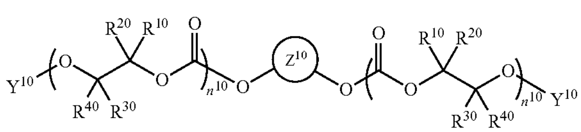

wherein, $R^{10}$, $R^{20}$, $R^{30}$, and $R^{40}$ are, at each occurrence in the polymer chain, independently selected from the group consisting of —H, fluorine, an optionally substituted $C_{1-30}$ aliphatic group, an optionally substituted $C_{1-40}$ heteroaliphatic group, and an optionally substituted aryl group, where any two or more of $R^{10}$, $R^{20}$, $R^{30}$, and $R^{40}$ may optionally be taken together with intervening atoms to form one or more optionally substituted rings optionally containing one or more heteroatoms;

$Y^{10}$ is, at each occurrence, independently —H, a reactive group (as defined hereinabove), or a site of attachment to any of the chain-extending moieties or isocyanates described in the classes and subclasses herein;

$n^{10}$ is, at each occurrence, independently an integer from about 2 to about 50; and

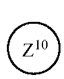

is selected from the group consisting of an optionally substituted bivalent $C_{1-6}$ hydrocarbon chain and

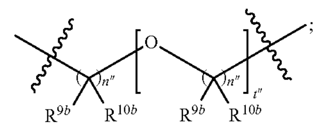

$R^{9b}$ and $R^{10b}$ are, at each occurrence in the polymer chain, independently selected from the group consisting of hydrogen and optionally substituted $C_{1-6}$ aliphatic;

each n" is, at each occurrence within a polymer chain, independently an integer from 1 to 4; and each t" is, at each occurrence within a polymer chain, independently an integer from 1 to 3.

In some embodiments, $R^{10}$, $R^{20}$, $R^{30}$, and $R^{40}$ are, at each occurrence in the polymer chain, independently selected from the group consisting of hydrogen and optionally substituted $C_{1-6}$ aliphatic. In some embodiments, $R^{10}$, $R^{20}$, $R^{30}$, and $R^{40}$ are, at each occurrence in the polymer chain, independently selected from the group consisting of hydrogen and methyl. In some embodiments, each of $R^{10}$, $R^{20}$, $R^{30}$, and $R^{40}$ is hydrogen.

In some embodiments, each

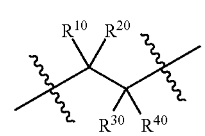

in the structures herein is independently selected from the group consisting of:

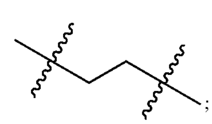

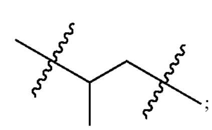

-continued
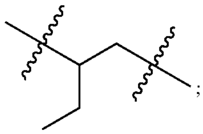
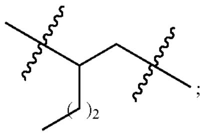
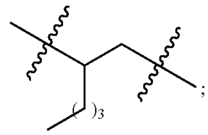
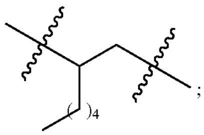
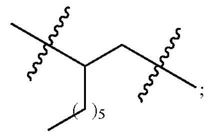
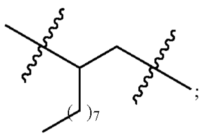
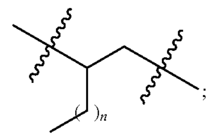
n = 9-30
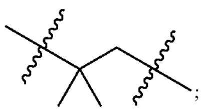
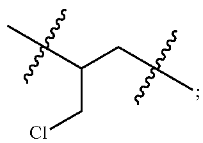
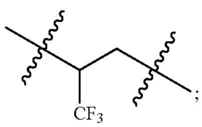
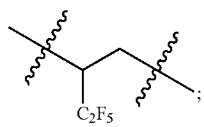
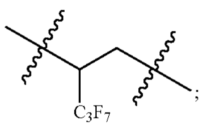
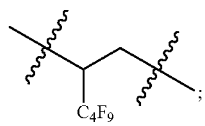
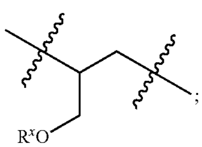
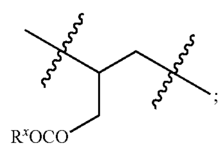
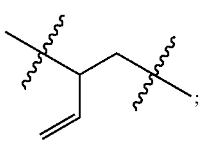
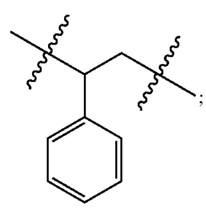
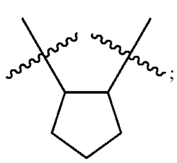
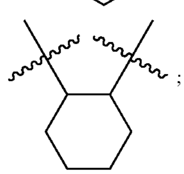
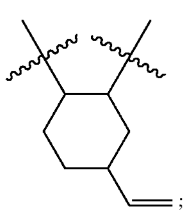
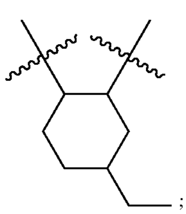
-continued
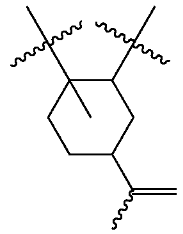
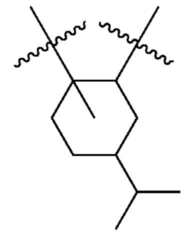
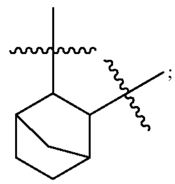
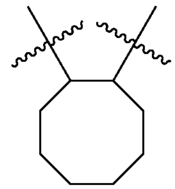
and
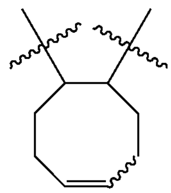
wherein each $R^x$ is as defined above and described herein.
In certain embodiments, each
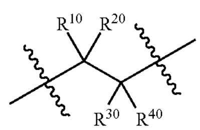
in the structures herein is independently selected from the group consisting of:
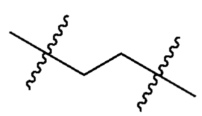
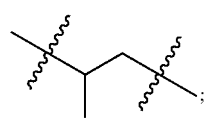
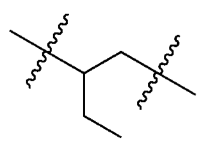
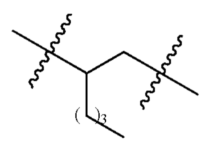
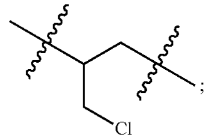
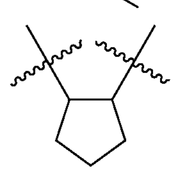
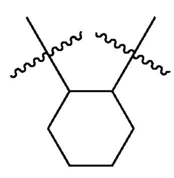
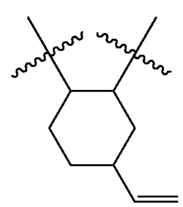

-continued

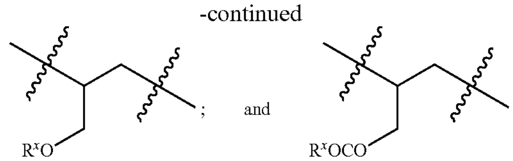

wherein $R^x$ is as defined above and described in classes and subclasses herein.

In certain embodiments, each

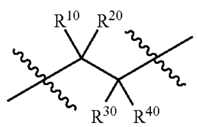

in the structures herein is

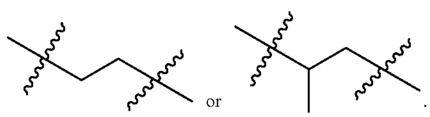

In certain embodiments, each

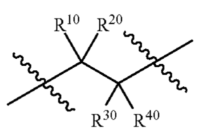

in the structures herein is

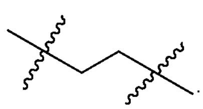 [SMILES: *CC*]

In certain embodiments, each

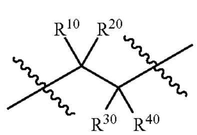

in the structures herein is

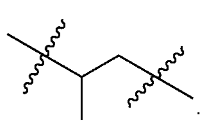 [SMILES: *CC(*)C]

In some embodiments, $Y^{10}$ is, at each occurrence, independently —H, a reactive group, or a site of attachment to any of the chain-extending moieties or isocyanates. In some embodiments, $Y^{10}$ is, at each occurrence, independently —H or a site of attachment to a chain-extending moiety. In some embodiments, $Y^{10}$ is, at each occurrence, independently —H. In some embodiments, $Y^{10}$ is, at each occurrence, independently a reactive group. In some embodiments, $Y^{10}$ is, at each occurrence, independently a site of attachment to a chain-extending moiety. In some embodiments, $Y^{10}$ is, at each occurrence, independently a site of attachment to an isocyanate.

In some embodiments, each $n^{10}$ is, at each occurrence, independently an integer from about 2 to about 20. In some embodiments, each $n^{10}$ is, at each occurrence, independently an integer from about 2 to about 15. In some embodiments, each $n^{10}$ is, at each occurrence, independently an integer from about 2 to about 10. In some embodiments, each $n^{10}$ is, at each occurrence, independently an integer from about 3 to about 7. In some embodiments, each $n^{10}$ is, at each occurrence, independently an integer from about 4 to about 5.

In some embodiments, the sum of the $n^{10}$ moieties within each polymer chain is between about 6 to about 12. In some embodiments, the sum of the $n^{10}$ moieties within each polymer chain is between about 7 to about 11. In some embodiments, the sum of the $n^{10}$ moieties within each polymer chain is between about 8 to about 10. In some embodiments, the sum of the $n^{10}$ moieties within each polymer chain is about 9.

In some embodiments,

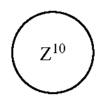

is selected from the group consisting of an optionally substituted bivalent $C_{1-6}$ hydrocarbon chain and

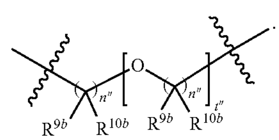

In some embodiments,

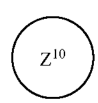

is an optionally substituted bivalent $C_{1-6}$ hydrocarbon chain. In some embodiments,

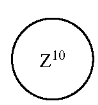

is a bivalent $C_{1-6}$ hydrocarbon chain. In some embodiments,

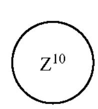

is a bivalent $C_{1-4}$ hydrocarbon chain. In some embodiments,

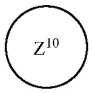

is a bivalent $C_{2-6}$ hydrocarbon chain. In some embodiments,

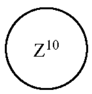

is a bivalent $C_{3-6}$ hydrocarbon chain.

In some embodiments,

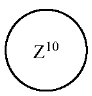

is

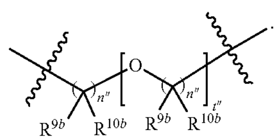

In some embodiments, $R^{9b}$ and $R^{10b}$ are, at each occurrence in the polymer chain, independently selected from the group consisting of hydrogen and optionally substituted $C_{1-6}$ aliphatic. In some embodiments, $R^{9b}$ and $R^{10b}$ are, at each occurrence in the polymer chain, independently selected from the group consisting of hydrogen and methyl. In some embodiments, $R^{9b}$ is, at each occurrence in the polymer chain, independently selected from the group consisting of hydrogen and methyl. In some embodiments, $R^{9b}$ is, at each occurrence in the polymer chain, independently hydrogen. In some embodiments, $R^{9b}$ is, at each occurrence in the polymer chain, independently methyl. In some embodiments, $R^{10b}$ is, at each occurrence in the polymer chain, independently selected from the group consisting of hydrogen and methyl. In some embodiments, $R^{10b}$ is, at each occurrence in the polymer chain, independently hydrogen. In some embodiments, $R^{10b}$ is, at each occurrence in the polymer chain, independently methyl.

In some embodiments, each n" is, at each occurrence within a polymer chain, independently an integer from 1 to 4. In some embodiments, each n" is, at each occurrence within a polymer chain, independently an integer from 2 to 4. In some embodiments, each n" is, at each occurrence within a polymer chain, independently an integer from 3 to 4. In some embodiments, each n" is, at each occurrence within a polymer chain, independently 1. In some embodiments, each n" is, at each occurrence within a polymer chain, independently 2. In some embodiments, each n" is, at each occurrence within a polymer chain, independently 3. In some embodiments, each n" is, at each occurrence within a polymer chain, independently 4.

In some embodiments, each t" is, at each occurrence within a polymer chain, independently an integer from 1 to 3. In some embodiments, each t" is, at each occurrence within a polymer chain, independently an integer from 2 to 3. In some embodiments, each t" is, at each occurrence within a polymer chain, independently 1. In some embodiments, each t" is, at each occurrence within a polymer chain, independently 2. In some embodiments, each t" is, at each occurrence within a polymer chain, independently 3.

In certain embodiments, where aliphatic polycarbonate polyol chains have a structure PS1,

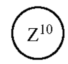

is derived from a dihydric alcohol. In such instances,

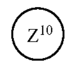

represents the carbon-containing backbone of the dihydric alcohol, while the two oxygen atoms adjacent to

are derived from the —OH groups of the diol. For example, if the polyfunctional chain transfer agent were ethylene glycol, then

would be $—CH_2CH_2—$ and PS1 would have the following structure:

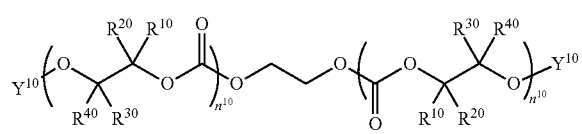

In certain embodiments where

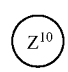

is derived from a dihydric alcohol, the dihydric alcohol comprises a $C_{2-6}$ diol. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol, and alkoxylated derivatives of any of these. In certain embodiments, the dihydric alcohol is selected from the group consisting of: 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, 1,6-hexanediol.

In certain embodiments, where

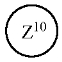

is derived from a dihydric alcohol, the dihydric alcohol is selected from the group consisting of: diethylene glycol, triethylene glycol, tetraethylene glycol, dipropylene glycol, and tripropylene glycol. In some embodiments,

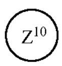

is derived from dipropylene glycol.

It will be understood that when a composition that comprises an aliphatic polycarbonate polyol has a structure of formula PS1, the composition may also comprise other polymer species, e.g., those with occurrences where $n^{10}$ is 0 or 1.

In certain embodiments, aliphatic polycarbonate polyols have a structure PS2:

PS2

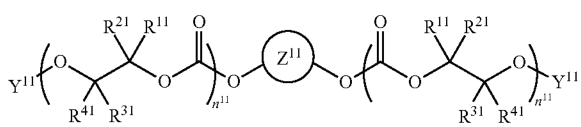

wherein, $R^D$, $R^{21}$, $R^{31}$, and $R^{41}$ are, at each occurrence in the polymer chain, independently selected from the group consisting of —H, fluorine, an optionally substituted $C_{1-30}$ aliphatic group, an optionally substituted $C_{1-40}$ heteroaliphatic group, and an optionally substituted aryl group, where any two or more of $R^{11}$, $R^{21}$, $R^{31}$, and $R^{41}$ may optionally be taken together with intervening atoms to form one or more optionally substituted rings optionally containing one or more heteroatoms;

$Y^{11}$ is, at each occurrence, independently —H, a reactive group (as defined hereinabove), or a site of attachment to any of the chain-extending moieties or isocyanates described in the classes and subclasses herein;

$n^{11}$, is at each occurrence, independently an integer from about 2 to about 50; and

is a polyether.

In some embodiments, $R^{11}$, $R^{21}$, $R^{31}$, and $R^{41}$ are, at each occurrence in the polymer chain, independently selected from the group consisting of hydrogen and optionally substituted $C_{1-6}$ aliphatic. In some embodiments, $R^{11}$, $R^{21}$, $R^{31}$, and $R^{41}$ are, at each occurrence in the polymer chain, independently selected from the group consisting of hydrogen and methyl. In some embodiments, each of $R^{11}$, $R^{21}$, $R^{31}$, and $R^{41}$ is hydrogen.

In some embodiments, each

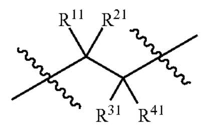

in the structures herein is independently selected from the group consisting of:

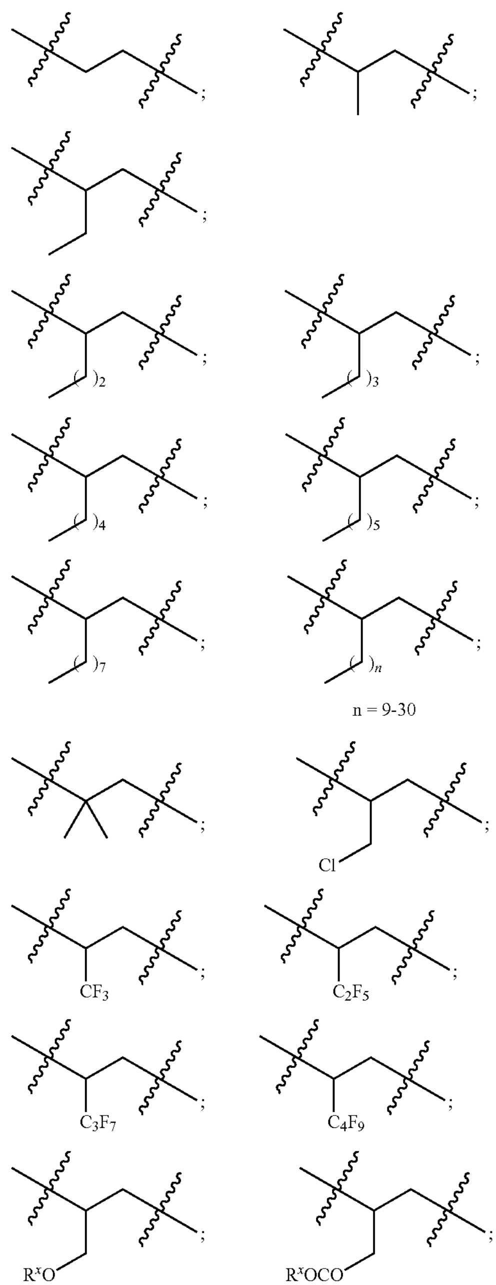

-continued

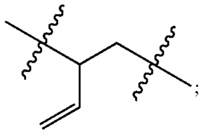
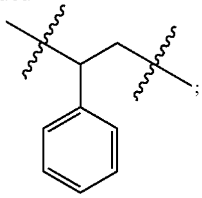
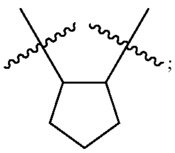
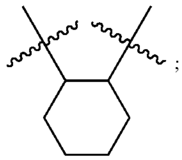
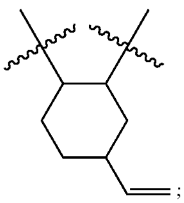
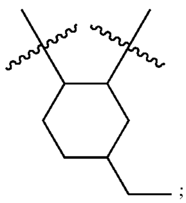
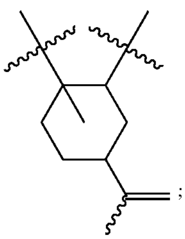
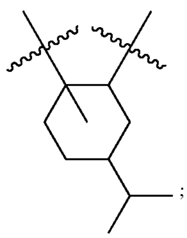
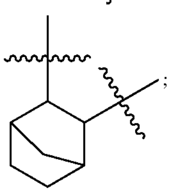
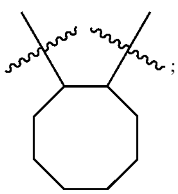

and

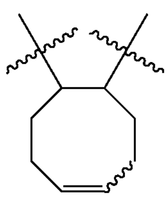

wherein each $R^x$ is as defined above and described herein.

In certain embodiments, each

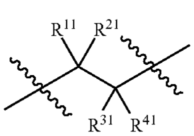

in the structures herein is independently selected from the group consisting of:

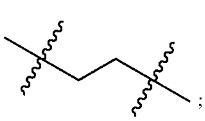
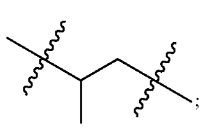

-continued

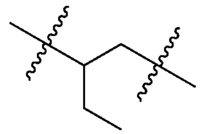
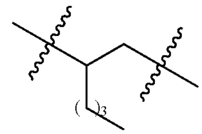
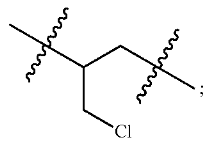
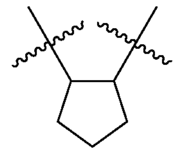
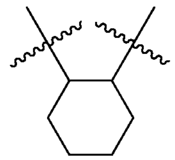
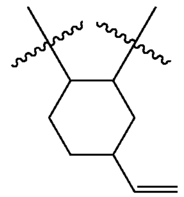
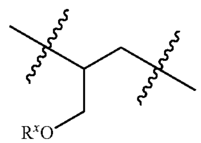

and

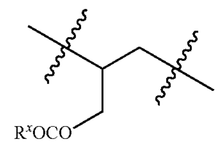

wherein $R^x$ is as defined above and described in classes and subclasses herein.

In certain embodiments, each

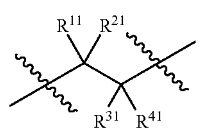

in the structures herein is

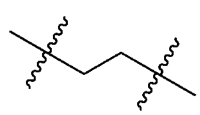

or

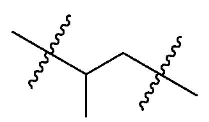

In certain embodiments, each

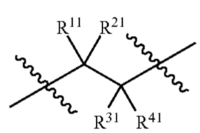

in the structures herein is

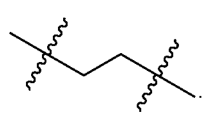 [SMILES: *CC*]

In certain embodiments, each

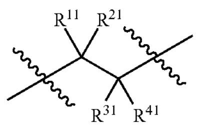

in the structures herein is

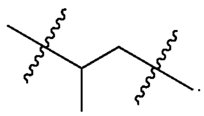 [SMILES: *CC(*)C]

In some embodiments, $Y^{11}$ is, at each occurrence, independently —H, a reactive group, or a site of attachment to any of the chain-extending moieties or isocyanates. In some embodiments, $Y^{11}$ is, at each occurrence, independently —H or a site of attachment to a chain-extending moiety. In some embodiments, $Y^{11}$ is, at each occurrence, independently —H. In some embodiments, $Y^{11}$ is, at each occurrence, independently a reactive group. In some embodiments, $Y^{11}$ is, at each occurrence, independently a site of attachment to a chain-extending moiety. In some embodiments, $Y^{11}$ is, at each occurrence, independently a site of attachment to an isocyanate.

In some embodiments, each $n^{11}$ is, at each occurrence, independently an integer from about 2 to about 20. In some embodiments, each $n^{11}$ is, at each occurrence, independently an integer from about 2 to about 15. In some embodiments, each $n^{11}$ is, at each occurrence, independently an integer from about 2 to about 10. In some embodiments, each $n^{11}$ is, at each occurrence, independently an integer from about 3 to about 7. In some embodiments, each $n^{11}$ is, at each occurrence, independently an integer from about 4 to about 6. In some embodiments, each $n^{11}$ is, at each occurrence, independently about 5.

In some embodiments, the sum of the $n^{11}$ moieties within each polymer chain is between about 5 to about 15. In some embodiments, the sum of the $n^{11}$ moieties within each polymer chain is between about 5 to about 10. In some embodiments, the sum of the $n^{11}$ moieties within each polymer chain is between about 10 to about 15. In some embodiments, the sum of the $n^{11}$ moieties within each polymer chain is between about 8 to about 12. In some embodiments, the sum of the $n^{11}$ moieties within each polymer chain is between about 9 to about 11. In some embodiments, the sum of the $n^{11}$ moieties within each polymer chain is about 10.

In some embodiments,

is a polyether. In some embodiments,

is polyethylene glycol. In some embodiments,

is derived from poly(ethylene glycol) having a $M_n$ between about 234 and about 2000 g/mol. In some embodiments,

is derived from poly(ethylene glycol) having a $M_n$ between about 900 g/mol and 1,100 g/mol. In some embodiments,

is derived from poly(ethylene glycol) having a $M_n$ of about 1000 g/mol.

In some embodiments,

is polypropylene glycol. In some embodiments,

is derived from poly(propylene glycol) having a $M_n$ between about 234 and about 2000 g/mol. In some embodiments,

is derived from poly(propylene glycol) having a $M_n$ between about 900 g/mol and 1,100 g/mol. In some embodiments,

is derived from poly(propylene glycol) having a $M_n$ of about 1000 g/mol.

It will be understood that when a composition that comprises an aliphatic polycarbonate polyol has a structure of formula PS2, the composition may also comprise other polymer species, e.g., those with occurrences where $n^{11}$ is 0 or 1.

In certain embodiments, an aliphatic polycarbonate polyol has a structure of formula

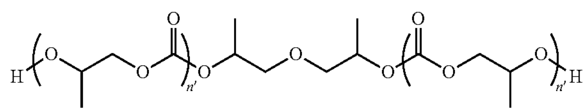

Q10 wherein each n' is, at each occurrence, independently an integer from about 2 to about 50.

In some embodiments, each n' is, at each occurrence, independently an integer from about 2 to about 20. In some embodiments, each n' is, at each occurrence, independently an integer from about 2 to about 15. In some embodiments, each n' is, at each occurrence, independently an integer from about 2 to about 10. In some embodiments, each n' is, at each occurrence, independently an integer from about 3 to about 7. In some embodiments, each n' is, at each occurrence, independently an integer from about 4 to about 5.

In some embodiments, the sum of the n' moieties within each polymer chain is between about 6 to about 12. In some embodiments, the sum of the n' moieties within each polymer chain is between about 7 to about 11. In some embodiments, the sum of the n' moieties within each polymer chain is between about 8 to about 10. In some embodiments, the sum of the n' moieties within each polymer chain is about 9.

It will be understood that when a composition comprising an aliphatic polycarbonate polyol has a structure of formula Q10, the composition may also comprise other polymer species, e.g., those with occurrences where n' is 0 or 1.

In some embodiments, an aliphatic polycarbonate polyol has a structure of formula Q10 and an OH #of between about 105 and about 120, or an OH #of about 112.

In certain embodiments, an aliphatic polycarbonate polyol has a structure of formula

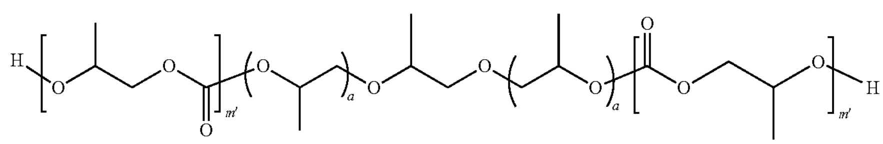

Q11 wherein each a is, at each occurrence, independently an integer from about 2 to about 50; and each m' is, at each occurrence, independently an integer from about 2 to about 50.

In some embodiments, each a is, at each occurrence, independently an integer from about 2 to about 20. In some embodiments, each a is, at each occurrence, independently an integer from about 2 to about 15. In some embodiments, each a is, at each occurrence, independently an integer from about 5 to about 12. In some embodiments, each a is, at each occurrence, independently an integer from about 6 to about 10. In some embodiments, each a is, at each occurrence, independently an integer from about 7 to about 9. In some embodiments, each a is, at each occurrence, about 8.

In some embodiments, the sum of the a moieties within each polymer chain is between about 12 and about 20. In some embodiments, the sum of the a moieties within each polymer chain is between about 14 and about 18. In some embodiments, the sum of the a moieties within each polymer chain is between about 15 and about 17. In some embodiments, the sum of the a moieties within each polymer chain is about 16.

In some embodiments, each m' is, at each occurrence, independently an integer from about 2 to about 20. In some embodiments, each m' is, at each occurrence, independently an integer from about 2 to about 10. In some embodiments, each m' is, at each occurrence, independently an integer from about 3 to about 7. In some embodiments, each m' is, at each occurrence, independently an integer from about 4 to about 6. In some embodiments, each m' is, at each occurrence, independently about 5.

In some embodiments, the sum of the m' moieties within each polymer chain is between about 5 and about 15. In some embodiments, the sum of the m' moieties within each polymer chain is between about 5 and about 10. In some embodiments, the sum of the m' moieties within each polymer chain is between about 10 and about 15. In some embodiments, the sum of the m' moieties within each polymer chain is between about 8 and about 12. In some embodiments, the sum of the m' moieties within each polymer chain is between about 9 and about 11. In some embodiments, the sum of the m' moieties within each polymer chain is about 10.

It will be understood that when a composition comprising an aliphatic polycarbonate polyol has a structure of formula Q11, the composition may also comprise other polymer species, e.g., those with occurrences where m' is 0 or 1.

In some embodiments, an aliphatic polycarbonate polyol has a structure of formula Q11 and an OH #of between about 50 and about 60, or an OH #of about 56.

B. Isocyanate Reagents

As described above, compositions useful in the present invention may be combined with isocyanate reagents to form polyurethane compositions. The purpose of these isocyanate reagents is to react with the reactive end groups on the polyols to form isocyanate-terminated prepolymers or higher molecular weight structures through chain extension and/or cross-linking.

The art of polyurethane synthesis is well advanced and a very large number of isocyanates and related polyurethane precursors are known in the art. While this section of the specification describes isocyanates suitable for use in certain embodiments of the present invention, it is to be understood that it is within the capabilities of one skilled in the art of polyurethane formulation to use alternative isocyanates along with the teachings of this disclosure to formulate additional compositions of matter within the scope of the present invention. Descriptions of suitable isocyanate compounds and related methods can be found in: *Chemistry and Technology of Polyols for Polyurethanes* Ionescu, Mihail 2005 (ISBN 978-1-84735-035-0), and H. Ulrich, "Urethane Polymers," Kirk-Othmer Encyclopedia of Chemical Technology, 1997 the entirety of each of which is incorporated herein by reference.

In certain embodiments, isocyanate reagents comprise two or more isocyanate groups per molecule. In certain embodiments, isocyanate reagents are diisocyanates. In other embodiments, isocyanate reagents are higher polyisocyanates such as triisocyanates, tetraisocyanates, isocyanate polymers or oligomers, and the like, which are typically a minority component of a mix of predominantly diisocyanates. In certain embodiments, isocyanate reagents are aliphatic polyisocyanates or derivatives or oligomers of aliphatic polyisocyanates. In other embodiments, isocyanates are aromatic polyisocyanates or derivatives or oligomers of aromatic polyisocyanates. In certain embodiments, compositions may comprise mixtures of any two or more of the above types of isocyanates.

In certain embodiments, isocyanate reagents usable for the production of the polyurethane adhesive include aliphatic, cycloaliphatic and aromatic diisocyanate compounds.

Suitable aliphatic and cycloaliphatic isocyanate compounds include, for example, 1,3-trimethylene diisocyanate, 1,4-tetramethylene diisocyanate, 1,6-hexamethylene diisocyanate, 2,2,4-trimethylhexamethylene diisocyanate, 2,4,4-trimethylhexamethylene diisocyanate, 1,9-nonamethylene diisocyanate, 1,10-decamethylene diisocyanate, 1,4-cyclohexane diisocyanate, isophorone diisocyanate (IPDI), 4,4,'-dicyclohexylmethane diisocyanate, 2,2'-diethylether diisocyanate, hydrogenated xylylene diisocyanate, and hexamethylene diisocyanate-biuret.

The aromatic isocyanate compounds include, for example, p-phenylene diisocyanate, tolylene diisocyanate, xylylene diisocyanate, 4,4'-diphenyl diisocyanate, 2,4'-diphenylmethane diisocyanate, 1,5-naphthalene diisocyanate, 4,4'-diphenylmethane diisocyanate (MDI), 3,3'-methyleneditolylene-4,4'-diisocyanate, tolylenediisocyanate-trimethylolpropane adduct, triphenylmethane triisocyanate, 4,4'-diphenylether diisocyanate, tetrachlorophenylene diisocyanate, 3,3'-dichloro-4,4'-diphenylmethane diisocyanate, and triisocyanate phenylthiophosphate.

In certain embodiments, an isocyanate compound employed comprises one or more of: 4,4'-diphenylmethane diisocyanate, 1,6-hexamethylene hexamethylene diisocyanate and isophorone diisocyanate (IPDI). In certain embodiments, an isocyanate compound employed is 4,4'-diphenylmethane diisocyanate. In certain embodiments, an isocyanate compound employed is IPDI. The above-mentioned diisocyanate compounds may be employed alone or in mixtures of two or more thereof.

In certain embodiments, an isocyanate reagent is selected from the group consisting of: 1,6-hexamethylaminediisocyanate (HDI), isophorone diisocyanate (IPDI), 4,4' methylene-bis(cyclohexyl isocyanate) ($H_{12}$MDI), 2,4-toluene diisocyanate (TDI), 2,6-toluene diisocyanate (TDI), diphenylmethane-4,4'-diisocyanate (MDI), diphenylmethane-2,4'-diisocyanate (MDI), xylylene diisocyanate (XDI), 1,3-Bis (isocyanatomethyl)cyclohexane (H6-XDI), 2,2,4-trimethylhexamethylene diisocyanate, 2,4,4-trimethylhexamethylene diisocyanate (TMDI), m-tetramethylxylylene diisocyanate (TMXDI), p-tetramethylxylylene diisocyanate (TMXDI), isocyanatomethyl-1,8-ictane diisocyanate (TIN), triphenylmethane-4,4',4"triisocyanate, Tris(p-isocyanatomethyl)thiosulfate, 1,3-Bis (isocyanatomethyl)benzene, 1,4-tetramethylene diisocyanate, trimethylhexane diisocyanate, 1,6-hexamethylene diisocyanate, 1,4-cyclohexyl diisocyanate, lysine diisocyanate, HDI allophonate trimer, HDI urethdione and HDI-trimer and mixtures of any two or more of these.

In certain embodiments, an isocyanate reagent is selected from the group consisting of 4,4'-diphenylmethane diisocyanate, 1,6-hexamethylene diisocyanate and isophorone diisocyanate. In certain embodiments, an isocyanate reagent is 4,4'-diphenylmethane diisocyanate. certain embodiments, an isocyanate reagent is 1,6-hexamethylene diisocyanate. In certain embodiments, an isocyanate reagent is isophorone diisocyanate (IPDI).

Isocyanates suitable for certain embodiments of the present invention are available commercially under various trade names. Examples of suitable commercially available isocyanates include materials sold under trade names: Desmodur® (Bayer Material Science), Tolonate® (Perstorp), Takenate® (Takeda), Vestanat® (Evonik), Desmotherm® (Bayer Material Science), Bayhydur® (Bayer Material Science), Mondur (Bayer Material Science), Suprasec (Huntsman Inc.), Lupranate® (BASF), Trixene (Baxenden), Hartben® (Benasedo), Ucopol® (Sapici), and Basonat® (BASF). Each of these trade names encompasses a variety of isocyanate materials available in various grades and formulations. The selection of suitable commercially available isocyanate materials as reagents to produce polyurethane compositions for a particular application is within the capability of one skilled in the art of polyurethane coating technology using the teachings and disclosure of this patent application along with the information provided in the product data sheets supplied by the above-mentioned suppliers.

Additional isocyanates suitable for certain embodiments of the present invention are sold under the trade name Lupranate® (BASF). In certain embodiments, isocyanates are selected from the group consisting of the materials shown in Table 1, and typically from the subset of isocyanates from this list with the functionality between 1.95 and 2.1.

TABLE 1

| Product | Description | % N CO | Nominal Funct. |
|---|---|---|---|
| Lupranate ® M | 4,4' MDI | 33.5 | 2 |
| Lupranate ® MS | 4,4' MDI | 33.5 | 2 |
| Lupranate ® MI | 2,4' and 4,4' MDI Blend | 33.5 | 2 |
| Lupranate ® LP30 | Liquid Pure 4,4' MDI | 33.1 | 2 |
| Lupranate ® 227 | Monomeric/Modified MDI Blend | 32.1 | 2 |
| | Carbodiimide Modified MDI | | |
| Lupranate ® 5143 | Carboiimide Modified 4,4' MDI | 29.2 | 2.2 |
| Lupranate ® MM103 | Carboiimide Modified 4,4' MDI | 29.5 | 2.2 |
| Lupranate ® 219 | Carboiimide Modified 4,4' MDI | 29.2 | 2.2 |
| Lupranate ® 81 | Carboiimide Modified MDI | 29.5 | 2.2 |
| Lupranate ® 218 | Carboiimide Modified MDI | 29.5 | 2.2 |
| | Polymeric MDI (PMDI) | | |
| Lupranate ® 241 | Low Functionality Polymeric | 32.6 | 2.3 |
| Lupranate ® 230 | Low Viscosity Polymeric | 32.5 | 2.3 |
| Lupranate ® 245 | Low Viscosity Polymeric | 32.3 | 2.3 |
| Lupranate ® TF2115 | Mid Functionality Polymeric | 32.3 | 2.4 |
| Lupranate ® 78 | Mid Functionality Polymeric | 32 | 2.3 |
| Lupranate ® 234 | Low Functionality Polymeric | 32 | 2.4 |
| Lupranate ® 273 | Low Viscosity Polymeric | 32 | 2,5 |
| Lupranate ® 266 | Low Viscosity Polymeric | 32 | 2.5 |
| Lupranate ® 261 | Low Viscosity Polymeric | 32 | 2.5 |
| Lupranate ® 255 | Low Viscosity Polymeric | 31.9 | 2.5 |
| Lupranate ® 268 | Low Viscosity Polymeric | 30.6 | 2.4 |
| | Select MDI Prepolymers | | |
| Lupranate ® 5010 | High Functional Prepolymer | 28.6 | 2.3 |
| Lupranate ® 233 | Low Visc. Derivative ot Pure MDI | 27.5 | 2.2 |
| Lupranate ® 5040 | Mid Functional, Low Viscosity | 26.3 | 2.1 |
| Lupranate ® 5110 | Polymeric MDI Prepolymer | 25.4 | 2.3 |

TABLE 1-continued

| Product | Description | % N CO | Nominal Funct. |
|---|---|---|---|
| Lupranate ® MP102 | 4,4' MDI Prepolymer | 23 | 2 |
| Lupranate ® 5090 | Special 4,4' MDI Prepolymer | 23 | 2.1 |
| Lupranate ® 5050 | Mid Functional, Mid NCO Prepol | 21.5 | 2.1 |
| Lupranate ® 5030 | Special MDI Prepolymer | 18.9 | NA |
| Lupranate ® 5080 | 2,4'-MDI Enhanced Prepolymer | 15.9 | 2 |
| Lupranate ® 5060 | Low Funct, Higher MW Prepol | 15.5 | 2 |
| Lupranate ® 279 | Low Funct, Special Prepolymer | 14 | 2 |
| Lupranate ® 5070 | Special MDI Prepolymer | 13 | 2 |
| Lupranate ® 5020 | Low Functionality, Low NCO | 9.5 | 2 |

TABLE 1-continued

| Product | Description | % N CO | Nominal Funct. |
|---|---|---|---|
| | Toluene Diisocyanate (TDI) | | |
| Lupranate ® T80- | 80/20: 2,4/2,6 TDI | 48.3 | 2 |
| Lupranate ® T80- | High Acidity TDI | 48.3 | 2 |
| Lupranate ® 8020 | 80/20: TDI/Polymeric MDI | 44.6 | 2.1 |

Other isocyanates suitable for certain embodiments of the present invention are sold under the trade name Desmodur® available from Bayer Material Science. In certain embodiments, isocyanates are selected from the group consisting of the materials shown in Table 2, and typically from the subset of isocyanates with functionality between 1.95 and 2.1.

TABLE 2

| Trade Name | Description |
|---|---|
| Desmodur ® 2460 M | Monomeric diphenylmethane diisocyanate with high 2,4'-isomer content |
| Desmodur ® 44 M | A monomeric diphenylmethane-4,4'-diisocyanate (MDI). |
| Desmodur ® 44 MC | Desmodur 44 MC Flakes is a monomeric diphenylmethane-4,4'-diisocyanate (MDI). |
| Desmodur ® BL 1100/1 | Blocked aromatic polyisocyanate based on TDI |
| Desmodur ® BL 1265 MPA/X | Blocked aromatic polyisocyanate based on TDI |
| Desmodur ® BL 3175 SN | Blocked, aliphatic polyisocyanate based on HDI |
| Desmodur ® BL 3272 MPA | Blocked aliphatic polyisocyanate based on HDI |
| Desmodur ® BL 3370 MPA | Blocked aliphatic polyisocyanate based on HDI |
| Desmodur ® BL 3475 BA/SN | Aliphatic crosslinking stoving urethane resin based on HDI/IPDI |
| Desmodur ® BL 3575/1 MPA/SN | Blocked aliphatic polyisocyanate based on HDI |
| Desmodur ® BL 4265 SN | Blocked, aliphatic polyisocyanate based on IPDI |
| Desmodur ® BL 5375 | Blocked aliphatic polyisocyanate based on H 12 MDI |
| Desmodur ® CD-L | Desmodur CD-L is a modified isocyanate based on diphenylmethane-4,4'-diisocyanate. |
| Desmodur ® CD-S | Desmodur CD-S is a modified isocyanate based on diphenylmethane-4,4'-diisocyanate. |
| Desmodur ® D XP 2725 | Hydrophilically modified polyisocyanate |
| Desmodur ® DA-L | Hydrophilic aliphatic polyisocyanate based on hexamethylene diisocyanate |
| Desmodur ® DN | Aliphatic polyisocyanate of low volatility |
| Desmodur ® E 1160 | Aromatic polyisocyanate prepolymer based on toluene diisocyanate |
| Desmodur ® E 1361 BA | Aromatic polyisocyanate prepolymer based on toluylene diisocyanate |
| Desmodur ® E 1361 MPA/X | Aromatic polyisocyanate prepolymer based on toluene diisocyanate |
| Desmodur ® E 14 | Aromatic polyisocyanate prepolymer based on toluene diisocyanate |
| Desmodur ® E 15 | Aromatic polyisocyanate prepolymer based on toluene diisocyanate. |
| Desmodur ® E 1660 | Aromatic polyisocyanate prepolymer based on toluene diisocyanate. |
| Desmodur ® E 1750 PR | Polyisocyanate prepolymer based on toluene diisocyanate |
| Desmodur ® E 20100 | Modified polyisocyanate prepolymer based on diphenylmethane diisocyanate. |
| Desmodur ® E 21 | Aromatic polyisocyanate prepolymer based on diphenylmethane diisocyanate (MDI). |
| Desmodur ® E 2190 X | Aromatic polyisocyanate prepolymer based on diphenylmethane diisocyanate (MDI) |
| Desmodur ® E 22 | Aromatic polyisocyanate prepolymer based on diphenylmethane diisocyanate. |
| Desmodur ® E 2200/76 | Desmodur E 2200/76 is a prepolymer based on (MDI) with isomers. |
| Desmodur ® E 23 | Aromatic polyisocyanate prepolymer based on diphenylmethane diisocyanate (MDI). |
| Desmodur ® E 29 | Polyisocyanate prepolymer based on diphenylmethane diisocyanate. |
| Desmodur ® E 305 | Desmodur E 305 is a largely linear aliphatic NCO prepolymer based on hexamethylene diisocyanate. |
| Desmodur ® E 3265 MPA/SN | Aliphatic polyisocyanate prepolymer based on hexamethylene diisocyanate (HDI) |
| Desmodur ® E 3370 | Aliphatic polyisocyanate prepolymer based on hexamethylene diisocyanate |
| Desmodur ® E XP 2605 | Polyisocyanate prepolymer based on toluene diisocyanate and diphenylmethan diisocyanate |

TABLE 2-continued

| Trade Name | Description |
|---|---|
| Desmodur ® E XP 2605 | Polyisocyanate prepolymer based on toluene diisocyanate and diphenylmethan diisocyanate |
| Desmodur ® E XP 2715 | Aromatic polyisocyanate prepolymer based on 2,4'-diphenylmethane diisocyanate (2,4'-MDI) and a hexanediol |
| Desmodur ® E XP 2723 | Aromatic polyisocyanate prepolymer based on diphenylmethane diisocyanate (MDI). |
| Desmodur ® E XP 2726 | Aromatic polyisocyanate prepolymer based on 2,4'-diphenylmethane diisocyanate (2,4'-MDI) |
| Desmodur ® E XP 2727 | Aromatic polyisocyanate prepolymer based on diphenylmethane diisocyanate. |
| Desmodur ® E XP 2762 | Aromatic polyisocyanate prepolymer based on diphenylmethane diisocyanate (MDI). |
| Desmodur ® H | Monomeric aliphatic diisocyanate |
| Desmodur ® HL | Aromatic/aliphatic polyisocyanate based on toluylene diisocyanate/ hexamethylene diisocyanate |
| Desmodur ® I | Monomeric cycloaliphatic diisocyanate. |
| Desmodur ® IL 1351 | Aromatic polyisocyanate based on toluene diisocyanate |
| Desmodur ® IL 1451 | Aromatic polyisocyanate based on toluene diisocyanate |
| Desmodur ® IL BA | Aromatic polyisocyanate based on toluene diisocyanate |
| Desmodur ® IL EA | Aromatic polyisocyante resin based on toluylene diisocyanate |
| Desmodur ® L 1470 | Aromatic polyisocyanate based on toluene diisocyanate |
| Desmodur ® L 67 BA | Aromatic polyisocyanate based on tolulene diisocyanate |
| Desmodur ® L 67 MPA/X | Aromatic polyisocyanate based on tolulene diisocyanate |
| Desmodur ® L 75 | Aromatic polyisocyanate based on tolulene diisocyanate |
| Desmodur ® LD | Low-functionality isocyanate based on hexamethylene diisocyanate (HDI) |
| Desmodur ® LS 2424 | Monomeric diphenylmethane diisocyanate with high 2,4'-isomer content |
| Desmodur ® MT | Polyisocyanate prepolymer based on diphenylmethane diisocyanate |
| Desmodur ® N 100 | Aliphatic polyisocyanate (HDI biuret) |
| Desmodur ® N 3200 | Aliphatic polyisocyanate (low-viscosity HDI biuret) |
| Desmodur ® N 3300 | Aliphatic polyisocyanate (HDI trimer) |
| Desmodur ® N 3368 BA/SN | Aliphatic polyisocyanate (HDI trimer) |
| Desmodur ® N 3368 SN | Aliphatic polyisocyanate (HDI trimer) |
| Desmodur ® N 3386 BA/SN | Aliphatic polyisocyanate (HDI trimer) |
| Desmodur ® N 3390 BA | Aliphatic polyisocyanate (HDI trimer) |
| Desmodur ® N 3390 BA/SN | Aliphatic polyisocyanate (HDI trimer) |
| Desmodur ® N 3400 | Aliphatic polyisocyanate (HDI uretdione) |
| Desmodur ® N 3600 | Aliphatic polyisocyanate (low-viscosity HDI trimer) |
| Desmodur ® N 3790 BA | Aliphatic polyisocyanate (high functional HDI trimer) |
| Desmodur ® N 3800 | Aliphatic polyisocyanate (flexibilizing HDI trimer) |
| Desmodur ® N 3900 | Low-viscosity, aliphatic polyisocyanate resin based on hexamethylene diisocyanate |
| Desmodur ® N 50 BA/MPA | Aliphatic polyisocyanate (HDI biuret) |
| Desmodur ® N 75 BA | Aliphatic polyisocyanate (HDI biuret) |
| Desmodur ® N 75 MPA | Aliphatic polyisocyanate (HDI biuret) |
| Desmodur ® N 75 MPA/X | Aliphatic polyisocyanate (HDI biuret) |
| Desmodur ® NZ 1 | Aliphatic polyisocyanate |
| Desmodur ® PC-N | Desmodur PC-N is a modified diphenyl-methane-4,4'-diisocyanate (MDI). |
| Desmodur ® PF | Desmodur PF is a modified diphenyl-methane-4,4'-diisocyanate (MDI). |
| Desmodur ® PL 340, 60 % BA/SN | Blocked aliphatic polyisocyanate based on IPDI |
| Desmodur ® PL 350 | Blocked aliphatic polyisocyanate based on HDI |
| Desmodur ® RC | Solution of a polyisocyanurate of toluene diisocyanate (TDI) in ethyl acetate. |
| Desmodur ® RE | Solution of triphenylmethane-4,4',4''-triisocyanate in ethyl acetate |
| Desmodur ® RFE | Solution of tris(p-isocyanatophenyl) thiophosphate in ethyl acetate |
| Desmodur ® RN | Solution of a polyisocyanurate with aliphatic and aromatic NCO groups in ethyl acetate. |
| Desmodur ® T 100 | Pure 2,4 '-toluene diisocyanate (TDI) |
| Desmodur ® T 65 N | 2,4- and 2,6-toluene diisocyanate (TDI) in the ratio 67:33 |
| Desmodur ® T 80 | 2,4- and 2,6-toluene diisocyanate (TDI) in the ratio 80:20 |
| Desmodur ® T 80 P | 2,4- and 2,6-toluene diisocyanate (TDI) in the ratio 80:20 with an increased content of hydrolysable chlorine |
| Desmodur ® VH 20 N | Polyisocyanate based on diphenylmethane diisocyanate |
| Desmodur ® VK | Desmodur VK products re mixtures of diphenylmethane-4,4'-diisocyanate (MDI) with isomers and higher functional |
| Desmodur ® VKP 79 | Desmodur VKP 79 is a modified diphenylmethane-4,4'-diisocyanate (MDI) with isomers and homologues. |
| Desmodur ® VKS 10 | Desmodur VKS 10 is a mixture of diphenylmethane-4,4'-diisocyanate (MDI) with isomers and higher functional |

TABLE 2-continued

| Trade Name | Description |
|---|---|
| Desmodur ® VKS 20 | Desmodur VKS 20 is a mixture of diphenylmethane-4,4'-diisocyanate (MDI) with isomers and higher functional |
| Desmodur ® VKS 20 F | Desmodur VKS 20 F is a mixture of diphenylmethane-4,4'-diisocyanate (MDI) with isomers and higher functional |
| Desmodur ® VKS 70 | Desmodur VKS 70 is a mixture of diphenylmethane-4,4'-diisocyanate (MDI) with isomers and homologues. |
| Desmodur ® VL | Aromatic polyisocyanate based on diphenylmethane diisocyanate |
| Desmodur ® VP LS 2078/2 | Blocked aliphatic polyisocyanate based on IPDI |
| Desmodur ® VP LS 2086 | Aromatic polyisocyanate prepolymer based on diphenylmethane diisocyanate |
| Desmodur ® VP LS 2257 | Blocked aliphatic polyisocyanate based on HDI |
| Desmodur ® VP LS 2371 | Aliphatic polyisocyanate prepolymer based on isophorone diisocyanate. |
| Desmodur ® VP LS 2397 | Desmodur VP LS 2397 is a linear prepolymer based on polypropylene ether glycol and diphenylmethane diisocyanate |
| Desmodur ® W | Monomeric cycloaliphatic diisocyanate |
| Desmodur ® W/1 | Monomeric cycloaliphatic diisocyanate |
| Desmodur ® XP 2404 | Desmodur XP 2404 is a mixture of monomeric polyisocyanates |
| Desmodur ® XP 2406 | Aliphatic polyisocyanate prepolymer based on isophorone diisocyanate |
| Desmodur ® XP 2489 | Aliphatic polyisocyanate |
| Desmodur ® XP 2505 | Desmodur XP 2505 is a prepolymer containing ether groups based on diphenylmethane-4,4 '-diisocyanates (MDI) with |
| Desmodur ® XP 2551 | Aromatic polyisocyanate based on diphenylmethane diisocyanate |
| Desmodur ® XP 2565 | Low-viscosity, aliphatic polyisocyanate resin based on isophorone diisocyanate. |
| Desmodur ® XP 2580 | Aliphatic polyisocyanate based on hexamethylene diisocyanate |
| Desmodur ® XP 2599 | Aliphatic prepolymer containing ether groups and based on hexamethylene-1,6-diisocyanate (HDI) |
| Desmodur ® XP 2617 | Desmodur XP 2617 is a largely linear NCO prepolymer based on hexamethylene diisocyanate. |
| Desmodur ® XP 2665 | Aromatic polyisocyanate prepolymer based on diphenylmethane diisocyanate (MDI). |
| Desmodur ® XP 2675 | Aliphatic polyisocyanate (highly functional HDI trimer) |
| Desmodur ® XP 2679 | Aliphatic polyisocyanate (HDI allophanate trimer) |
| Desmodur ® XP 2714 | Silane-functional aliphatic polyisocyanate based on hexamethylene diisocyanate |
| Desmodur ® XP 2730 | Low-viscosity, aliphatic polyisocyanate (HDI uretdione) |
| Desmodur ® XP 2731 | Aliphatic polyisocyanate (HDI allophanate trimer) |
| Desmodur ® XP 2742 | Modified aliphatic Polyisocyanate (HDI-Trimer), contains SiO2 -nanoparticles |

Additional isocyanates suitable for certain embodiments of the present invention are sold under the trade name Tolonate® (Perstorp). In certain embodiments, isocyanates are selected from the group consisting of the materials shown in Table 3, and typically from the subset of this list with functionality in the range of 1.95 and 2.1

TABLE 3

| | |
|---|---|
| Tolonate ™ D2 | a blocked aliphatic polyisocyanate, supplied at 75% solids in aromatic solvent |
| Tolonate ™ HDB | a viscous solvent-free aliphatic polyisocyanate |
| Tolonate ™ HDB-LV | a solvent free low viscosity aliphatic polyisocyanate |
| Tolonate ™ HDB 75 B | an aliphatic polyisocyanate, supplied at 75% solids in methoxy propyl acetate |
| Tolonate ™ HDB 75 BX | an aliphatic polyisocyanate, supplied at 75% solids |
| Tolonate ™ HDT | a medium viscosity, solvent-free aliphatic polyisocyanate |
| Tolonate ™ HDT-LV | is a solvent free low viscosity aliphatic polyisocyanate |
| Tolonate ™ HDT-LV2 | a solvent free, very low viscosity aliphatic polyisocyanate |
| Tolonate ™ HDT 90 | an aliphatic polyisocyanate, based on HDI-trimer (isocyanurate), supplied at 90% solids |
| Tolonate ™ HDT 90 B | an aliphatic polyisocyanate, based on HDI-trimer (isocyanurate), supplied at 90% solids |
| Tolonate ™ IDT 70 B | an aliphatic polyisocyanate, based on HDI-trimer (isocyanurate), supplied at 70% solids |
| Tolonate ™ IDT 70 S | an aliphatic polyisocyanate, based on HDI-trimer (isocyanurate), supplied at 70% solids |
| Tolonate ™ X FD 90 B | a high functionality, fast drying aliphatic polyisocyanate based on HDI-trimer, supplied at 90% solids |

Other isocyanates suitable for certain embodiments of the present invention are sold under the trade name Mondur® available from Bayer Material Science. In certain embodiments, isocyanates are selected from the group consisting of the materials shown in Table 4, and typically from the subset of isocyanates with functionality between 1.95 and 2.1.

TABLE 4

| Trade Name | Description |
|---|---|
| MONDUR ® 445 | TDI/MDI blend polyisocyanate; blend of toluene diisocyanate and polymeric diphenylmethane diisocyanate; NCO weight 44.5-45.2% |
| MONDUR ® 448 | modified polymeric diphenylmethane diisocyanate (pMDI) prepolymer; NCO weight 27.7%; viscosity 140 mPa · s @ 25° C.; equivalent weight 152; functionality 2.2 |
| MONDUR ® 489 | modified polymeric diphenylmethane diisocyanate (pMDI); NCO weight 31.5%; viscosity 700 mPa · s @ 25° C.; equivalent weight 133; functionality 3.0 |
| MONDUR ® 501 | modified monomeric diphenylmethane diisocyanate (mMDI); isocyanate-terminated polyester prepolymer; NCO weight 19.0%; viscosity 1,100 mPa · s @ 25° C.; equivalent weight 221; functionality 2 |
| MONDUR ® 541 | polymeric diphenylmethane diisocyanate (pMDI); binder for composite wood products and as a raw material in adhesive formulations; NCO weight 31.5%; viscosity 200 mPa · s @ 25° C. |
| MONDUR ® 582 | polymeric diphenylmethane diisocyanate (pMDI); binder for composite wood products and as a raw material in adhesive formulations; NCO weight 31.0%; viscosity 200 mPa · s @ 25° C. |
| MONDUR ® 541-Light | polymeric diphenylmethane diisocyanate (pMDI); NCO weight 32.0%; viscosity 70 mPa · s @ 25° C.; equivalent weight 131; functionality 2.5 |
| MONDUR ® 841 | modified polymeric MDI prepolymer; NCO, Wt 30.5%; Acidity, Wt 0.02%; Amine Equivalent 132; Viscosity at 25 ° C., mPa · s 350; Specific gravity at 25° C. 1.24; Flash Point, PMCC, ° F. > 200 |
| MONDUR ® 1437 | modified diphenylmethane diisocyanate (mMDI); isocyanate-terminated polyether prepolymer; NCO weight 10.0%; viscosity 2,500 mPa · s @ 25° C.; equivalent weight 420; functionality 2 |
| MONDUR ® 1453 | modified diphenylmethane diisocyanate (mMDI); isocyanate-terminated polyether prepolymer based on polypropylene ether glycol (PPG); NCO weight 16.5%; viscosity 600 mPa · s @ 25° C.; equivalent weight 254; functionality 2 |
| MONDUR ® 1515 | modified polymeric diphenylmethane diisocyanate (pMDI) prepolymer; used in the production of rigid polyurethane foams, especially for the appliance industry; NCO weight 30.5%; viscosity 350 mPa · s @ 25° C. |
| MONDUR ® 1522 | modified monomeric 4,4-diphenylmethane diisocyanate (mMDI); NCO weight 29.5%; viscosity 50 mPa · s @ 25° C.; equivalent weight 143; functionality 2.2 |
| MONDUR ® MA-2300 | modified monomeric MDI, allophanate-modified 4,4'-diphenylmethane diisocyanate (mMDI); NCO weight 23.0%; viscosity 450 mPa · s @ 25° C.; equivalent weight 183; functionality 2.0 |
| MONDUR ® MA 2600 | modified monomeric MDI, allophanate-modified 4,4'-diphenylmethane diisocyanate (mMDI); NCO weight 26.0%; viscosity 100 mPa · s @ 25° C.; equivalent weight 162; functionality 2.0 |
| MONDUR ® MA 2601 | aromatic diisocyanate blend, allophanate-modified 4,4'-diphenylmethane diisocyanate (MDI) blended with polymeric diphenylmethane diisocyanate (pMDI) containing 2,4'-isomer; NCO weight 29.0%; viscosity 60 mPa · s @ 25° C.; equivalent weight 145; functionality 2.2 |
| MONDUR ® MA 2603 | MDI prepolymer; isocyanate-terminated (MDI) prepolymer blended with an allophanate-modified 4,4'-diphenylmethane diisocyanate (MDI); NCO weight 16.0%; viscosity 1,050 mPa · s @ 25° C.; equivalent weight 263; functionality 2.0 |
| MONDUR ® MA-2902 | modified monomeric MDI, allophanate-modified 4,4'-diphenylmethane diisocyanate (mMDI); NCO weight 29.0%; viscosity 40 mPa · s @ 25° C.; equivalent weight 145; functionality 2.0 |
| MONDUR ® MA-2903 | modified monomeric MDI; isocyanate-terminated (MDI) prepolymer; NCO weight 19.0%; viscosity 400 mPa · s @ 25° C.; equivalent weight 221; functionality 2.0 |
| MONDUR ® MA-2904 | Allophanate-modified MDI polyether prepolymer; NCO weight 12.0%; viscosity 1,800 mPa · s @ 25° C.; equivalent weight 350; functionality of 2.0 |
| MONDUR ® MB | high-purity grade difunctional isocyanante, diphenylmethane 4,4'-diisocyanate; used in production of polyurethane elastomers, adhesives, coatings and intermediate polyurethane products; appearance colorless solid or liquid; specific gravity @ 50° C. ± 15.5 1.19; flash point 202° C. PMCC; viscosity (in molten form) 4.1 mPa · S; bult density 10 lb/gal (fused) or 9.93 lb/gal (molten); freezing temperature 39° C. |
| MONDUR ® MLQ | monomeric diphenylmethan diisocyanate; used in a foams, cast elastomers, coatings and ahdesives; appearance light yellow clear liquid, NCO 33.4% wt; 1.19 specific gravity at 25° C., 196° C. flash point, DIN 51758; 11-15° C. freezing temperature |
| MONDUR ® MQ | high-purity-grade difunctional isocyanate, diphenylmethane 4,4'-diisocyanate (MDI); used in production of solid polyurethane elastomers, adhesives, coatings and in intermediate polyurethane products; appearance colorless solid or liquid; specific gravity 1.19 @ 50° C.; flash point 202° C. PMCC; viscosity 4.1 mPa-S; bulk density 10 lb./gal (fused) or 9.93 lb./gal (molten); freezing temperature 39° C. |
| MONDUR ® MR | polymeric diphenylmethane diisocyanate (pMDI); NCO weight 31.5%; viscosity 200 mPa · s @ 25° C.; equivalent weight 133; functionality 2.8 |
| MONDUR ® MR LIGHT | polymeric diphenylmethane diisocyanate (pMDI); NCO weight 31.5%; viscosity 200 mPa · s @ 25° C.; equivalent weight 133; functionality 2.8 |
| MONDUR ® MR-5 | polymeric diphenylmethane diisocyanate (pMDI); NCO weight 32.5%; viscosity 50 mPa · s @ 25° C.; equivalent weight 129; functionality 2.4 |
| MONDUR ® MRS | 2,4' rich polymeric diphenylmethane diisocyanate (pMDI); NCO weight 31.5%; viscosity 200 mPa · s @ 25° C.; equivalent weight 133; functionality2.6 |
| MONDUR ® MRS 2 | 2,4' rich polymeric diphenylmethane diisocyanate (pMDI); NCO weight 33.0%; viscosity 25 mPa · s @ 25° C.; equivalent weight 127; functionality2.2 |

TABLE 4-continued

| Trade Name | Description |
|---|---|
| MONDUR ® MRS-4 | 2,4' rich polymeric diphenylmethane diisocyanate (pMDI); NCO weight 32.5%; viscosity 40 mPa · s @ 25° C.; equivalent weight 129; functionality 2.4 |
| MONDUR ® MRS-5 | 2,4' rich polymeric diphenylmethane diisocyanate (pMDI); NCO weight 32.3%; viscosity 55 mPa · s @ 25° C.; equivalent weight 130; functionality 2.4 |
| MONDUR ® PC | modified 4,4' diphenylmethane diisocyanate (mMDI); NCO weight 25.8%; viscosity 145 mPa · s @ 25° C.; equivalent weight 163; functionality 2.1 |
| MONDUR ® PF | modified 4,4' diphenylmethane diisocyanate (mMDI) prepolymer; NCO weight 22.9%; viscosity 650 mPa · s @ 25° C.; equivalent weight 183; functionality 2 |
| MONDUR ® TD-65 | monomeric toluene diisocyanate (TDI); 65/35 mixture of 2,4 and 2.6 TDI; NCO weight 48%; viscosity 3 mPa · s @ 25° C.; equivalent weight 87.5; functionality 2 |
| MONDUR ® TD-80 GRADE A | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |
| MONDUR ® TD-80 GRADE A/GRADE B | monomeric toluene diisocyanate (TDI); 80/20 mixture of the 2,4 and 2,6 isomer; NCO weight 48%; viscosity 5 mPa · s @ 25° C.; equivalent weight 87.5; functionality 2 |

In certain embodiments, one or more of the above-described isocyanate compositions is provided in a formulation typical of a mixture known in the art of polyurethane adhesives manufacture. Such mixtures may comprise prepolymers formed by the reaction of a molar excess of one or more isocyanates with reactive molecules comprising reactive functional groups such as alcohols, amines, thiols, carboxylates and the like. These mixtures may also comprise solvents, surfactants, stabilizers, and other additives known in the art.

In certain embodiments, the composition of the adhesive might comprise a blocked isocyanate and a polyol. Such a mixture of blocked isocyanate and a polyol do not react under normal conditions, even in the presence of water and the curing of this mixture is triggered by heating.

C. Prepolymers

In another aspect, the present invention encompasses prepolymers comprising isocyanate-terminated polyols ("isocyanate-terminated prepolymers") derived from compositions described herein. In certain embodiments, such isocyanate-terminated prepolymers comprise a plurality of polyol segments linked via urethane bonds formed by reaction with polyisocyanate compounds.

In certain embodiments, a prepolymer of the present invention is the result of a reaction between one or more of the polycarbonate polyols described above with a stoichiometric excess of any one or more of the diisocyanates described herein. The degree of polymerization of these prepolymers (i.e. the average number of polyol segments contained in the prepolymer chains) can be manipulated by controlling the relative amount of isocyanate, as well as the order of reagent addition and the reaction conditions.

In certain embodiments, prepolymers comprise compounds conforming to a formula:

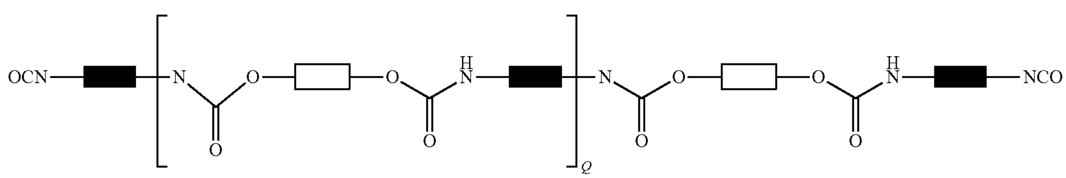

wherein Q is 0 or an integer between 1 and about 50, each open rectangle, ▭, represents a polyol moiety each of which may be the same or different, and where, the black rectangles ▬ represent the carbon skeleton of the diisocyanate.

In certain embodiments, prepolymers comprise chains conforming to the formula:

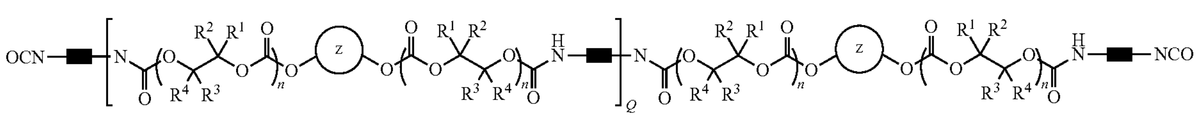

wherein, ▬,

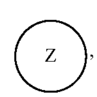

Q, $R^1$, $R^2$, $R^3$, $R^4$, and n are as defined above and in the classes and subclasses herein.

In certain embodiments, prepolymers comprises chains conforming to the formula:

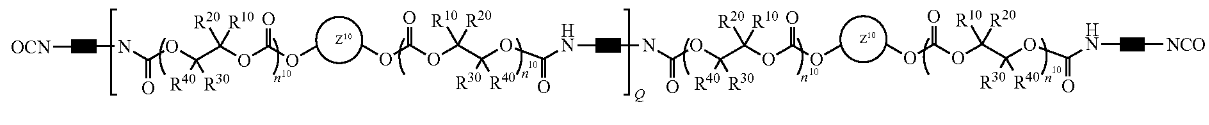

wherein, ▬,

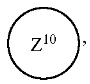

Q, $R^{10}$, $R^{20}$, $R^{30}$, $R^{40}$, and $n^{10}$ are as defined above and in the classes and subclasses herein.

In certain embodiments, prepolymers comprises chains conforming to the formula:

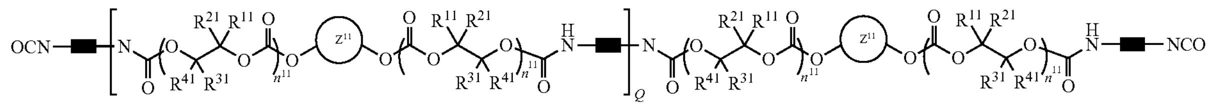

wherein, ▬,

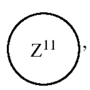

Q, $R^{11}$, $R^{21}$, $R^{31}$, $R^{41}$, and $n^{11}$ are as defined above and in the classes and subclasses herein.

In certain embodiments, prepolymers comprise chains conforming to the formula:

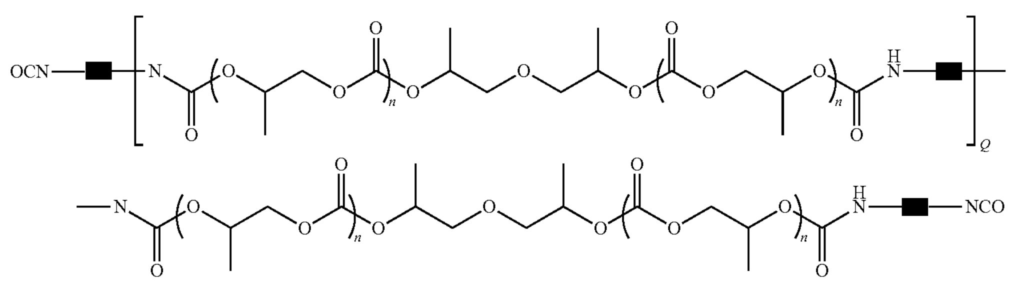

wherein, ▬,

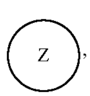

Q, and n are as defined above and in the classes and subclasses herein.

In certain embodiments, prepolymers comprise chains conforming to the formula:

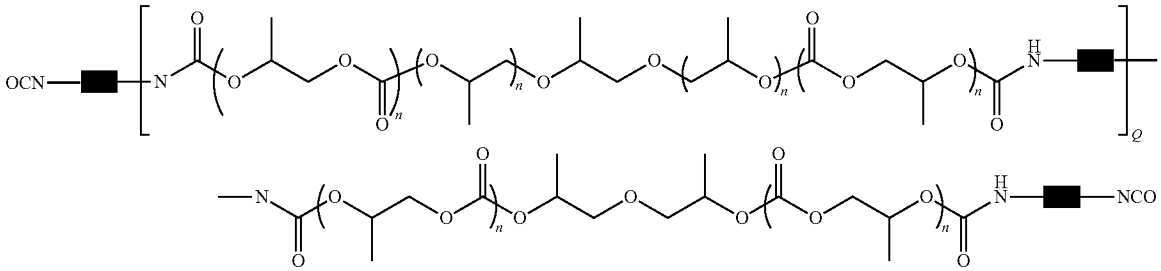

wherein, ,

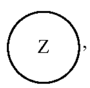,

Q, a, and n are as defined above and in the classes and subclasses herein.

In other embodiments, a prepolymer may be formed by reacting a stoichiometric excess of polyol with a limited amount of isocyanate. In such embodiments, the inventive prepolymer has —OH end groups and contains two or more polyol units connected by urethane linkages. In certain embodiments, such prepolymers conform to a structure:

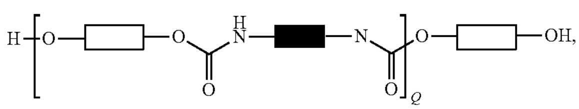

wherein , , and Q, are as defined above and in the classes and subclasses herein.

In certain embodiments, such prepolymers have structures conforming to:

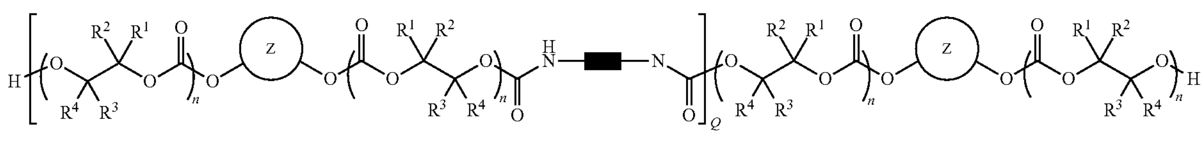

wherein ,

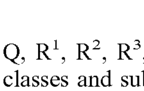,

Q, $R^1$, $R^2$, $R^3$, $R^4$, and n are as defined above and in the classes and subclasses herein.

It will be appreciated that, e.g., depending on the purpose or application, isocyanate terminated prepolymer compositions may also comprise residual isocyanate reagent. In some embodiments, an isocyanate terminated prepolymer composition comprises up to 50 weight percent residual isocyanate reagent.

Additionally or alternatively, it will be appreciated that, e.g., depending on the purpose or application, isocyanate terminated prepolymer compositions comprise unreacted NCO functionality. Unreacted NCO functionality refers to the weight percent of NCO from residual isocyanate reagent and unreacted NCO groups on the prepolymer in the mass of the isocyanate terminated prepolymer.

In some embodiments, an isocyanate-terminated prepolymer composition comprises between about 0.5% to 20% weight percent NCO functionality. In some embodiments, an isocyanate-terminated prepolymer composition comprises between about 2% to 18% weight percent NCO functionality. In some embodiments, an isocyanate-terminated prepolymer composition comprises between about 6% to 16% weight percent NCO functionality. In some embodiments, an isocyanate-terminated prepolymer composition comprises between about 0.5% to 10% weight percent NCO functionality. In some embodiments, an isocyanate-terminated prepolymer composition comprises between about 0.5% to 8% weight percent NCO functionality. In some embodiments, an isocyanate-terminated prepolymer composition comprises between about 0.5% to 6% weight percent NCO functionality. In some embodiments, an isocyanate-terminated prepolymer composition comprises between about 0.5% to 4% weight percent NCO functionality. In some embodiments, an isocyanate-terminated prepolymer composition comprises between about 2% to 6% weight percent NCO functionality. In some embodiments, an isocyanate-terminated prepolymer composition comprises between about 3% to 5% weight percent NCO functionality. In some embodiments, an isocyanate-terminated prepolymer composition comprises about 4% weight percent NCO functionality.

D. Other Co-Reactants and Additives

In some aspects, the present invention encompasses polyurethane compositions derived from polyurethane reaction mixtures provided herein. In certain embodiments, polyurethane reaction mixtures comprise additional reactive small molecules known as chain extenders such as amines, alcohols, thiols or carboxylic acids that participate in bond-forming reactions with isocyanates. In certain embodiments, additives are selected from the group consisting of: solvents, fillers, clays, blocking agents, stabilizers, thixotropes, plasticizers, compatibilizers, colorants, UV stabilizers, flame retardants, and the like.

1. Chain Extenders

In certain embodiments, polyurethane reaction mixtures include one or more small molecules reactive toward isocyanates. In certain embodiments, reactive small molecules included in polyurethane reaction mixtures comprise low molecular weight organic molecules having one or more functional groups selected from the group consisting of alcohols, amines, carboxylic acids, thiols, and combinations of any two or more of these.

In certain embodiments, polyurethane reaction mixtures include one or more alcohols. In certain embodiments, polyurethane reaction mixtures include polyhydric alcohols.

In certain embodiments, reactive small molecules included in polyurethane reaction mixtures comprise dihydric alcohols. In certain embodiments, the dihydric alcohol comprises a $C_{2-40}$ diol. The polyol compound is selected from aliphatic and cycloaliphatic polyol compounds, for example, ethylene glycol, 1,2-ethanediol, 1,2-propanediol, 1,3-propanediol, 1,2-butanediol, 1,2-propylene glycol, 1,3-butanediol, 1,4-butanediol, 1,5-pentanediol, 1,6-hexanediol, 1,8-octanediol, 1,9-nonane diol, 1,10-decane diol, neopentyl glycol, 3-methyl-1,5-pentane diol, 3,3-dimethylolheptane, 1,4-cyclohexane diol, 1,4-cyclohexanedimethanol and 1,4-dihydroxyethyl cyclohexane; and aliphatic and aromatic polyamine compounds, for example, ethylene diamine, 1,2-propylene diamine, 1,6-hexamethylene diamine, isophorone diamine bis(4-aminocyclohexyl)methane, piperazine and meta- or para-xylene diamine; aliphatic, cycloaliphatic and aromatic aminoalcohol compounds, for example, 2-ethanolamine, N-methyldiethanolamine, N-phenyldipropanolamine; hydroxyalkyl sulfamides, for example, hydroxyethyl sulfamide and hydroxyethylaminoethyl sulfamide; urea and water. Among the above-mentioned chain extending compounds, preferably 1,4-butane diol, 2-ethanolamine, and 1,2-propylenediamine are employed. In certain embodiments, the chain extender is selected from the group consisting of: 1,4-cyclohexanediethanol, isosorbide, glycerol monoesters, glycerol monoethers, trimethylolpropane monoesters, trimethylolpropane monoethers, pentaerythritol diesters, pentaerythritol diethers, and alkoxylated derivatives of any of these. The above-mentioned chain-extending compounds may be used alone or in a mixture of two or more thereof.

In certain embodiments, a reactive small molecule included in polyurethane reaction mixtures comprises a dihydric alcohol selected from the group consisting of: diethylene glycol, triethylene glycol, tetraethylene glycol, higher poly(ethylene glycol), such as those having number average molecular weights of from 220 to about 2000 g/mol, dipropylene glycol, tripropylene glycol, and higher poly (propylene glycols) such as those having number average molecular weights of from 234 to about 2000 g/mol.

In certain embodiments, a reactive small molecule included in polyurethane reaction mixtures comprises an alkoxylated derivative of a compound selected from the group consisting of: a diacid, a diol, or a hydroxy acid. In certain embodiments, the alkoxylated derivatives comprise ethoxylated or propoxylated compounds.

In certain embodiments, a reactive small molecule included in polyurethane reaction mixtures comprises a polymeric diol. In certain embodiments, a polymeric diol is selected from the group consisting of polyethers, polyesters, hydroxy-terminated polyolefins, polyether-copolyesters, polyether polycarbonates, polycarbonate-copolyesters, and alkoxylated analogs of any of these. In certain embodiments, the polymeric diol has an average molecular weight less than about 2000 g/mol.

In certain embodiments, a reactive small molecule comprises a hydroxy-carboxylic acid having the general formula $(HO)_xQ(COOH)_y$, wherein Q is a straight or branched hydrocarbon radical containing 1 to 12 carbon atoms, and x and y are each integers from 1 to 3. In certain embodiments, a coreactant comprises a diol carboxylic acid. In certain embodiments, a coreactant comprises a bis(hydroxylalkyl) alkanoic acid. In certain embodiments, a coreactant comprises a bis(hydroxylmethyl) alkanoic acid. In certain embodiments the diol carboxylic acid is selected from the group consisting of 2,2 bis-(hydroxymethyl)-propanoic acid (dimethylolpropionic acid, DMPA) 2,2-bis(hydroxymethyl) butanoic acid (dimethylolbutanoic acid; DMBA), dihydroxysuccinic acid (tartaric acid), and 4,4'-bis(hydroxyphenyl) valeric acid. In certain embodiments, a coreactant comprises an N,N-bis(2-hydroxyalkyl)carboxylic acid.

In certain embodiments, a reactive small molecule comprises a polyhydric alcohol comprising one or more amino groups. In certain embodiments, a reactive small molecule comprises an amino diol. In certain embodiments, a reactive small molecule comprises a diol containing a tertiary amino group. In certain embodiments, an amino diol is selected from the group consisting of: diethanolamine (DEA), N-methyldiethanolamine (MDEA), N-ethyldiethanolamine (EDEA), N-butyldiethanolamine (BDEA), N,N-bis(hydroxyethyl)-α-amino pyridine, dipropanolamine, diisopropanolamine (DIPA), N-methyldiisopropanolamine, Diisopropanol-p-toluidine, N,N-Bis(hydroxyethyl)-3-chloroaniline, 3-diethylaminopropane-1,2-diol, 3-dimethylaminopropane-1,2-diol and N-hydroxyethylpiperidine. In certain embodiments, a coreactant comprises a diol containing a quaternary amino group. In certain embodiments, a coreactant comprising a quaternary amino group is an acid salt or quaternized derivative of any of the amino alcohols described above. In some embodiments, a reactive small molecule is DMPA.

In certain embodiments, a reactive small molecule is selected from the group consisting of: inorganic or organic polyamines having an average of about 2 or more primary and/or secondary amine groups, polyalcohols, ureas, and combinations of any two or more of these. In certain embodiments, a reactive small molecule is selected from the group consisting of: diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4, 4-diamino diphenylmethane, and sulfonated primary and/or secondary amines. In certain embodiments, reactive small molecule is selected from the group consisting of: hydrazine, substituted hydrazines, hydrazine reaction products, and the like, and mixtures thereof. In certain embodiments, a reactive small molecule is a polyalcohol including those having from 2 to 12 carbon atoms, preferably from 2 to 8 carbon atoms, such as ethylene glycol, diethylene glycol, neopentyl glycol, butanediols, hexanediol, and the like, and mixtures thereof. Suitable ureas include urea and its derivatives, and the like, and mixtures thereof.

In certain embodiments, reactive small molecules containing at least one basic nitrogen atom are selected from the group consisting of: mono-, bis- or polyalkoxylated aliphatic, cycloaliphatic, aromatic or heterocyclic primary amines, N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated coconut oil fatty amine, N-allyl diethanolamine, N-methyl diisopropanolamine, N-ethyl diisopropanolamine, N-propyl diisopropanolamine, N-butyl diisopropanolamine, cyclohexyl diisopropanolamine, N,N-diethoxylaniline, N,N-diethoxyl toluidine, N,N-diethoxyl-1-aminopyridine, N,N'-diethoxyl piperazine, dimethyl-bis-ethoxyl hydrazine, N,N'-bis-(2-hydroxyethyl)-N,N'-diethylhexahydr op-phenylenediamine, N-12-hydroxyethyl piperazine, polyalkoxylated amines, propoxylated methyl diethanolamine, N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)-piperazine, N, N'-bisoxyethyl propylenediamine, 2,6-diaminopyridine, diethanolaminoacetamide, diethanolamidopropionamide, N,N-bisoxyethylphenyl thiosemicarbazide, N,N-bis-oxyethylmethyl semicarbazide, p,p'-bis-aminomethyl dibenzyl methylamine, 2,6-diaminopyridine, 2-dimethylaminomethyl-2-methylpropanel, 3-diol. In certain embodiments, chain-extending agents are compounds that contain two amino groups. In certain embodiments, chain-extending agents are selected from the group consisting of: ethylene diamine, 1,6-hexamethylene diamine, and 1,5-diamino-1-methylpentane.

2. Catalysts

In certain embodiments, no catalysts are used in provided polyurethane reaction mixtures. In certain embodiments, in the polymerization reaction for a polyurethane, a conventional catalyst comprising an amine compound or tin compound can be employed to promote the reaction. These embodiments are most commonly found in reactive extrusion methods of polyurethane adhesive production. Any suitable urethane catalyst may be used, including tertiary amine compounds and organometallic compounds may be used. Exemplary tertiary amine compounds include triethylenediamine, N-methylmorpholine, N,N-dimethylcyclohexylamine, pentamethyldiethylenetriamine, tetramefhylefhylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-dimethyl isopropylpropylenediamine, N,N-diethyl-3-diethylaminopropylamine and dimethylbenzylamine. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin dilaurate, as well as other organometallic compounds such as are disclosed in U.S. Pat. No. 2,846,408. A catalyst for the trimerization of polyisocyanates, resulting in a polyisocyanurate, such as an alkali metal alkoxide may also optionally be employed herein. Such catalysts are used in an amount which measurably increases the rate of polyurethane or polyisocyanurate formation.

In certain embodiments, where polyurethane reaction mixtures comprise catalysts, the catalysts comprise tin based materials. In certain embodiments, tin catalysts are selected from the group consisting of: di-butyl tin dilaurate, dibutyl-bis(laurylthio)stannate, dibutyltinbis(isooctylmercapto acetate) and dibutyltinbis(isooctylmaleate), tin octanoate and mixtures of any two or more of these.

In certain embodiments, catalysts included in polyurethane reaction mixtures comprise tertiary amines. In certain embodiments, catalysts included in polyurethane reaction mixtures are selected from the group consisting of: DABCO, pentametyldipropylenetriamine, bis(dimethylamino ethyl ether), pentamethyldiethylenetriamine, DBU phenol salt, dimethylcyclohexylamine, 2,4,6-tris(N,N-dimethylaminomethyl)phenol (DMT-30), triazabicyclodecene (TBD), N-methyl TBD, 1,3,5-tris(3-dimethylaminopropyl)hexahydro-s-triazine, 4,4'-(Oxydi-2,1-ethanediyl) bismorpholine (DMDEE), ammonium salts and combinations or formulations of any of these.

In some embodiments, the catalyst is a non-Sn catalyst. In some embodiments, the catalyst is a zinc-catalyst. In some embodiments, a catalyst is a Bi-catalyst.

Typical amounts of catalyst are 0.001 to 10 parts of catalyst per 100 parts by weight of total polyol in polyurethane reaction mixtures. In certain embodiments, catalyst levels in the formulation, when used, range between about 0.001 pph (weight parts per hundred) and about 3 pph based on the amount of polyol present in polyurethane reaction mixtures. In certain embodiments, catalyst levels range between about 0.05 pph and about 1 pph, or between about 0.1 pph and about 0.5 pph.

3. Mono-Functional Materials

In certain embodiments, monofunctional components are added to polyurethane reaction mixtures. Suitable monofunctional components can include molecules having a single isocyanate-reactive functional group such as an alcohol, amine, carboxylic acid, or thiol. A monofunctional component will serve as a chain termination which can be used to limit molecular weight or crosslinking if higher functionality species are used. U.S. Pat. No. 5,545,706 illustrates the use of a monofunctional alcohol in a substantially linear polyurethane formulation. The monofunctional alcohol can be any compound with one alcohol available for reaction with isocyanate such as methanol, ethanol, propanol, isopropanol, butanol, isobutanol, pentanol, hexanol, heptanol, octanol, nonanol, decanol, dodecanol, phenol and the like. Additionally, the monofunctional component can be added as a low molecular weight polymer that has been initiated by or reacted with the monofunctional alcohol. The monofunctional alcohol can be a polyether such as polypropylene oxide or polyethylene oxide initiated with any of the monofunctional alcohols listed. The monofunctional alcohol can be a polyester polymer where the monofunctional alcohol is added to the recipe. The monofunctional alcohol can be a polycarbonate polymer such as polyethylene carbonate or polypropylene carbonate initiated with a monofunctional anion, such as halide, nitrate, azide, carboxylate, or a monohydric alcohol.

Similarly, the monofunctional component could be an isocyanate. Any monofunctional isocyanate could be added for this same function. Possible materials include phenyl isocyanate, naphthyl isocyanate, methyl isocyanate, ethyl isocyanate, propyl isocyanate, butyl isocyanate, hexyl isocyanate, octyl isocyanate and the like.

4. Additives

In addition to the above components, polyurethane reaction mixtures and/or polyurethane compositions of the present invention may optionally contain various additives as are known in the art of polyurethane technology. Such additives may include, but are not limited to solvents, fillers, clays, blocking agents, stabilizers, thixotropes, plasticizers, compatibilizers, colorants, UV stabilizers, flame retardants, and the like.

a) Solvents

If desired, the polyurethanes or pre-polymers can be dispersed in a mixture of water and organic solvents known to those skilled in the art. Suitable solvents can include aliphatic, aromatic, or halogenated hydrocarbons, ethers, esters, ketones, lactones, sulfones, nitriles, amides, nitromethane, propylene carbonate, dimethyl carbonate and the like. Representative examples include, but are not limited to: acetone, acetonitrile, benzene, butanol, butyl acetate, g-butyrolactone, butyl carbitol acetate, carbitol acetate, chloroform, cyclohexane, 1,2-dichloromethane, dibasic ester, diglyme, 1,2-dimethoxyethane, dimethylacetamide, dimethylsulfoxide, dimethformamide, 1,4-dioxane, ethanol, ethyl acetate, ethyl ether, ethylene glycol, hexane, hydroxylmethyl methacrylate, isopropyl acetate, methanol, methyl acetate, methyl amyl ketone, methyl isobutyl ketone, methylene chloride, methyl ethyl ketone (MEK), monoglyme, methyl methacrylate, propylene carbonate, propylene oxide, styrene, alpha-terpineol, tetrahydrofuran, texanol, toluene, diethyl succinate, diethylene glycol methyl ether, ethylene glycol diacetate, triethyl phosphate and the like. In some embodiments, the solvent is MEK. In some embodiments, e.g., PUD compositions, a solvent is or includes water.

b) Fillers

Optional components of polyurethane reaction mixtures and/or polyurethane compositions of the present invention include fillers. Such fillers are well known to those skilled in the art and include carbon black, titanium dioxide, calcium carbonate, surface treated silicas, titanium oxide, fume silica, talc, aluminum trihydrate and the like. In certain embodiments, fillers comprise carbon black. In certain embodiments, more than one reinforcing filler may be used, of which one is carbon black and a sufficient amount of carbon black is used to provide the desired black color to the adhesive. In certain embodiments, a reinforcing filler is used in sufficient amount to increase the strength of the adhesive and/or to provide thixotropic properties to the adhesive. The amounts of filler or other additives will vary depending on the desired application.

c) Clays

Among optional materials in polyurethane reaction mixtures and/or polyurethane compositions of the present invention are clays. Preferred clays useful in the present invention include kaolin, surface treated kaolin, calcined kaolin, aluminum silicates and surface treated anhydrous aluminum silicates. The clays can be used in any form which facilitates formulation of a pumpable adhesive. Preferably the clay is in the form of pulverized powder, spray-dried beads or finely ground particles.

d) Blocking Agents

One or more blocking agents are utilized to provide an induction period between the mixing of the two parts of the polyurethane adhesive composition and the initiation of the cure. The addition of the blocking agents provides an induction period which causes a reduction in the curing rate immediately after mixing of the components of the adhesive. The reduction in the curing rate results in lower initial tensile shear strengths and storage moduli immediately after mixing than those found in compositions that do not contain a blocking agent. Following the induction period the adhesive quickly cures so that the tensile shear strength and storage modulus are similar to those produced by adhesives that do not contain the blocking agent. Such thixotropes are well known to those skilled in the art and include hydroxyl containing compounds such as diethylene glycol, mono alkyl ethers, butanone oxime, methyl ethyle ketone oxime, nonylphenol, phenol and cresol; amine containing compounds such as caprolactam, diisopropyl amine, 1,2,4-triazole and 3,5-dimethyl pyrazole; and aliphatic containing compounds such as dialkyl malonate.

e) Stabilizers

Polyurethane reaction mixtures and/or polyurethane compositions of the present invention may further comprise stabilizers which function to protect the polyurethane composition from moisture, thereby inhibiting advancement and preventing premature crosslinking of the isocyanates in the adhesive formulation. Included among such stabilizers are diethylmalonate and alkylphenol alkylates.

f) Thixotrope

Optionally, polyurethane reaction mixtures and/or polyurethane compositions of the present invention may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to the polyurethane composition in a sufficient amount to give the desired rheological properties.

g) Plasticizers

Polyurethane reaction mixtures and/or polyurethane compositions of the present invention may further comprise plasticizers so as to modify the rheological properties to a desired consistency. Such materials should be free of water, inert to isocyanate groups and compatible with a polymer. Suitable plasticizers are well known in the art and preferable plasticizers include alkyl phthalates such as dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene and alkyl naphthalenes. The amount of plasticizer in the polyurethane composition is that amount which gives the desired rheological properties and/or which is sufficient to disperse any catalyst that may be present in the system.

h) Compatibilizers

In certain embodiments, polyurethane reaction mixtures and/or polyurethane compositions of the present invention comprise one or more suitable compatibilizers. Compatibilizers are molecules that allow two or more nonmiscible ingredients to come together and give a homogeneous liquid phase. Many such molecules are known to the polyurethane industry, these include: amides, amines, hydrocarbon oils, phthalates, polybutyleneglycols, and ureas.

i) Colorants

In certain embodiments, polyurethane reaction mixtures and/or polyurethane compositions of the present invention comprise one or more suitable colorants. Typical inorganic coloring agents included titanium dioxide, iron oxides and chromium oxide. Organic pigments originated from the azo/diazo dyes, phthalocyanines and dioxazines, as well as carbon black. Recent advances in the development of polyol-bound colorants are described in:

Miley, J. W.; Moore, P. D. "Reactive Polymeric Colorants For Polyurethane", Proceedings Of The SPI-26th Annual Technical Conference; Technomic: Lancaster, Pa., 1981; 83-86.

Moore, P. D.; Miley, J. W.; Bates, S. H.; "New Uses For Highly Miscible Liquid Polymeric Colorants In The Manufacture of Colored Urethane Systems"; Proceedings of the SPI-27th Annual Technical/Marketing Conference; Technomic: Lancaster, Pa., 1982; 255-261.

Bates, S. H.; Miley, J. W. "Polyol-Bound Colorants Solve Polyurethane Color Problems"; Proceedings Of The SPI-30th Annual Technical/Marketing Conference; Technomic: Lancaster, Pa., 1986; 160-165

Vielee, R. C.; Haney, T. V. "Polyurethanes"; In Coloring of Plastics; Webber, T. G., Ed., Wiley-Interscience: New York, 1979, 191-204.

j) UV Stabilizers

In certain embodiments, polyurethane reaction mixtures and/or polyurethane compositions of the present invention comprise one or more suitable UV stabilizers. Polyurethanes based on aromatic isocyanates will typically turn dark shades of yellow upon aging with exposure to light. A review of polyurethane weathering phenomena is presented in: Davis, A.; Sims, D. Weathering Of Polymers; Applied Science: London, 1983, 222-237. Light protection agents, such as hydroxybenzotriazoles, zinc dibutyl thiocarbamate, 2,6-ditertiary butylcatechol, hydroxybenzophenones, hindered amines and phosphites have been used to improve the light stability of polyurethanes. Color pigments have also been used successfully.

k) Flame Retardants

In certain embodiments, polyurethane reaction mixtures and/or polyurethane compositions of the present invention comprise one or more suitable flame retardants. Flame retardants are often added to reduce flammability. The choice of flame retardant for any specific polyurethane adhesive often depends upon the intended service application of that adhesive and the attendant flammability testing scenario governing that application. Aspects of flammability that may be influenced by additives include the initial ignitability, burning rate and smoke evolution.

The most widely used flame retardants are the chlorinated phosphate esters, chlorinated paraffins and melamine powders. These and many other compositions are available from specialty chemical suppliers. A review of this subject has been published: Kuryla, W. C.; Papa, A. J. Flame Retardancy of Polymeric Materials, Vol. 3; Marcel Dekker: New York, 1975, 1-133.

E. Blended Compositions

As described above and herein, in some aspects, the present invention encompasses compositions comprising a blend of polycarbonate polyols. In some embodiments, such a "blend" refers to two or more polycarbonate polyols which are structurally different from one another. In some embodiments, a provided composition comprises any of the polyols described above and herein.

In some embodiments, polyol subcomponent (i) comprises a polycarbonate polyol as described above and herein. In some embodiments, polyol subcomponent (ii) comprises a polycarbonate polyol as described above and herein. In some embodiments, polyol subcomponent (i) and polyol subcomponent (ii) each comprise a polycarbonate polyol. In some embodiments, polyol subcomponent (i) and polyol subcomponent (ii) each comprise a polycarbonate polyol, wherein a polycarbonate polyol present within polyol subcomponent (i) is structurally different than a polycarbonate polyol present in polyol subcomponent (ii).

In some embodiments, the present invention provides compositions comprising:

polyol subcomponent (i), which comprises one or more aliphatic polycarbonate polyols having formula PS1:

PS1

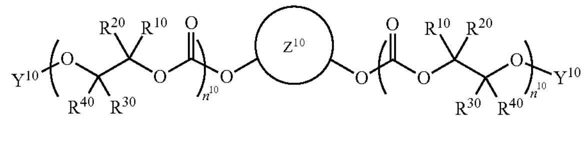

wherein each of $R^{10}$, $R^{20}$, $R^{30}$, $R^{40}$, $Y^{10}$, $n^{10}$, and

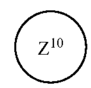

is as described above and herein; and polyol subcomponent (ii), which comprises one or more aliphatic polycarbonate polyols having formula PS2:

PS2

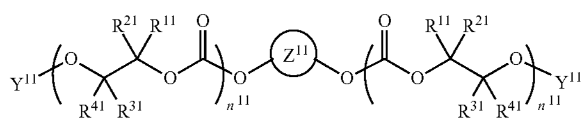

wherein each of $R^{11}$, $R^{21}$, $R^{31}$, $R^{41}$, $Y^{11}$, $n^{11}$, and

is as described above and herein.

In some embodiments, the present invention provides compositions comprising:

polyol subcomponent (i), which comprises one or more aliphatic polycarbonate polyols having formula P2b:

P2b

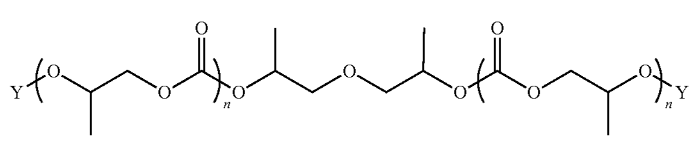

wherein each of Y and n is described above and herein; and polyol subcomponent (ii), which comprises one or more aliphatic polycarbonate polyols having formula Q7:

Q7

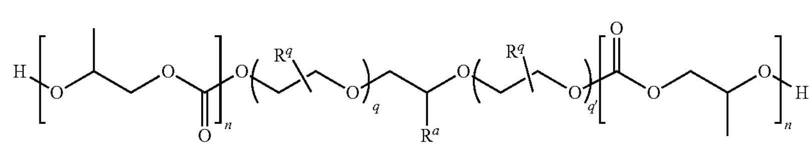

wherein each of $R^q$, $R^a$, q, q', and n is described above and herein.

In some embodiments, the present invention provides compositions comprising:

polyol subcomponent (i), which comprises one or more aliphatic polycarbonate polyols having formula Q10:

Q10

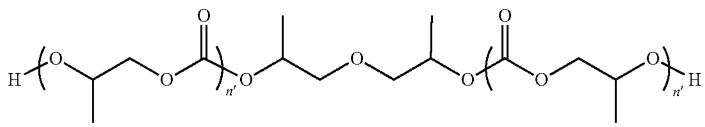

wherein n' is as described above and herein; and polyol subcomponent (ii), which comprises one or more aliphatic polycarbonate polyols having formula Q11:

Q11

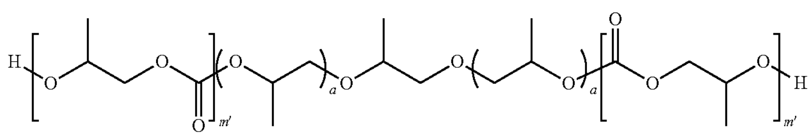

wherein each of a and m' is as described above and herein.

In some embodiments, polyol subcomponent (i) (e.g, having formula PS1, P2b, or Q10) has a $M_n$ between about 500 g/mol and about 1,500 g/mol. In some embodiments, polyol subcomponent (i) (e.g, having formula PS1, P2b, or Q10) has a $M_n$ of about 1,000 g/mol.

In some embodiments, polyol subcomponent (i) (e.g., having formula PS2, Q7, or Q11) has a $M_n$ between about 500 g/mol and about 2,500 g/mol. In some embodiments, polyol subcomponent (i) (e.g., having formula PS2, Q7, or Q11) has a $M_n$ of about 2,000 g/mol.

In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 9:1 to about 1:9. In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 7:1 to about 1:7. In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 5:1 to about 1:5. In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 4:1 to about 1:4. In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 3:1 to about 1:3. In certain embodiments, a provided compositions comprise polyol subcomponent (i) (e.g., having formula PS1, P2b, or Q10) and polyol subcomponent (ii) (e.g., having formula PS2, Q7, or Q11) in a weight ratio between about 2:1 to about 1:2. In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 1:1.

In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 2:3 to about 3:2. In certain embodiments, a provided composition comprises polyol subcomponent (i) (e.g., having formula PS1, P2b, or Q10) and polyol subcomponent (ii) (e.g., having formula PS2, Q7, or Q11) in a weight ratio between about 4:3 to about 3:4.

In some embodiments, a provided composition comprises about 0.1-60 weight percent of polyol subcomponent (i) (e.g., having formula PS1, P2b, or Q10) and about 40-99.9 weight percent of polyol subcomponent (ii) (e.g., having formula PS2, Q7, or Q11). In some embodiments, a provided composition comprises about 10-50 weight percent of polyol subcomponent (i) (e.g., having formula PS1, P2b, or Q10) and about 50-90 weight percent of polyol subcomponent (ii) (e.g., having formula PS2, Q7, or Q11). In some embodiments, a provided composition comprises about 25-50 weight percent of polyol subcomponent (i) (e.g., having formula PS1, P2b, or Q10) and about 50-75 weight percent of polyol subcomponent (ii) (e.g., having formula PS2, Q7, or Q11).

In some embodiments, a provided composition comprises about 0.1-60 weight percent of polycarbonate polyols of formula PS1 and about 40-99.9 weight percent of polycarbonate polyols of formula PS2. In some embodiments, a provided composition comprises about 10-50 weight percent of polycarbonate polyols of formula PS1 and about 50-90 weight percent of polycarbonate polyols of formula PS2. In some embodiments, a provided composition comprises about 25-50 weight percent of polycarbonate polyols of formula PS1 and about 50-75 weight percent of polycarbonate polyols of formula PS2.

In some embodiments, a provided composition comprises about 0.1-60 weight percent of polycarbonate polyols of formula P2b and about 40-99.9 weight percent of polycarbonate polyols of formula Q7. In some embodiments, a provided composition comprises about 10-50 weight percent of polycarbonate polyols of formula P2b and about 50-90 weight percent of polycarbonate polyols of formula Q7. In some embodiments, a provided composition comprises about 25-50 weight percent of polycarbonate polyols of formula P2b and about 50-75 weight percent of polycarbonate polyols of formula Q7.

In some embodiments, a provided composition comprises about 0.1-60 weight percent of polycarbonate polyols of formula Q10 and about 40-99.9 weight percent of polycarbonate polyols of formula Q11. In some embodiments, a provided composition comprises about 10-50 weight percent of polycarbonate polyols of formula Q10 and about 50-90 weight percent of polycarbonate polyols of formula Q11. In some embodiments, a provided composition comprises about 25-50 weight percent of polycarbonate polyols of formula Q10 and about 50-75 weight percent of polycarbonate polyols of formula Q11.

In some embodiments, a provided composition comprises about 5-15 weight percent of polyol subcomponent (i) (e.g., having formula PS1, P2b, or Q10) and about 85-95 weight percent of polyol subcomponent (ii) (e.g., having formula PS2, Q7, or Q11). In some embodiments, a provided composition comprises about 7-13 weight percent of polyol subcomponent (i) (e.g., having formula PS1, P2b, or Q10) and about 87-93 weight percent of polyol subcomponent (ii) (e.g., having formula PS2, Q7, or Q11). In some embodiments, a provided composition comprises about 10 weight percent of polyol subcomponent (i) (e.g., having formula PS1, P2b, or Q10) and about 90 weight percent of polyol subcomponent (ii) (e.g., having formula PS2, Q7, or Q11). In some embodiments, a provided composition comprises about 5-15 weight percent of polycarbonate polyols of formula PS1 and about 85-95 weight percent of polycarbonate polyols of formula PS2. In some embodiments, a provided composition comprises about 7-13 weight percent of polycarbonate polyols of formula PS1 and about 87-93 weight percent of polycarbonate polyols of formula PS2. In some embodiments, a provided composition comprises about 10 weight percent of polycarbonate polyols of formula PS1 and about 90 weight percent of polycarbonate polyols of formula PS2. In some embodiments, a provided composition comprises about 5-15 weight percent of polycarbonate polyols of formula P2b and about 85-95 weight percent of polycarbonate polyols of formula Q7. In some embodiments, a provided composition comprises about 7-13 weight percent of polycarbonate polyols of formula P2b and about 87-93 weight percent of polycarbonate polyols of formula Q7. In some embodiments, a provided composition comprises about 10 weight percent of polycarbonate polyols of formula P2b and about 90 weight percent of polycarbonate polyols of formula Q7. In some embodiments, a provided composition comprises about 5-15 weight percent of polycarbonate polyols of formula Q10 and about 85-95 weight percent of polycarbonate polyols of formula Q11. In some embodiments, a provided composition comprises about 7-13 weight percent of polycarbonate polyols of formula Q10 and about 87-93 weight percent of polycarbonate polyols of formula Q11. In some embodiments, a provided composition comprises about 10 weight percent of polycarbonate polyols of formula Q10 and about 90 weight percent of polycarbonate polyols of formula Q11.

In some embodiments, a provided composition comprises about 20-30 weight percent of polyol subcomponent (i) (e.g., having formula PS1, P2b, or Q10) and about 70-80 weight percent of polyol subcomponent (ii) (e.g., having formula PS2, Q7, or Q11). In some embodiments, a provided composition comprises about 22-28 weight percent of polyol subcomponent (i) (e.g., having formula PS1, P2b, or Q10) and about 72-78 weight percent of polyol subcomponent (ii) (e.g., having formula PS2, Q7, or Q11). In some embodiments, a provided composition comprises about 25 weight percent of polyol subcomponent (i) (e.g., having formula PS1, P2b, or Q10) and about 75 weight percent of polyol subcomponent (ii) (e.g., having formula PS2, Q7, or Q11). In some embodiments, a provided composition comprises about 20-30 weight percent of polycarbonate polyols of formula PS1 and about 70-80 weight percent of polycarbonate polyols of formula PS2. In some embodiments, a provided composition comprises about 22-28 weight percent of polycarbonate polyols of formula PS1 and about 72-78 weight percent of polycarbonate polyols of formula PS2. In some embodiments, a provided composition comprises about 25 weight percent of polycarbonate polyols of formula PS1 and about 75 weight percent of polycarbonate polyols of formula PS2. In some embodiments, a provided composition comprises about 20-30 weight percent of polycarbonate polyols of formula P2b and about 70-80 weight percent of polycarbonate polyols of formula Q7. In some embodiments, a provided composition comprises about 22-28 weight percent of polycarbonate polyols of formula P2b and about 72-78 weight percent of polycarbonate polyols of formula Q7. In some embodiments, a provided composition comprises about 25 weight percent of polycarbonate polyols of formula P2b and about 75 weight percent of polycarbonate polyols of formula Q7. In some embodiments, a provided composition comprises about 20-30 weight percent of polycarbonate polyols of formula Q10 and about 70-80 weight percent of polycarbonate polyols of formula Q11. In some embodiments, a provided composition comprises about 22-28 weight percent of polycarbonate polyols of formula Q10 and about 72-78 weight percent of polycarbonate polyols of formula Q11. In some embodiments, a provided composition comprises about 25 weight percent of polycarbonate polyols of formula Q10 and about 75 weight percent of polycarbonate polyols of formula Q11.

In some embodiments, a provided composition comprises about 45-55 weight percent of polyol subcomponent (i) (e.g., having formula PS1, P2b, or Q10) and about 45-55 weight percent of polyol subcomponent (ii) (e.g., having formula PS2, Q7, or Q11). In some embodiments, a provided composition comprises about 47-53 weight percent of polyol subcomponent (i) (e.g., having formula PS1, P2b, or Q10) and about 47-53 weight percent of polyol subcomponent (ii) (e.g., having formula PS2, Q7, or Q11). In some embodiments, a provided composition comprises about 50 weight percent of polyol subcomponent (i) (e.g., having formula PS1, P2b, or Q10) and about 50 weight percent of polyol subcomponent (ii) (e.g., having formula PS2, Q7, or Q11). In some embodiments, a provided composition comprises about 45-55 weight percent of polycarbonate polyols of formula PS1 and about 45-55 weight percent of polycarbonate polyols of formula PS2. In some embodiments, a provided composition comprises about 47-53 weight percent of polycarbonate polyols of formula PS1 and about 47-53 weight percent of polycarbonate polyols of formula PS2. In some embodiments, a provided composition comprises about 50 weight percent of polycarbonate polyols of formula PS1 and about 50 weight percent of polycarbonate polyols of formula PS2. In some embodiments, a provided composition comprises about 45-55 weight percent of polycarbonate polyols of formula P2b and about 45-55 weight percent of polycarbonate polyols of formula Q7. In some embodiments, a provided composition comprises about 47-53 weight percent of polycarbonate polyols of formula P2b and about 47-53 weight percent of polycarbonate polyols of formula Q7. In some embodiments, a provided composition comprises about 50 weight percent of polycarbonate polyols of formula P2b and about 50 weight percent of polycarbonate polyols of formula Q7. In some embodiments, a provided composition comprises about 45-55 weight percent of polycarbonate polyols of formula Q10 and about 45-55 weight percent of polycarbonate polyols of formula Q11. In some embodiments, a provided composition comprises about 47-53 weight percent of polycarbonate polyols of formula Q10 and about 47-53 weight percent of polycarbonate polyols of formula Q11. In some embodiments, a provided composition comprises about 50 weight percent of polycarbonate polyols of formula Q10 and about 50 weight percent of polycarbonate polyols of formula Q11.

In some embodiments, a provided composition comprises about 55-65 weight percent of polyol subcomponent (i) (e.g., having formula PS1, P2b, or Q10) and about 35-45 weight percent of polyol subcomponent (ii) (e.g., having formula PS2, Q7, or Q11). In some embodiments, a provided composition comprises about 57-63 weight percent of polyol subcomponent (i) (e.g., having formula PS1, P2b, or Q10) and about 37-43 weight percent of polyol subcomponent (ii) (e.g., having formula PS2, Q7, or Q11). In some embodiments, a provided composition comprises about 60 weight percent of polyol subcomponent (i) (e.g., having formula PS1, P2b, or Q10) and about 40 weight percent of polyol subcomponent (ii) (e.g., having formula PS2, Q7, or Q11). In some embodiments, a provided composition comprises about 55-65 weight percent of polycarbonate polyols of formula PS1 and about 35-45 weight percent of polycarbonate polyols of formula PS2. In some embodiments, a provided composition comprises about 57-63 weight percent of polycarbonate polyols of formula PS1 and about 37-43 weight percent of polycarbonate polyols of formula PS2. In some embodiments, a provided composition comprises about 60 weight percent of polycarbonate polyols of formula PS1 and about 40 weight percent of polycarbonate polyols of formula PS2. In some embodiments, a provided composition comprises about 55-65 weight percent of polycarbonate polyols of formula P2b and about 35-45 weight percent of polycarbonate polyols of formula Q7. In some embodiments, a provided composition comprises about 57-63 weight percent of polycarbonate polyols of formula P2b and about 37-43 weight percent of polycarbonate polyols of formula Q7. In some embodiments, a provided composition comprises about 60 weight percent of polycarbonate polyols of formula P2b and about 40 weight percent of polycarbonate polyols of formula Q7. In some embodiments, a provided composition comprises about 55-65 weight percent of polycarbonate polyols of formula Q10 and about 35-45 weight percent of polycarbonate polyols of formula Q11. In some embodiments, a provided composition comprises about 57-63 weight percent of polycarbonate polyols of formula Q10 and about 37-43 weight percent of polycarbonate polyols of formula Q11. In some embodiments, a provided composition comprises about 60 weight percent of polycarbonate polyols of formula Q10 and about 40 weight percent of polycarbonate polyols of formula Q11.

In some embodiments, a provided composition comprises about 65-75 weight percent of polyol subcomponent (i) (e.g., having formula PS1, P2b, or Q10) and about 25-35 weight percent of polyol subcomponent (ii) (e.g., having formula PS2, Q7, or Q11). In some embodiments, a provided composition comprises about 67-73 weight percent of polyol subcomponent (i) (e.g., having formula PS1, P2b, or Q10) and about 27-33 weight percent of polyol subcomponent (ii) (e.g., having formula PS2, Q7, or Q11). In some embodiments, a provided composition comprises about 70 weight percent of polyol subcomponent (i) (e.g., having formula PS1, P2b, or Q10) and about 30 weight percent of polyol subcomponent (ii) (e.g., having formula PS2, Q7, or Q11). In some embodiments, a provided composition comprises about 65-75 weight percent of polycarbonate polyols of formula PS1 and about 25-35 weight percent of polycarbonate polyols of formula PS2. In some embodiments, a provided composition comprises about 67-73 weight percent of polycarbonate polyols of formula PS1 and about 27-33 weight percent of polycarbonate polyols of formula PS2. In some embodiments, a provided composition comprises about 70 weight percent of polycarbonate polyols of formula PS1 and about 30 weight percent of polycarbonate polyols of formula PS2. In some embodiments, a provided composition comprises about 65-75 weight percent of polycarbonate polyols of formula P2b and about 25-35 weight percent of polycarbonate polyols of formula Q7. In some embodiments, a provided composition comprises about 67-73 weight percent of polycarbonate polyols of formula P2b and about 27-33 weight percent of polycarbonate polyols of formula Q7. In some embodiments, a provided composition comprises about 70 weight percent of polycarbonate polyols of formula P2b and about 30 weight percent of polycarbonate polyols of formula Q7. In some embodiments, a provided composition comprises about 65-75 weight percent of polycarbonate polyols of formula Q10 and about 25-35 weight percent of polycarbonate polyols of formula Q11. In some embodiments, a provided composition comprises about 67-73 weight percent of polycarbonate polyols of formula Q10 and about 27-33 weight percent of polycarbonate polyols of formula Q11. In some embodiments, a provided composition comprises about 70 weight percent of polycarbonate polyols of formula Q10 and about 30 weight percent of polycarbonate polyols of formula Q11.

It will be understood that each of the above weight percentages refer to the weight percentage of polyols within a provided composition, exclusive of other co-reactives and additives, e.g., those listed above and herein.

F. Polyurethane Compositions

As described above and herein, in some aspects, the present invention encompasses polyurethane compositions derived from compositions provided herein. In some embodiments, the present invention encompasses polyurethane compositions comprising the reaction product of a composition comprising a blend of polycarbonate polyols described above and herein and an isocyanate component.

In certain embodiments, polyurethane compositions of the present invention are derived by combining two-components: a first component comprising one or more isocyanate reagents, optionally containing diluents, solvents, coreactants and the like, and a second component comprising one or more polyol reagents optionally with additional reactants, solvents, catalysts, or additives. These components may be formulated separately and then combined or all components of the finished polyurethane composition may be combined in a single step. In some embodiments, polyurethane compositions of the present invention were prepared from a two-component formulation, wherein the first component comprises one or more isocyanates; and the second component comprises one or more polyols.

In certain embodiments, polyurethane compositions of the present invention were prepared from a one-component formulation comprising one or more polyurethane prepolymers. In some embodiments, a polyurethane prepolymer is synthesized from one or more polyols. In some embodiments, the present invention encompasses polyurethane compositions comprising the reaction product of an isocyanate-terminated prepolymer, wherein the isocyanate terminated prepolymer is derived from compositions described above and herein.

It will be appreciated that within the present disclosure, a reference to a polyurethane composition also refers to a waterborne polyurethane dispersion (PUD) composition, a solvent-borne polyurethane composition, a one-component polyurethane composition, a two-component polyurethane composition, or a hot-melt polyurethane composition. Additionally or alternatively, it will also be appreciated that such references to, for example, a waterborne polyurethane dispersion (PUD) composition, a solvent-borne polyurethane composition, a one-component polyurethane composition, a two-component polyurethane composition, or a hot-melt polyurethane composition, refer to a polyurethane composition derived from a particular curing method (e.g., a one-component polyurethane composition refers to a polyurethane composition derived from a one-component curing method). In some embodiments, a polyurethane composition is a waterborne polyurethane dispersion composition. In some embodiments, a polyurethane composition is a one-component polyurethane composition. In some embodiments, a polyurethane composition is a two-component polyurethane composition. In some embodiments, a polyurethane composition is a hot-melt polyurethane composition. In some embodiments, a polyurethane composition is a solvent-borne polyurethane composition. In some embodiments, a polyurethane composition is a one-component hot-melt polyurethane composition. In some embodiments, a polyurethane composition is a two-component hot-melt polyurethane composition.

II. Polyurethane Compositions with Improved Properties

Polyurethane compositions of the present invention may be useful in adhesive and coating applications. In some embodiments, a substrate is coated with a polyurethane composition, and the water or solvent is evaporated, leaving behind a polyurethane film. The polyurethane film may be lifted from the substrate and its properties measured.

It will be appreciated that within the present disclosure, a reference to a polyurethane composition also refers to a waterborne polyurethane dispersion (PUD), composition, a solvent-borne polyurethane composition, a one-component polyurethane composition, a two-component polyurethane composition, a hot-melt polyurethane composition, a one-component hot-melt polyurethane composition, or a two-component hot-melt polyurethane composition.

In one aspect, polyurethane compositions of the present invention unexpectedly demonstrate improved performance properties (e.g., strength, flexibility, elongation or combinations thereof), as compared to a reference polyurethane composition. In some embodiments, a reference polyurethane composition is a corresponding polyurethane composition lacking polyol subcomponent (i) as described above and herein (e.g., having formula PS1, P2b, or Q10). In some embodiments, a reference polyurethane composition is a corresponding polyurethane composition lacking polyol subcomponent (ii) as described above and herein (e.g., having formula PS2, Q7, or Q11). In some embodiments, a reference polyurethane composition is a corresponding polyurethane composition composed solely of a polycarbonate polyol that is structurally different from either polyol subcomponent (i) as described above and herein (e.g., having formula PS1, P2b, or Q10) or polyol subcomponent (ii) as described above and herein (e.g., having formula PS2, Q7, or Q11). In some embodiments, a reference polyurethane composition is a corresponding polyurethane composition composed solely of a polyether polyol. In some embodiments, a reference polyurethane composition is a corresponding polyurethane composition composed solely of a polyester polyol.

In some embodiments, the improved performance property is tensile strength measure according to ASTM D412. In some embodiments, the improved performance property is tensile elongation measured according to ASTM D412. In some embodiments, the improved performance property is modulus at 100% measured according to ASTM D412. In some embodiments, the improved performance property is modulus at 200% measured according to ASTM D412. In some embodiments, the improved performance property is modulus at 300% measured according to ASTM D412. In some embodiments, the improved property is lap shear strength measured according to ASTM D1002 or ISO 4587. In some embodiments, the improved property is lap shear strength measured according to ASTM D1002. In some embodiments, the improved property is lap shear strength measured according to ISO 4587. In some embodiments, the improved property is peel strength measured according to ASTM D1876.

In some embodiments, the present invention provides polyurethane compositions characterized in that the tensile strength measured according to ASTM D412 is improved compared to a reference polyurethane composition. In some embodiments, the present invention provides polyurethane compositions characterized in that the tensile strength measured according to ASTM D412 is at least 10, 20, 30, 40, 50, 60, 70, 80, 90, 100, 125, 150, 200, 250, or 300% greater as compared to a reference polyurethane composition. In some embodiments, the present invention provides polyurethane compositions characterized in that the tensile elongation measured according to ASTM D412 is improved compared to a reference polyurethane composition. In some embodiments, the present invention provides polyurethane compositions characterized in that the tensile elongation measured according to ASTM D412 is at least 10, 20, 30, 40, 50, 60, 70, 80, 90, 100, 125, 150, 200, 250, or 300% greater as compared to a reference polyurethane composition.

In some embodiments, the present invention provides a polyurethane composition characterized in that the tensile strength measured according to ASTM D412 is improved, and the tensile elongation measured according to ASTM D412 is about the same, as compared to a reference polyurethane composition. In some embodiments, the present invention provides a polyurethane composition characterized in that the tensile strength measured according to ASTM D412 is improved by at least 10, 20, 30, 40, 50, 60, 70, 80, 90, 100, 125, 150, 200, 250, or 300%, and the tensile elongation measured according to ASTM D412 is within 10%, as compared to a reference polyurethane composition. In some embodiments, the present invention provides a polyurethane composition characterized in that the tensile strength measured according to ASTM D412 is about the same, and the tensile elongation measured according to ASTM D412 is improved, as compared to a reference polyurethane composition. In some embodiments, the present invention provides a polyurethane composition characterized in that the tensile strength measured according to ASTM D412 is within 10%, and the tensile elongation measured according to ASTM D412 is improved by at least 10, 20, 30, 40, 50, 60, 70, 80, 90, 100, 125, 150, 200, 250, or 300%, as compared to a reference polyurethane composition. In some embodiments, the present invention provides a polyurethane composition characterized in that the tensile strength measured according to ASTM D412 and the tensile elongation measured according to ASTM D412 are improved, as compared to a reference polyurethane composition.

In some embodiments, the present invention provides a polyurethane composition characterized in that the tensile strength measured according to ASTM D412 is at least 10, 20, 30, 40, 50, 60, 70, 80, 90, 100, 125, 150, 200, 250, or 300% greater, and the tensile elongation measured according to ASTM D412 is about the same, as compared to a reference polyurethane composition. In some embodiments, the present invention provides a polyurethane composition characterized in that the tensile strength measured according to ASTM D412 is about the same, and the tensile elongation measured according to ASTM D412 is at least 10, 20, 30, 40, 50, 60, 70, 80, 90, 100, 125, 150, 200, 250, or 300% greater, as compared to a reference polyurethane composition. In some embodiments, the present invention provides a polyurethane composition characterized in that the tensile strength measured according to ASTM D412 is at least 10, 20, 30, 40, 50, 60, 70, 80, 90, 100, 125, 150, 200, 250, or 300% greater, and the tensile elongation measured according to ASTM D412 is at least 10, 20, 30, 40, 50, 60, 70, 80, 90, 100, 125, 150, 200, 250, or 300% greater, as compared to a reference polyurethane composition.

In some embodiments, the present invention provides a polyurethane composition characterized in that the modulus at 100% measured according to ASTM D412 is at least 10, 20, 30, 40, 50, 60, 70, 80, 90, 100, 125, 150, 200, 250, or 300% greater, as compared to a reference polyurethane composition. In some embodiments, the present invention provides a polyurethane composition characterized in that the modulus at 200% measured according to ASTM D412 is at least 10, 20, 30, 40, 50, 60, 70, 80, 90, 100, 125, 150, 200, 250, or 300% greater, as compared to a reference polyurethane composition. In some embodiments, the present invention provides a polyurethane composition characterized in that the modulus at 300% measured according to ASTM D412 is at least 10, 20, 30, 40, 50, 60, 70, 80, 90, 100, 125, 150, 200, 250, or 300% greater, as compared to a reference polyurethane composition.

In some embodiments, the present invention provides polyurethane compositions characterized in that the lap shear strength measured according to ASTM D1002 or ISO 4587 is improved compared to a reference polyurethane composition. In some embodiments, the present invention provides polyurethane compositions characterized in that the lap shear strength measured according to ASTM D1002 is improved compared to a reference polyurethane composition. In some embodiments, the present invention provides polyurethane compositions characterized in that the lap shear strength measured according to ISO 4587 is improved compared to a reference polyurethane composition. In some embodiments, the present invention provides polyurethane compositions characterized in that the lap shear strength measured according to ASTM D1002 or ISO 4587 is at least 10, 20, 30, 40, 50, 60, 70, 80, 90, 100, 125, 150, 200, 250, 300, 350, 400, 450, or 500% greater as compared to a reference polyurethane composition. In some embodiments, the present invention provides polyurethane compositions characterized in that the lap shear strength measured according to ASTM D1002 is at least 10, 20, 30, 40, 50, 60, 70, 80, 90, 100, 125, 150, 200, 250, 300, 350, 400, 450, or 500% greater as compared to a reference polyurethane composition. In some embodiments, the present invention provides polyurethane compositions characterized in that the lap shear strength measured according to ISO 4587 is at least 10, 20, 30, 40, 50, 60, 70, 80, 90, 100, 125, 150, 200, 250, 300, 350, 400, 450, or 500% greater as compared to a reference polyurethane composition.

In some embodiments, the present invention provides polyurethane compositions characterized in that the peel strength measured according to ASTM D1876 is improved compared to a reference polyurethane composition. In some embodiments, the present invention provides polyurethane compositions characterized in that the peel strength measured according to ASTM D1876 is at least 10, 20, 30, 40, 50, 60, 70, 80, 90, 100, 125, 150, 200, 250, or 300% greater as compared to a reference polyurethane composition.

In some embodiments, the present invention provides a polyurethane composition characterized in that it is about the same density as compared to a reference polyurethane composition.

III. Methods of Improving Properties of Polyurethane Compositions

In another aspect, the present invention encompasses methods of improving a performance property of a polyurethane compositions comprising the reaction product of a polyol component and a polyisocyanate component, the method comprising the step of incorporating into the polyol component a blend of polycarbonate polyols. In some embodiments, such blends comprise polyol subcomponent (i) as described above and herein (e.g., having formula PS1, P2b, or Q10) and polyol subcomponent (ii) as described above and herein (e.g., having formula PS2, Q7, or Q11).

It will be appreciated that within the present disclosure, a reference to a polyurethane composition also refers to a waterborne polyurethane dispersion (PUD) composition, a solvent-borne polyurethane composition, a one-component polyurethane composition, a two-component polyurethane composition, a hot-melt polyurethane composition, a one-component hot-melt polyurethane composition, or a two-component hot-melt polyurethane composition.

In one aspect, methods of the present invention unexpectedly demonstrate improved performance properties (e.g., strength, flexibility, elongation or a combination thereof) of polyurethane compositions, as compared to a reference polyurethane composition. In some embodiments, a reference polyurethane composition is a corresponding polyurethane composition lacking polyol subcomponent (i) as described above and herein. In some embodiments, a reference polyurethane composition is a corresponding polyurethane composition lacking polyol subcomponent (ii) as described above and herein. In some embodiments, a reference polyurethane composition is a corresponding polyurethane composition composed solely of a polycarbonate polyol that is structurally different from either polyol subcomponent (i) as described above and herein or polyol subcomponent (ii) as described above and herein. In some embodiments, a reference polyurethane composition is a corresponding polyurethane composition composed solely of a polyether polyol. In some embodiments, a reference polyurethane composition is a corresponding polyurethane composition composed solely of a polyester polyol.

In some embodiments, the improved performance property is tensile strength measure according to ASTM D412. In some embodiments, the improved performance property is tensile elongation measured according to ASTM D412. In some embodiments, the improved performance property is modulus at 100% measured according to ASTM D412. In some embodiments, the improved performance property is modulus at 200% measured according to ASTM D412. In some embodiments, the improved performance property is modulus at 300% measured according to ASTM D412. In some embodiments, the improved property is lap shear strength measured according to ASTM D1002 or ISO 4587. In some embodiments, the improved property is lap shear strength measured according to ASTM D1002. In some embodiments, the improved property is lap shear strength measured according to ISO 4587. In some embodiments, the improved property is peel strength measured according to ASTM D1876.

In some embodiments, the present invention provides methods of improving the tensile strength measured according to ASTM D412 of a polyurethane composition compared to a reference polyurethane composition. In some embodiments, the present invention provides methods of improving the tensile strength measured according to ASTM D412 of a polyurethane composition by at least 10, 20, 30, 40, 50, 60, 70, 80, 90, 100, 125, 150, 200, 250, or 300% as compared to a reference polyurethane composition. In some embodiments, the present invention provides methods of improving the tensile elongation measured according to ASTM D412 of a polyurethane composition compared to a reference polyurethane composition. In some embodiments, the present invention provides methods of improving the tensile elongation measured according to ASTM D412 of a polyurethane composition by at least 10, 20, 30, 40, 50, 60, 70, 80, 90, 100, 125, 150, 200, 250, or 300% as compared to a reference polyurethane composition.

In some embodiments, the present invention provides methods of improving the tensile strength measured according to ASTM D412 of a polyurethane composition as compared to a reference polyurethane composition, and the tensile elongation measured according to ASTM D412 of the polyurethane composition is about the same, as compared to a reference polyurethane composition. In some embodiments, the present invention provides methods of improving the tensile elongation measured according to ASTM D412 of a polyurethane composition as compared to a reference polyurethane composition, and the tensile strength measured according to ASTM D412 of the polyurethane composition is about the same, as compared to a reference polyurethane composition. In some embodiments, the present invention provides methods of improving the tensile strength measured according to ASTM D412 and the tensile elongation measured according to ASTM D412 of a polyurethane composition, as compared to a reference polyurethane composition.

In some embodiments, the present invention provides methods of improving the tensile strength measured according to ASTM D412 of a polyurethane composition by at least 10, 20, 30, 40, 50, 60, 70, 80, 90, 100, 125, 150, 200, 250, or 300% greater as compared to a reference polyurethane composition, and the tensile elongation measured according to ASTM D412 of the polyurethane composition is about the same as compared to a reference polyurethane composition. In some embodiments, the present invention provides methods of improving the tensile strength measured according to ASTM D412 of a polyurethane composition by at least 10, 20, 30, 40, 50, 60, 70, 80, 90, 100, 125, 150, 200, 250, or 300% greater as compared to a reference polyurethane composition, and the tensile elongation measured according to ASTM D412 of the polyurethane composition is within about 10% as compared to a reference polyurethane composition. In some embodiments, the present invention provides methods of improving the tensile elongation measured according to ASTM D412 of the polyurethane composition by at least 10, 20, 30, 40, 50, 60, 70, 80, 90, 100, 125, 150, 200, 250, or 300% as compared to a reference polyurethane composition, and the tensile strength measured according to ASTM D412 of the polyurethane composition is about the same as compared to a reference polyurethane composition. In some embodiments, the present invention provides methods of improving the tensile elongation measured according to ASTM D412 of the polyurethane composition by at least 10, 20, 30, 40, 50, 60, 70, 80, 90, 100, 125, 150, 200, 250, or 300% as compared to a reference polyurethane composition, and the tensile strength measured according to ASTM D412 of the polyurethane composition is within about 10% as compared to a reference polyurethane composition. In some embodiments, the present invention provides methods of improving the tensile strength measured according to ASTM D412 of a polyurethane composition by at least 10, 20, 30, 40, 50, 60, 70, 80, 90, 100, 125, 150, 200, 250, or 300% as compared to a reference polyurethane composition, and the tensile elongation measured according to ASTM D412 of the polyurethane composition by at least 10, 20, 30, 40, 50, 60, 70, 80, 90, 100, 125, 150, 200, 250, or 300% greater as compared to a reference polyurethane composition.

In some embodiments, the present invention provides methods of improving the modulus at 100% measured according to ASTM D412 of the polyurethane composition by at least 10, 20, 30, 40, 50, 60, 70, 80, 90, 100, 125, 150, 200, 250, or 300% greater, as compared to a reference polyurethane composition. In some embodiments, the present invention provides methods of improving the modulus at 200% measured according to ASTM D412 of the polyurethane composition by at least 10, 20, 30, 40, 50, 60, 70, 80, 90, 100, 125, 150, 200, 250, or 300% greater, as compared to a reference polyurethane composition. In some embodiments, the present invention provides methods of improving the modulus at 300% measured according to ASTM D412 of the polyurethane composition at least 10, 20, 30, 40, 50, 60, 70, 80, 90, 100, 125, 150, 200, 250, or 300% greater, as compared to a reference polyurethane composition.

In some embodiments, the present invention provides methods of improving the lap shear strength measured according to ASTM D1002 or ISO 4587 of the polyurethane composition at least 10, 20, 30, 40, 50, 60, 70, 80, 90, 100, 125, 150, 200, 250, 300, 350, 400, 450, or 500% greater, as compared to a reference polyurethane composition. In some embodiments, the present invention provides methods of improving the lap shear strength measured according to ASTM D1002 of the polyurethane composition at least 10, 20, 30, 40, 50, 60, 70, 80, 90, 100, 125, 150, 200, 250, 300, 350, 400, 450, or 500% greater, as compared to a reference polyurethane composition. In some embodiments, the present invention provides methods of improving the lap shear strength measured according to ISO 4587 of the polyurethane composition at least 10, 20, 30, 40, 50, 60, 70, 80, 90, 100, 125, 150, 200, 250, 300, 350, 400, 450, or 500% greater, as compared to a reference polyurethane composition.

In some embodiments, the present invention provides methods of improving the peel strength measured according to ASTM D1876 of the polyurethane composition at least 10, 20, 30, 40, 50, 60, 70, 80, 90, 100, 125, 150, 200, 250, or 300% greater, as compared to a reference polyurethane composition.

In some embodiments, the present invention provides methods characterized in that the polyurethane composition has about the same density as compared to a reference polyurethane composition.

IV. Methods for Producing Polyurethane Compositions

In some aspects, the present invention encompasses methods of producing a polyurethane composition, the method comprising the steps of:

(a) providing a composition comprising one or more isocyanate reagents;

(b) providing a composition comprising:

polyol subcomponent (i) as described above and herein (e.g., having formula PS1, P2b, or Q10); and polyol subcomponent (ii) as described above and herein (e.g., having formula PS2, Q7, or Q11); and (c) mixing the compositions in (a) and (b) and allowing the mixture to cure into the polyurethane composition.

In some aspects, the present invention encompasses methods of producing a polyurethane composition, the method comprising the steps of:

(a) providing an isocyanate-terminated prepolymer composition derived from a composition as described above and herein; and (b) allowing the composition to cure into a polyurethane composition.

In some aspects, the present invention encompasses methods of producing a polyurethane composition, the method comprising the steps of:

(a) providing a composition comprising one or more isocyanate reagents;

(b) providing a composition comprising a first polycarbonate polyol (e.g., polyol subcomponent (i) as defined above and described herein, such as a polycarbonate polyol having formula PS1, P2b, or Q10);

(c) mixing the compositions in (a) and (b) and allowing the mixture to cure;

(d) providing a composition comprising a second polycarbonate polyol that is structurally different from the first polycarbonate polyol (e.g., polyol subcomponent (ii) as defined above and described herein, such as a polycarbonate polyol having formula PS2, Q7, or Q11); and (e) mixing the compositions in (c) and (d) and allowing the mixture to cure.

In some aspects, the present invention encompasses methods of producing a polyurethane composition, the method comprising the steps of:

(a) providing a composition comprising one or more isocyanate reagents;

(b) providing a composition comprising a first polycarbonate polyol (e.g., polyol subcomponent (ii) as defined above and described herein, such as a polycarbonate polyol having formula PS2, Q7, or Q11);

(c) mixing the compositions in (a) and (b) and allowing the mixture to cure;

(d) providing a composition comprising a second polycarbonate polyol that is structurally different from the first polycarbonate polyol (e.g., polyol subcomponent (i) as defined above and described herein, such as a polycarbonate polyol having formula PS1, P2b, or Q10); and (e) mixing the compositions in (c) and (d) and allowing the mixture to cure.

It will be appreciated that within the present disclosure, a reference to a polyurethane composition also refers to a waterborne polyurethane dispersion (PUD) composition, a solvent-borne polyurethane composition, a one-component polyurethane composition, a two-component polyurethane composition, a hot-melt polyurethane composition, a one-component hot-melt polyurethane composition, or a two-component hot-melt polyurethane composition.

In some embodiments, catalysts are not added. In some embodiments, the catalyst is 4,4'-(Oxydi-2,1-ethanediyl) bismorpholine (DMDEE). In some embodiments, the solvent is methyl ethyl ketone (MEK). In some embodiments, the base is triethylamine (TEA). In some embodiments, the chain extender is 1,2-ethylene diamine (EDA).

V. Coatings with Improved Properties

In some embodiments, the present invention provides polyurethane compositions for use as coatings. In some embodiments, the present invention provides polyurethane coating compositions.

It will be appreciated that within the present disclosure, a reference to a polyurethane coating composition also refers to such a waterborne polyurethane dispersion (PUD) composition, a solvent-borne polyurethane composition, a one-component polyurethane composition, a two-component polyurethane composition, a hot-melt polyurethane composition, a one-component hot-melt polyurethane composition, or a two-component hot-melt polyurethane composition. In some embodiments, a polyurethane coating composition is a waterborne polyurethane dispersion (PUD) coating composition. In some embodiments, a polyurethane coating composition is a one-component polyurethane composition. In some embodiments, a polyurethane coating composition is a two-component polyurethane composition. In some embodiments, a polyurethane coating composition is a hot-melt polyurethane composition. In some embodiments, a polyurethane coating composition is a one-component hot-melt polyurethane composition. In some embodiments, a polyurethane coating composition is a two-component hot-melt polyurethane composition.

Polyurethane coating compositions of the present invention may exhibit improved performance as defined herein, for example they may exhibit improved hardness, flexibility, corrosion resistance and/or outdoor durability. The cured coatings resulting from compositions present invention may exhibit a broad range of protective properties like one or more of: excellent hardness, flexibility, processability, resistance against solvent, stain, corrosion and/or dirt pick up, thermal stability, hydrolytic stability against humidity and/or sterilization and/or outdoor durability.

Such improved properties may be in at least one, preferably a plurality, more preferably three of more of those properties labeled numerically below. Preferred polymers and/or compositions and/or coating compositions may exhibit comparable properties in one or more, preferably a plurality, more preferably three or more, most preferably in the rest of those properties labelled numerically herein.

A. Properties

1. Hardness

Hardness (Konig, Persoz and/or pencil hardness measured as described DIN 53157/1-87 (Konig), DIN 53157/11-87 (Persoz) and/or ISO 3270-1984, DIN EN 13523-4, ECCA T4 and/or ISO 15184:1998 (pencil hardness) and/or otherwise as described herein).

2. Flexibility

Flexibility (may be measured using the T-bend test as described in European standard EN 13523-7:2001 and/or otherwise as described herein).

3. Corrosion Resistance

Corrosion resistance (measured as described herein) is visually determined as described herein and rated from 1-5.

4. Hydrolysis Resistance

Hydrolysis resistance (according to the methods described herein to determine hydrolysis of coatings as described herein). Hydrolysis resistance is a general property useful for all coatings while sterilization is usually only useful for specific types of coatings such as those used to coat cans.

5. Outdoor Durability

Outdoor durability (for example with respect to UV-A and UV-B resistance such as in the QUV-test (a laboratory simulation of the damaging forces of weather, for the purpose of predicting the relative durability of coatings/materials exposed to the outdoor environment and described in ASTMG 53-95 and/or otherwise as described herein)).

6. Chemical Resistance

Chemical resistance (to methyl ethyl ketone (MEK) in the MEK double rubs test as described herein).

B. Application Tests

1. Visual Rating Scale

The degree of damage to a coating in various tests herein is determined visually based on the following ratings where 5 is the best and 0 is the worse:

5=very good: no visible damage or degradation/discoloration;
4=only slight visible damage or haze/blooming;
3=clear haze/blooming or damage;
2=coating partially dissolved;
1=coating is almost completely dissolved;
0=very poor: coating is completely dissolved.

2. Surface Hardness (Konig Hardness)

König hardness is determined following DIN 53157 NEN5319 using Erichsen hardness measuring equipment. The values are given in seconds and the higher the value is the harder is the coating. A Koenig hardness above 100 and combined with a T-bend of 1T or lower is considered very good.

3. Surface Hardness (Pencil Hardness)

Pencil hardness was determined following ISO 15184:1998 using a set of KOH-I-NOR drawing pencils in the following range: 6B-5B-4B-3B-2B-B-HB-F-H-2H-3H-4H-5H-6H (soft to hard). The hardest lead which does not penetrate the coating determines the degree of hardness. The minimum needed hardness is 1H. When at least 3H is obtained combined with a T-bend of 1T or lower, this is considered very good.

4. Flexibility (T-Bend)

May be measured using the T-bend test as described in European standard EN 13523-7:2001. A T-bend of 1T or lower is considered very flexible. In general a flexibility 1.5T or lower is aimed for.

5. Chemical Resistance (MEK Rubs)

The degree of cross-linking of a coating is determined by means of its resistance against wiping a cloth which is wetted with a strong organic solvent. The apparatus used is a DJH Designs MEK rub test machine and Greenson 4×4 pads. The reagent used is methyl ethyl ketone (MEK). The coated panel to be tested is at least 13×3 cm and is taped or clamped onto the machine. The pad is wetted automatically with approx 2 mL MEK. The wet pad is moved automatically over a length of about 12 cm forwards and backward in one movement, which is repeated continuously with a pressure of 3 kg and a cycle time of about 1 second. One double rub is one cycle and the procedure is repeated for 100 cycles or until the coating is ruptured or dissolved and the bare metal (or the primer layer) becomes visible. Matt coatings become glossy during the MEK test but this is not rated as coating damage. After the test the coating is visually examined in the middle of the rubbed area and given a rating from 5 to 1 as indicated above. To be acceptable for use in many applications typically coatings have chemical resistance of at least 100 MEK double rubs. For coating cans MEK resistance is not a relevant criteria.

6. Outdoor Durability (QUV Test)

The QUV-test is a laboratory simulation of the damaging forces of weather, for the purpose of predicting the relative durability of coatings/materials exposed to the outdoor environment according to ASTMG 53-95. Apparatus used is a Q.U.V. accelerated weathering tester and eight fluorescent UV-B 313 lamps. Reagent used is demineralised water. Test panels/materials of 75×150 mm size were coated with the test coatings and exposed to test cycles for four hours of UV radiation at 50° C., relative humidity 40%. The test panels/materials are mounted in the specimen racks with the test surfaces facing the UV lamps. Empty spaces are filled with blank panels to maintain the test conditions within the chamber. The total time of exposure is measured by the apparatus. The gloss 20°, 60° and L*, a*, b* values are measured and the test is finished when for high gloss coatings: 200 gloss is <20% and for semi gloss coatings: 600 gloss is 50% of original gloss. According to ECCA T10, 2000 hrs QUV-A is obtained for a good outdoor durable system. According to ECCA T10, 1000 hrs QUV-B is obtained for a good outdoor durable system.

C. Hardness

In some embodiments, a polyurethane composition is characterized in that, after curing, the polyurethane composition has a higher Konig hardness relative to a corresponding reference polyurethane composition, wherein the Konig hardness is measured in accordance with DIN 53157/1-87. In some embodiments, a polyurethane composition is characterized in that, after curing, the polyurethane composition has a Konig hardness that is at least 10%, at least 20%, at least 30%, at least 40%, at least 50%, at least 75%, at least 100%, or at least 200%, higher relative to a corresponding reference polyurethane composition, wherein the Konig hardness is measured in accordance with DIN 53157/1-87.

In some embodiments, a polyurethane composition is characterized in that, after curing, the polyurethane composition has a higher Persoz hardness relative to a corresponding reference polyurethane composition, wherein the Persoz hardness is measured in accordance with DIN 53157/11-87. In some embodiments, a polyurethane composition is characterized in that, after curing, the coating composition has a Persoz hardness that is at least 10%, at least 20%, at least 30%, at least 40%, at least 50%, at least 75%, at least 100%, or at least 200%, higher relative to a corresponding reference polyurethane composition, wherein the Persoz hardness is measured in accordance with DIN 53157/11-87.

In some embodiments, a polyurethane composition is characterized in that, after curing, the polyurethane composition has a higher Pencil hardness relative to a corresponding reference polyurethane composition, wherein the Pencil hardness is measured in accordance with ISO 15184:1998. In some embodiments, a polyurethane composition is characterized in that, after curing, the polyurethane composition has a Pencil hardness that is at least 10%, at least 20%, at least 30%, at least 40%, at least 50%, at least 75%, at least 100%, or at least 200%, higher relative to a corresponding reference polyurethane composition, wherein the Pencil hardness is measured in accordance with ISO 15184:1998.

D. Flexibility

In some embodiments, a polyurethane composition is characterized in that, after curing, the polyurethane composition has a lower T-bend flexibility relative to a corresponding reference polyurethane composition, wherein the T-bend flexibility is measured in accordance with EN 13523-7:2001. In some embodiments, a polyurethane composition is characterized in that, after curing, the polyurethane composition has a T-bend flexibility that is at least 10%, at least 20%, at least 30%, at least 40%, at least 50%, at least 75%, or about 100% lower relative to a corresponding reference polyurethane composition, wherein the T-bend flexibility is measured in accordance with EN 13523-7:2001.

E. Corrosion Resistance

In some embodiments, a polyurethane composition is characterized in that, after curing, the polyurethane composition has a higher corrosion resistance relative to a corresponding reference polyurethane composition, wherein the corrosion resistance is measured as described above. In some embodiments, a polyurethane composition is characterized in that, after curing, the polyurethane composition has a corrosion resistance that is at least 10%, at least 20%, at least 30%, at least 40%, at least 50%, at least 75%, or about 100% lower relative to a corresponding reference polyurethane composition, wherein the corrosion resistance is measured as described above.

F. Hydrolysis Resistance

In some embodiments, a polyurethane composition is characterized in that, after curing, the polyurethane composition has an improved hydrolysis resistance relative to a corresponding reference polyurethane composition, wherein the hydrolysis resistance is measured as described above. In some embodiments, a polyurethane composition is characterized in that, after curing, the polyurethane composition has a hydrolysis resistance that is at least 10%, at least 20%, at least 30%, at least 40%, at least 50%, at least 75%, or about 100% lower relative to a corresponding reference polyurethane composition, wherein the hydrolysis resistance is measured as described above.

G. Outdoor Durability

In some embodiments, a polyurethane composition is characterized in that, after curing, the polyurethane composition has an improved outdoor durability relative to a corresponding reference polyurethane composition, wherein the outdoor durability is measured in accordance with the QUV-test. In some embodiments, a polyurethane composition is characterized in that, after curing, the polyurethane composition has an outdoor durability that is at least 10%, at least 20%, at least 30%, at least 40%, at least 50%, at least 75%, or about 100% lower relative to a corresponding reference polyurethane composition, wherein the outdoor durability is measured in accordance with the QUV-test.

H. Chemical Resistance

In some embodiments, a polyurethane composition is characterized in that, after curing, the polyurethane composition has an improved chemical resistance relative to a corresponding reference polyurethane composition, wherein the chemical resistance is measured in accordance with the salt-spray test described above. In some embodiments, a polyurethane composition is characterized in that, after curing, the polyurethane composition has a chemical resistance that is at least 10%, at least 20%, at least 30%, at least 40%, at least 50%, at least 75%, or about 100% lower relative to a corresponding reference polyurethane composition, wherein the chemical resistance is measured in accordance with the salt-spray test described above.

VI. Adhesives with Improved Properties

In another aspect, a polyurethane composition of the present invention is an adhesive composition. In certain embodiments, the polyurethane adhesive compositions comprise the reaction product of an isocyanate component and a composition, as described above and herein; or an isocyanate-terminated prepolymer composition as described above and herein.

It will be appreciated that within the present disclosure, a reference to a polyurethane adhesive composition also refers to such a waterborne polyurethane dispersion (PUD) adhesive composition, a solvent-borne polyurethane composition, a one-component polyurethane composition, a two-component polyurethane composition, a hot-melt polyurethane composition, a one-component hot-melt polyurethane composition, or a two-component hot-melt polyurethane composition. In some embodiments, a polyurethane adhesive composition is a waterborne polyurethane dispersion (PUD) coating composition. In some embodiments, a polyurethane adhesive composition is a one-component polyurethane composition. In some embodiments, a polyurethane adhesive composition is a two-component polyurethane composition. In some embodiments, a polyurethane adhesive composition is a hot-melt polyurethane composition. In some embodiments, a polyurethane adhesive composition is a one-component hot-melt polyurethane composition. In some embodiments, a polyurethane adhesive composition is a two-component hot-melt polyurethane composition.

A. Reactive One-Component Polyurethane Adhesives

In one aspect, the present invention encompasses reactive one-component adhesives. In certain embodiments, such one-component adhesive compositions are derived from a composition as defined above and in the embodiments and examples herein.

In certain embodiments the one-component adhesives are prepolymers made with one or more polyols; these prepolymers typically have low isocyanate values and are produced by reacting an excess of isocyanate with a relatively high molecular weight polyol. These adhesives are typically cured with water which can be added or which is present in the atmosphere or the material being bonded.

In some embodiments, MDI is the isocyanate reacted with a polyol component as described above. In some embodiments requiring unique adhesive performance properties, TDI and/or aliphatic isocyanates are used in place of, or in addition to, MDI. In some embodiments, isophorone diisocyanate (IPDI) is the isocyanate reacted with a polyol component described above and herein.

In certain embodiments the one-component adhesives comprise 100% solids (e.g. no solvent is present at the time of application). In certain embodiments, the one-component adhesives formulations may be dissolved, dispersed, and/or emulsified in a solvent or water to reduce viscosity or otherwise improve the applicability of the one-component adhesive in these applications.

In certain embodiments no catalysts are used. In certain embodiments catalysts are included in the formulation to increase the reaction rate of free isocyanate and water.

In certain embodiments, hydroxyethyl acrylate groups may be included in the polycarbonate polyol, other polyols, and/or the derivative prepolymers to introduce ultraviolet light curing properties.

In certain embodiments, fatty acid groups and/or other molecules with unsaturation functionality may be included in polyols and/or the derivative prepolymers to enable cross linking via oxidation.

In certain embodiments, the one-component adhesive mixture forms a final, cured polyurethane adhesive with the following composition:

1-80 parts by weight of one or more isocyanate components or pre-polymers based on isocyanate components as described above and in the specific embodiments and examples herein;

20-99 parts by weight of a polyol component (or a polyol-based pre-polymer component) described above and in the specific embodiments and examples herein;

0 to 1 parts by weight of one or more catalysts as described above and in the specific embodiments and examples herein;

0 to 20 parts by weight of one or more chain extenders, wherein the chain extenders molecules are substantially as described above and in the specific embodiments and examples herein; and 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardents as described above and in the specific embodiments and examples herein.

B. Reactive Two-Component Polyurethane Adhesives

In another aspect, the present invention encompasses reactive two-component adhesive compositions. In certain embodiments, such two-component adhesive compositions are derived from a composition as defined above and in the embodiments and examples herein.

In certain embodiments the two-component adhesives include prepolymers derived from one or more polyols. These prepolymers can be produced with excess isocyanate and/or excess hydroxyl content and are then mixed with one or more of the isocyanates, polyols, and other components described above.

In certain embodiments, the two-component adhesives are formulated to an isocyanate index range of 90 to 150. In certain embodiments, isocyanate indexes above 100 are used to increase hardness of the adhesive and to improve bonding to substrates, in particular those substrates with hydroxyl groups on their surfaces. In certain embodiments, isocyanate indexes below 100 are used to produce softer and more flexible adhesives.

In certain embodiments, MDI is the isocyanate used in the formulation of the two-component adhesives. In certain embodiments, TDI is the isocyanate used in the formulation of the two-component adhesives. In certain embodiments, IPDI is the isocyanate used in the formulation of the two-component adhesives. In certain embodiments, these isocyanates have a functionality greater than two, and may be polymeric. In certain embodiments, other isocyanates are used, including aliphatic isocyanates in cases where resistance to ultraviolet light is a requirement.

In certain embodiments, the two-component adhesives are formulated with isocyanates and/and or polyols which are 2.0 functional or lower. In certain embodiments the adhesives are formulated with isocyanates and/or polyols functionality greater than 2.0 (in other words, some degree of branching) to introduce cross-linking in the cured two-component adhesives. In certain embodiments, the total level of crosslinking is relatively high to produce adhesives with high modulus, high hardness, and good tensile, shear stress, and peel strength properties. In certain embodiments, the total level of crosslinking is relatively low to produce adhesives with greater elasticity.

In certain embodiments the two-component adhesives are applied as 100% solids. In certain embodiments, the two-component adhesives may be dissolved, dispersed, and/or emulsified in a solvent or water to reduce viscosity or otherwise improve their applicability. In certain embodiments, solvents such as acetone, methyl ethyl ketone, ethylacetate, toluene, or xylene are preferred.

In certain embodiments no fillers are present in the two-component adhesives. In other embodiments calcium carbonate, talc, clays, or the like are added as fillers to control rheology, reduce shrinkage, reduce cost, and/or for other reasons. In certain embodiments the two-component adhesives include thixotropic agents, flow agents, film-forming additives, and/or catalysts to achieve the processing and finished adhesives properties required.

In certain embodiments, the two-component adhesive mixture forms a final, cured polyurethane adhesive with the following composition:

10-40 parts by weight of one or more isocyanate components or pre-polymers based on isocyanate components as described above and in the specific embodiments and examples herein;

60-90 parts by weight of a polyol component (or a polyol-based pre-polymer component) described above and in the specific embodiments and examples herein;

0 to 1 parts by weight of one or more catalysts as described above and in the specific embodiments and examples herein;

0 to 20 parts by weight of one or more chain extenders, wherein the chain extenders molecules are substantially as described above and in the specific embodiments and examples herein; and 0 to 10 parts by weight of one or more additives, wherein the additives are selected from the group consisting of: fillers, clays, blocking agents, stabilisers, thixotropic materials, plasticizers, compatibilizers, colorants, UV stabilizers or flame retardents as described above and in the specific embodiments and examples herein.

C. Hot-Melt Polyurethane Adhesives

In one aspect, the present invention also encompasses reactive hot-melt adhesives. In certain embodiments, such reactive hot-melt adhesive compositions are derived from a composition as defined above and in the embodiments and examples herein. In some embodiments, a polyurethane composition for use in a hot-melt adhesive comprises a composition described above and herein.

In certain embodiments the hot-melt adhesives include prepolymers derived from one or more polyols. These prepolymers can be produced with excess isocyanate and/or excess hydroxyl content and are then mixed with one or more of the isocyanates, polyols, and other components described above. In certain embodiments the molar ratio of isocyanate to polyol is between 1.5:1 and 4:1, preferably between 1.9:1 and 3:1, and often very near 2:1.

In certain embodiments, MDI is the isocyanate to react with a polyol component as described above. In certain embodiments, IPDI is the isocyanate to react with a polyol component as described above. In certain embodiments requiring unique hot-melt adhesive performance properties, TDI and/or aliphatic isocyanates are used in place of or in addition to MDI.

In certain embodiments the reactive hot-melt adhesive prepolymers are produced by reacting an excess of isocyanate with a relatively high molecular weight polyol. These prepolymers thus have an excess of isocyanate, or "free" isocyanate groups, which react with atmospheric moisture to improve the finished properties of the reactive hot-melt adhesive. In certain embodiments the amount of free isocyanate is about 1-5 percent by weight.

In certain embodiments the polyols, isocyanates, and/or prepolymers comprising the primary components of the reactive hot-melt adhesive are formulated such that the viscosity of the adhesive formulation is sufficiently low at the application temperature to enable efficient application to the substrate. The reactive hot-melt viscosity increases as it cools to rapidly provide good adhesive properties.

In certain embodiments, the reactive hot-melt polyurethane adhesive mixture forms a final, cured polyurethane adhesive with the following composition:

- 5-40 parts by weight of one or more isocyanate components or pre-polymers based on isocyanate components as described above and in the specific embodiments and examples herein;
- 60-95 parts by weight of a polyol component or a polyol-based pre-polymer component described above and in the specific embodiments and examples herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardents as described above and in the specific embodiments and examples herein.

D. Non-Reactive Solvent-Borne Polyurethane Adhesive

In another aspect, the present invention encompasses non-reactive solvent-borne adhesives. In certain embodiments, such solvent-borne adhesive compositions are derived a composition comprising a composition as defined above and in the embodiments and examples herein.

In some embodiments, a polyurethane composition for use in a non-reactive solvent-borne adhesive comprises a composition described above and herein.

In certain embodiments the solvent-borne adhesives are produced by reacting one or more polyols with one or more isocyanates and/or all other additives described above to create higher molecular weight prepolymers and/or polyurethane adhesives. These high molecular weight polyurethanes are then dissolved in one or more solvents for application onto various substrates. In these embodiments the solvent-borne adhesive is described as a one-component system. Additional fillers and performance enhancing additives may be included in the formulation.

In certain embodiments, solvent-borne cross-linkers are added to solvent-born polyurethane adhesives as described above to improve the strength and resistance of the finished adhesive. The crosslinkers may be any combination polyols and isocyanates described above and may also be other types of thermosetting components. In these embodiments the solvent-borne adhesive is described as a two-component reactive system and are thus similar and/or equivalent to the two-component reactive adhesives described above, in the embodiments in which these systems are dissolved in one or more solvents.

In certain embodiments, the non-reactive solvent-borne adhesive mixture forms a final, cured polyurethane adhesive with the following composition:

- 5-30 parts by weight of one or more isocyanate components or pre-polymers based on isocyanate components as described above and in the specific embodiments and examples herein;
- 70-95 parts by weight of a polyol component (or a polyol-based pre-polymer component) described above and in the specific embodiments and examples herein;
- 0 to 1 parts by weight of one or more catalysis as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardents as described above and in the specific embodiments and examples herein.

E. Non-Reactive Water-Borne Adhesive

In one aspect, the present invention encompasses reactive water-borne adhesives. In certain embodiments, such water-borne adhesive compositions are derived from a composition as defined above and in the embodiments and examples herein.

In certain embodiments the water-borne adhesives are produced by reacting one or more polyols with one or more isocyanates and/or all other additives described above to create higher molecular weight prepolymers and/or polyurethane adhesives, which are then dispersed in water and known as polyurethane dispersions (PUDs). In certain embodiments, they may contain low levels of solvents to help stabilize the polymers in water.

In certain embodiments, the solids content of the final PUD adhesive is in the range of 25-75%, preferably in the range of 35-50%. In certain embodiments, the water-borne adhesives are formulated to be on the very high or low end of these ranges depending on viscosity requirements, other processing considerations, and finished adhesive properties required.

In certain embodiments, water-borne cross-linkers are added to water-born PUDs as described above to improve the performance of the finished adhesive. The crosslinkers may be any combination of polyols and isocyanates described above and may also be other types of thermosetting components. In these embodiments the water-borne adhesive is akin to the two-component reactive system described above (except it is dispersed in an aqueous system) in the embodiments in which these systems are dispersed or emulsified in water.

In certain embodiments, the non-reactive water-borne adhesive mixture forms a final, cured polyurethane adhesive with the following composition:

- 20-50 parts by weight of one or more isocyanate components or pre-polymers based on isocyanate components as described above and in the specific embodiments and examples herein;
- 50-80 parts by weight of a polyol component (or a polyol-based pre-polymer component) described above and in the specific embodiments and examples herein;
- 0 to 1 parts by weight of one or more catalysts as described above and in the specific embodiments and examples herein;
- 0 to 20 parts by weight of one or more chain extenders, wherein the chain extenders molecules are substantially as described above and in the specific embodiments and examples herein; and
- 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardents as described above and in the specific embodiments and examples herein.

F. Non-Reactive Hot-Melt Adhesives

In one aspect, the present invention encompasses non-reactive hot-melt adhesives. In certain embodiments, such non-reactive hot-melt adhesive compositions are derived from a composition as defined above and in the embodiments and examples herein. In some embodiments, a polyurethane composition for use in a hot-melt adhesive comprises a composition described above and herein.

In certain embodiments the non-reactive hot-melt adhesives are produced by reacting one or more polyols with one or more isocyanates and/or all other additives described above to create higher molecular weight polymers and/or polyurethane adhesives. Additional fillers and performance enhancing additives may be included in the formulation.

In certain embodiments the polyols, isocyanates, prepolymers and/or polyurethane adhesives comprising the primary components of the non-reactive hot-melt adhesive are formulated such that the viscosity of the adhesive formulation is sufficiently low at the application temperature to enable efficient application to the substrate. The non-reactive hot-melt viscosity increases as it cools to rapidly provide good adhesive properties. In certain applications, they are formulated to have melt viscosities between 25,000 and 500,000 mPa*s, more preferable between 50,000 to 250,000 mPa*s.

In certain embodiments, the non-reactive hot-melt adhesive mixture forms a final, cured polyurethane adhesive with the following composition:

1-80 parts by weight of one or more isocyanate components or pre-polymers based on isocyanate components as described above and in the specific embodiments and examples herein;

20-99 parts by weight of a polyol component (or a polyol-based pre-polymer component) described above and in the specific embodiments and examples herein;

0 to 1 parts by weight of one or more catalysts as described above and in the specific embodiments and examples herein;

0 to 20 parts by weight of one or more chain extenders, wherein the chain extenders molecules arc substantially as described above and in the specific embodiments and examples herein; and 0 to 10 parts by weight of one or more additives, wherein the additives are selected from the group consisting of: fillers, clays, blocking agents, stabilizers, thixotropic materials, plasticizers, compatibilizers, colorants, UV stabilizers or flame retardents as described above and in the specific embodiments and examples herein.

G. Hybrid Systems

In certain embodiments, any of the above reactive and non-reactive adhesive formulations are combined with other adhesive chemistries in hybrid systems. In certain embodiments, the finished adhesives are urethane acrylic systems which can take a number of forms, including aqueous systems using water-dispersable isocyanates with PUDs and acrylic emulsion polymers, mixing acrylic and hydroxyl polyols to create co-polymerized resins, and the like. In certain embodiments, vinyl-terminated acrylic polymers are used to improve impact resistance. In certain embodiments, polyurethanes with acrylic functionality are also used in anaerobic or radiation-cured adhesives to increase toughness. In certain embodiments, urethanes are combined with epoxy chemistries using amine curing systems to create fast-curing adhesives for structural and heavy duty applications.

H. Substrates

In one aspect, the present invention encompasses adhesive compositions derived from compositions as defined above and in the embodiments and examples herein that are used for joining substrates. Exemplary substrates include, but are not limited to, metals (e.g., aluminum, stainless steel, etc), ceramics, textiles, woven and/or non-woven fabrics, foams, polyesters, polyolefins, polystyrenes, polyvinyl chlorides (PVC), polycarbonates (PC), acrylonitrile butadiene styrenes (ABS), acrylics, rubbers, plastics, glasses, woods (e.g., pine, maple, etc), and combinations thereof (e.g., metal to plastic, PVC to ABS, etc). In some embodiments, a substrate is selected from the group consisting of a metal (e.g., aluminum, stainless steel, etc), ceramic, textile, woven and/or non-woven fabric, foam, polyester, polyolefin, polystyrene, polyvinyl chloride (PVC), polycarbonate (PC), acrylonitrile butadiene styrene (ABS), acrylic, rubber, plastic, glass, wood (e.g., pine, maple, etc), and combinations thereof (e.g., metal to plastic, PVC to ABS, etc). In some embodiments, a substrate is selected from the group consisting of metal, PVC, PC, ABS, plastic substrates, and combinations thereof (e.g., metal to plastic, PVC to ABS, etc). In some embodiments, a substrate is selected from the group consisting of aluminum, PVC, PC, ABS, plastic substrates, and combinations thereof (e.g., aluminum to plastic, PVC to ABS, etc). In some embodiments, a substrate is selected from the group consisting of metal, PVC, and PC substrates. In some embodiments, a substrate is selected from the group consisting of aluminum, PVC, and PC substrates. In some embodiments, a substrate is a metal substrate. In some embodiments, a substrate is an aluminum substrate. In some embodiments, a substrate is a stainless steel substrate. In some embodiments, a substrate is a ceramic substrate. In some embodiments, a substrate is a textile substrate. In some embodiments, a substrate is a woven and/or non-woven fabric substrate. In some embodiments, a substrate is a woven fabric substrate. In some embodiments, a substrate is a non-woven fabric substrate. In some embodiments, a substrate is a foam substrate. In some embodiments, a substrate is a polyester substrate. In some embodiments, a substrate is a polyolefin substrate. In some embodiments, a substrate is a polystyrene substrate. In some embodiments, a substrate is a PVC substrate. In some embodiments, a substrate is a PC substrate. In some embodiments, a substrate is an ABS substrate. In some embodiments, a substrate is an acrylic substrate. In some embodiments, a substrate is a rubber substrate. In some embodiments, a substrate is a plastic substrate. In some embodiments, a substrate is a glass substrate. In some embodiments, a substrate is a wood (e.g., pine, maple, etc) substrate. In some embodiments, a substrate is a pine substrate. In some embodiments, a substrate is a maple substrate. In some embodiments, a substrate is a combination of substrates described above and herein. In some embodiments, a substrate is a combination of metal and plastic substrates. In some embodiments, a substrate is a combination of aluminum and plastic substrates. In some embodiments, a substrate is a combination of stainless steel and plastic substrates. In some embodiments, a substrate is a combination of PVC and ABS substrates.

I. Improved High Temperature Strength

Adhesives provided by the present invention have unique and unexpected properties. In certain embodiments, the present invention encompasses adhesives comprising a polyurethane composition as described herein, and characterized in that the cured adhesives have unexpectedly high strength at elevated temperatures. The high strength at elevated temperature can be demonstrated by measuring the strength of the cured adhesive strength on metal substrate using, e.g., the ASTM D1002 or ISO 4587 lap sheer test at ambient temperature and then performing the same measurement at one or more elevated temperatures.

In some embodiments, a reference polyurethane composition is a corresponding polyurethane composition lacking polyol subcomponent (i). In some embodiments, a reference polyurethane composition is a corresponding polyurethane composition lacking polyol subcomponent (ii). In some embodiments, a reference polyurethane composition is a corresponding polyurethane composition composed solely of a polycarbonate polyol that is structurally different from either polyol subcomponent (i) or polyol subcomponent (ii). In some embodiments, a reference polyurethane composition is a polyurethane composition composed solely of a polyether polyol. In some embodiments, a reference polyurethane composition is a polyurethane composition composed solely of a polyester polyol.

In certain embodiments, adhesives of the present invention (i.e., any of the adhesive compositions described above and herein derived from a compound described above and herein) are characterized in that the strength of the cured bond formed by the adhesive composition between two specimens of the substrate has a greater strength relative to a corresponding adhesive composition derived from a reference polyurethane composition, wherein the strength is measured by an ASTM D1002 or ISO 4587 lap sheer test. In some embodiments, adhesives of the present invention (i.e., any of the adhesive compositions described above and herein derived from a compound described above and herein) are characterized in that the strength of the cured bond formed by the adhesive composition between two specimens of the substrate has a greater strength relative to a corresponding adhesive composition derived from a reference polyurethane composition, wherein the strength is measured by an ASTM D1002 lap sheer test. In some embodiments, adhesives of the present invention (i.e., any of the adhesive compositions described above and herein derived from a compound described above and herein) are characterized in that the strength of the cured bond formed by the adhesive composition between two specimens of the substrate has a greater strength relative to a corresponding adhesive composition derived from a reference polyurethane composition, wherein the strength is measured by an ISO 4587 lap sheer test. In certain embodiments, adhesives of the present invention are characterized in that the strength of the cured adhesive measured is least 5%, is least 10%, at least 20%, at least 30%, at least 40%, at least 50%, at least 60%, at least 70%, at least 80%, at least 90%, at least 100%, at least 150%, at least 200%, at least 250%, at least 300%, at least 350%, at least 400%, at least 450%, or at least 500% greater than the corresponding adhesive composition derived from a reference polyurethane composition. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described above and herein derived from a composition described above and herein) are characterized in that the strength of the cured bond formed by the adhesive composition between two specimens retains at least 50% of its room temperature strength when heated to a temperature of 50° C. In some embodiments the strength is measured using ASTM D1002 or ISO 4587. In some embodiments the strength is measured using ASTM D1002. In some embodiments the strength is measured using ISO 4587. In certain embodiments, adhesives of the present invention are characterized in that the strength of the cured bond formed by the adhesive composition between two specimens measured at 50° C. is least 5%, least 10%, least 20%, least 30%, least 40%, least 50%, least 60%, least 65%, at least 70%, at least 75%, at least 80%, at least 85%, at least 90%, at least 92%, at least 95%, or at least 98%; or between about 5% and about 10%, about 5% and about 25%, about 5% and about 50%, about 5% and about 75%, about 5% and about 100%, about 10% and about 100%, about 25% and about 100%, about 50% and about 100%, about 75% and about 100%, about 20% and about 80%, and about 40% and about 60% of the strength measured using the same procedure at room temperature. In certain embodiments, adhesives of the present invention are characterized in that the strength of the cured bond formed by the adhesive composition between two specimens measured at 70° C. is least 5%, least 10%, least 20%, least 30%, least 40%, least 50%, least 60%, least 65%, at least 70%, at least 75%, at least 80%, at least 85%, at least 90%, at least 92%, at least 95%, or at least 98%; or between about 5% and about 10%, about 5% and about 25%, about 5% and about 50%, about 5% and about 75%, about 5% and about 100%, about 10% and about 100%, about 25% and about 100%, about 50% and about 100%, about 75% and about 100%, about 20% and about 80%, and about 40% and about 60% of the strength measured using the same procedure at room temperature. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described above and herein derived from a composition described above and herein) are characterized in that the strength of the cured bond formed by the adhesive composition between two specimens indicated by Load at Failure measured using ASTM D1002 or ISO 4587 at 50° C. is at least 60% of the Load at Failure measured using the same procedure at 25° C. In some embodiments, adhesives of the present invention (i.e. any of the adhesive compositions described above and herein derived from a composition described above and herein) are characterized in that the strength of the cured bond formed by the adhesive composition between two specimens indicated by Load at Failure measured using ASTM D1002 at 50° C. is at least 60% of the Load at Failure measured using the same procedure at 25° C. In some embodiments, adhesives of the present invention (i.e. any of the adhesive compositions described above and herein derived from a composition described above and herein) are characterized in that the strength of the cured bond formed by the adhesive composition between two specimens indicated by Load at Failure measured using ISO 4587 at 50° C. is at least 60% of the Load at Failure measured using the same procedure at 25° C. In certain embodiments, adhesives of the present invention are characterized in that the Load at Failure of the cured adhesive measured at 50° C. is least 65%, at least 70%, at least 75%, at least 80%, at least 85%, at least 90%, at least 92%, at least 95%, or at least 98% of the Load at Failure measured using the same procedure at 25° C. In certain embodiments, adhesives of the present invention are characterized in that the Load at Failure of the cured adhesive measured at 50° C. is between 50 and 100% of the Load at Failure measured using the same procedure at 25° C. In certain embodiments, adhesives of the present invention are characterized in that the Load at Failure of the cured adhesive measured at 50° C. is between 50% and 80%, between 70% and 80%, between 60% and 80%, between 70% and 100%, or between 80% and 100% of the Load at Failure measured using the same procedure at 25° C.

In certain embodiments, adhesives of the present invention (i.e. any of the adhesive compositions described above and herein derived from a composition described above and herein) are characterized in that the strength of the cured bond formed by the adhesive composition between two specimens indicated by the Tensile Energy to Break measured using ASTM D1002 or ISO 4587 at 50° C. is at least 60% of the Tensile Energy to Break measured using the same procedure at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Tensile Energy to Break measured using ASTM D1002 at 50° C. is at least 60% of the Tensile Energy to Break measured using the same procedure at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Tensile Energy to Break measured using ISO 4587 at 50° C. is at least 60% of the Tensile Energy to Break measured using the same procedure at 25° C. In certain embodiments, adhesives of the present invention are characterized in that the Tensile Energy to Break the cured adhesive measured at 50° C. is least 65%, at least 70%, at least 75%, at least 80%, at least 85%, at least 90%, at least 92%, at least 95%, or at least 98% of the Tensile Energy to Break measured using the same procedure at 25° C. In certain embodiments, adhesives of the present invention are characterized in that the Tensile Energy to Break the cured adhesive measured at 50° C. is between 50 and 100% of the Tensile Energy to Break measured using the same procedure at 25° C. In certain embodiments, adhesives of the present invention are characterized in that the Tensile Energy to Break the cured adhesive measured at 50° C. is between 50% and 80%, between 70% and 80%, between 60% and 80%, between 70% and 100%, or between 80% and 100% of the Tensile Energy to Break measured using the same procedure at 25° C.

In certain embodiments, adhesives of the present invention (i.e. any of the adhesive compositions described above and herein derived from a composition described above and herein) are characterized in that the strength of the cured bond formed by the adhesive composition between two specimens indicated by Stress at Yield or Strain at Yield measured using ASTM D1002 or ISO 4587 at 50° C. is at least 60% of the corresponding parameter measured using the same procedure at 25° C. In some embodiments, adhesives of the present invention (i.e. any of the adhesive compositions described above and herein derived from a composition described above and herein) are characterized in that the strength of the cured bond formed by the adhesive composition between two specimens indicated by Stress at Yield or Strain at Yield measured using ASTM D1002 at 50° C. is at least 60% of the corresponding parameter measured using the same procedure at 25° C. In some embodiments, adhesives of the present invention (i.e. any of the adhesive compositions described above and herein derived from a composition described above and herein) are characterized in that the strength of the cured bond formed by the adhesive composition between two specimens indicated by Stress at Yield or Strain at Yield measured using ISO 4587 at 50° C. is at least 60% of the corresponding parameter measured using the same procedure at 25° C. In certain embodiments, adhesives of the present invention are characterized in that the Stress at Yield or Strain at Yield of the cured adhesive measured at 50° C. is least 65%, at least 70%, at least 75%, at least 80%, at least 85%, at least 90%, at least 92%, at least 95%, or at least 98% of the corresponding parameter measured using the same procedure at 25° C. In certain embodiments, adhesives of the present invention are characterized in that the Stress at Yield or Strain at Yield of the cured adhesive measured at 50° C. is between 50 and 100% of the corresponding parameter measured using the same procedure at 25° C. In certain embodiments, adhesives of the present invention are characterized in that the Stress at Yield or Strain at Yield of the cured adhesive measured at 50° C. is between 50% and 80%, between 70% and 80%, between 60% and 80%, between 70% and 100%, or between 80% and 100% of the corresponding parameter measured using the same procedure at 25° C.

In certain embodiments, adhesives of the present invention (i.e. any of the adhesive compositions described above and herein derived from a composition described above and herein) are characterized in that the strength of the cured adhesive measured using ASTM D1002 or ISO 4587 at 50° C. is greater than the strength at 25° C. In some embodiments, adhesives of the present invention (i.e. any of the adhesive compositions described above and herein derived from a composition described above and herein) are characterized in that the strength of the cured adhesive measured using ASTM D1002 at 50° C. is greater than the strength at 25° C. In some embodiments, adhesives of the present invention (i.e. any of the adhesive compositions described above and herein derived from a composition described above and herein) are characterized in that the strength of the cured adhesive measured using ISO 4587 at 50° C. is greater than the strength at 25° C. In certain embodiments, adhesives of the present invention are characterized in that the strength of the cured adhesive measured using ASTM D1002 or ISO 4587 at 50° C. is at least 10% higher than the strength measured using the same procedure at 25° C. In some embodiments, adhesives of the present invention are characterized in that the strength of the cured adhesive measured using ASTM D1002 at 50° C. is at least 10% higher than the strength measured using the same procedure at 25° C. In some embodiments, adhesives of the present invention are characterized in that the strength of the cured adhesive measured using ISO 4587 at 50° C. is at least 10% higher than the strength measured using the same procedure at 25° C. In certain embodiments, adhesives of the present invention are characterized in that the strength of the cured adhesive at 50° C. is at least 15%, at least 20%, at least 30%, at least 40%, at least 50%, at least 75%, at least 100%, or at least 150% greater than the strength measured using the same procedure at 25° C. In certain embodiments, adhesives of the present invention are characterized in that the strength of the cured adhesive measured at 50° C. is between 100% and 200%, between 100% and 150%, between 120% and 180%, between 120% and 150%, or between 100% and 120% of the strength measured using the same procedure at 25° C. In certain embodiments, the strengths compared above are indicated by a measurement selected from the group consisting of: Load at Failure; Tensile Energy to Break; Stress at Yield; and Strain at Yield. In certain embodiments, the strengths compared above are indicated by a measurement selected from the group consisting of: Load at Failure; Tensile Energy to Break; and Strain at Yield.

In certain embodiments, adhesives of the present invention (i.e. any of the adhesive compositions described above and herein derived from a composition described above and herein) are characterized in that the strength of the cured bond formed by the adhesive composition between two specimens indicated by Load at Failure measured using ASTM D1002 or ISO 4587 at 50° C. is greater than the Load at Failure at 25° C. In some embodiments, adhesives of the present invention (i.e. any of the adhesive compositions described above and herein derived from a composition described above and herein) are characterized in that the strength of the cured bond formed by the adhesive composition between two specimens indicated by Load at Failure measured using ASTM D1002 at 50° C. is greater than the Load at Failure at 25° C. In some embodiments, adhesives of the present invention (i.e. any of the adhesive compositions described above and herein derived from a composition described above and herein) are characterized in that the strength of the cured bond formed by the adhesive composition between two specimens indicated by Load at Failure measured using ISO 4587 at 50° C. is greater than the Load at Failure at 25° C. In certain embodiments, adhesives of the present invention are characterized in that the Load at Failure of the cured adhesive measured using ASTM D1002 or ISO 4587 at 50° C. is at least 10% higher than the Load at Failure measured using the same procedure at 25° C. In some embodiments, adhesives of the present invention are characterized in that the Load at Failure of the cured adhesive measured using ASTM D1002 at 50° C. is at least 10% higher than the Load at Failure measured using the same procedure at 25° C. In some embodiments, adhesives of the present invention are characterized in that the Load at Failure of the cured adhesive measured using ISO 4587 at 50° C. is at least 10% higher than the Load at Failure measured using the same procedure at 25° C. In certain embodiments, adhesives of the present invention are characterized in that the Load at Failure of the cured adhesive at 50° C. is at least 15%, at least 20%, at least 30%, at least 40%, at least 50%, at least 75%, at least 100%, or at least 150% greater than the Load at Failure at 25° C. In certain embodiments, adhesives of the present invention are characterized in that the Load at Failure of the cured adhesive measured at 50° C. is between 100% and 200%, between 100% and 150%, between 120% and 180%, between 120% and 150%, or between 100% and 120% of the Load at Failure measured using the same procedure at 25° C.

In certain embodiments, adhesives of the present invention (i.e. any of the adhesive compositions described above and herein derived from a composition described above and herein) are characterized in that the strength of the cured bond formed by the adhesive composition between two specimens indicated by the Tensile Energy to Break measured using ASTM D1002 or ISO 4587 at 50° C. is greater than the Tensile Energy to Break at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Tensile Energy to Break measured using ASTM D1002 at 50° C. is greater than the Tensile Energy to Break at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Tensile Energy to Break measured using ISO 4587 at 50° C. is greater than the Tensile Energy to Break at 25° C. In certain embodiments, adhesives of the present invention are characterized in that the Tensile Energy to Break the cured adhesive measured using ASTM D1002 or ISO 4587 at 50° C. is at least 10% higher than the Tensile Energy to Break measured using the same procedure at 25° C. In some embodiments, adhesives of the present invention are characterized in that the Tensile Energy to Break the cured adhesive measured using ASTM D1002 at 50° C. is at least 10% higher than the Tensile Energy to Break measured using the same procedure at 25° C. In some embodiments, adhesives of the present invention are characterized in that the Tensile Energy to Break the cured adhesive measured using ISO 4587 at 50° C. is at least 10% higher than the Tensile Energy to Break measured using the same procedure at 25° C. In certain embodiments, adhesives of the present invention are characterized in that the Tensile Energy to Break the cured adhesive at 50° C. is at least 15%, at least 20%, at least 30%, at least 40%, at least 50%, at least 75%, at least 100%, or at least 150% greater than the Tensile Energy to Break the adhesive at 25° C. In certain embodiments, adhesives of the present invention are characterized in that the Tensile Energy to Break the cured adhesive measured at 50° C. is between 100% and 200%, between 100% and 150%, between 120% and 180%, between 120% and 150%, or between 100% and 120% of the Tensile Energy to Break the adhesive at 25° C.

In certain embodiments, adhesives of the present invention (i.e. any of the adhesive compositions described above and herein derived from a composition described above and herein) are characterized in that the strength of the cured bond formed by the adhesive composition between two specimens indicated by the Strain at Yield measured using ASTM D1002 or ISO 4587 at 50° C. is greater than the Strain at Yield at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Strain at Yield measured using ASTM D1002 at 50° C. is greater than the Strain at Yield at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Strain at Yield measured using ISO 4587 at 50° C. is greater than the Strain at Yield at 25° C. In certain embodiments, adhesives of the present invention are characterized in that the Strain at Yield of the cured adhesive measured using ASTM D1002 or ISO 4587 at 50° C. is at least 10% higher than the Strain at Yield measured using the same procedure at 25° C. In some embodiments, adhesives of the present invention are characterized in that the Strain at Yield of the cured adhesive measured using ASTM D1002 at 50° C. is at least 10% higher than the Strain at Yield measured using the same procedure at 25° C. In some embodiments, adhesives of the present invention are characterized in that the Strain at Yield of the cured adhesive measured using ISO 4587 at 50° C. is at least 10% higher than the Strain at Yield measured using the same procedure at 25° C. In certain embodiments, adhesives of the present invention are characterized in that the Strain at Yield of the cured adhesive at 50° C. is at least 15%, at least 20%, at least 30%, at least 40%, at least 50%, at least 75%, at least 100%, or at least 150% greater than the Strain at Yield of the adhesive at 25° C. In certain embodiments, adhesives of the present invention are characterized in that the Strain at Yield of the cured adhesive measured at 50° C. is between 100% and 200%, between 100% and 150%, between 120% and 180%, between 120% and 150%, or between 100% and 120% of the Strain at Yield of the adhesive at 25° C.

In certain embodiments, adhesives of the present invention (i.e. any of the adhesive compositions described above and herein derived from a composition described above and herein) are characterized in that the strength of the cured adhesive measured using ASTM D1002 or ISO 4587 at 70° C. retains at least 40% of the strength measured using the same procedure at 25° C. In some embodiments, adhesives of the present invention (i.e. any of the adhesive compositions described above and herein derived from a composition described above and herein) are characterized in that the strength of the cured adhesive measured using ASTM D1002 at 70° C. retains at least 40% of the strength measured using the same procedure at 25° C. In some embodiments, adhesives of the present invention (i.e. any of the adhesive compositions described above and herein derived from a composition described above and herein) are characterized in that the strength of the cured adhesive measured using ISO 4587 at 70° C. retains at least 40% of the strength measured using the same procedure at 25° C. In certain embodiments, adhesives of the present invention are characterized in that the strength of the cured adhesive measured at 50° C. is least 55%, at least 60%, at least 65%, at least 70%, at least 75%, or at least 80% of the strength measured using the same procedure at 25° C. In certain embodiments, adhesives of the present invention are characterized in that the strength of the cured adhesive measured at 70° C. is between 40% and 100% of the strength measured using the same procedure at 25° C. In certain embodiments, adhesives of the present invention are characterized in that the strength of the cured adhesive measured at 70° C. is between 40% and 80%, between 40% and 60%, between 50% and 80%, between 50% and 70%, or between 70% and 90% of the strength measured using the same procedure at 25° C. In certain embodiments, the strengths compared above are indicated by a measurement selected from the group consisting of: Load at Failure; Tensile Energy to Break; Stress at Yield; and Strain at Yield.

In certain embodiments, adhesives of the present invention (i.e. any of the adhesive compositions described above and herein derived from a composition described above and herein) are characterized in that the strength of the cured bond formed by the adhesive composition between two specimens indicated by the Strain at Yield measured using ASTM D1002 or ISO 4587 at 70° C. is greater than the Strain at Yield at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Strain at Yield measured using ASTM D1002 at 70° C. is greater than the Strain at Yield at 25° C. In some embodiments, adhesives of the present invention (i.e. any of the adhesive compositions described above and herein derived from a composition described above and herein) are characterized in that the strength of the cured bond formed by the adhesive composition between two specimens indicated by the Strain at Yield measured using ISO 4587 at 70° C. is greater than the Strain at Yield at 25° C. In certain embodiments, adhesives of the present invention are characterized in that the Strain at Yield of the cured adhesive measured using ASTM D1002 or ISO 4587 at 70° C. is at least 10% higher than the Strain at Yield measured using the same procedure at 25° C. In some embodiments, adhesives of the present invention are characterized in that the Strain at Yield of the cured adhesive measured using ASTM D1002 at 70° C. is at least 10% higher than the Strain at Yield measured using the same procedure at 25° C. In some embodiments, adhesives of the present invention are characterized in that the Strain at Yield of the cured adhesive measured using ISO 4587 at 70° C. is at least 10% higher than the Strain at Yield measured using the same procedure at 25° C. In certain embodiments, adhesives of the present invention are characterized in that the Strain at Yield of the cured adhesive at 70° C. is at least 15%, at least 20%, at least 30%, at least 40%, at least 50%, at least 75%, at least 100%, or at least 150% greater than the Strain at Yield of the adhesive at 25° C. In certain embodiments, adhesives of the present invention are characterized in that the Strain at Yield of the cured adhesive measured at 70° C. is between 100% and 200%, between 100% and 150%, between 120% and 180%, between 120% and 150%, or between 100% and 120% of the Strain at Yield of the adhesive at 25° C.

J. Improved Resistance to Solvents

In another aspect, the present invention encompasses adhesive compositions (i.e. any of the adhesive compositions described above and herein derived from a composition described above and herein) characterized in that the cured adhesive is highly resistant to solvents. Such solvent resistance properties are unexpected since analogous adhesives formulated with commercially available polycarbonate polyols (e.g. those having more than two carbon atoms enchained between adjacent carbonate linkages) are degraded by solvent to a greater degree than the adhesives of the present invention.

In certain embodiments, adhesive compositions of the present invention (i.e. any of the adhesive compositions described above and herein derived from a composition described above and herein) are further characterized in that they have excellent resistance to hydrocarbon solvents. In certain embodiments, adhesive compositions of the present invention are characterized in that they have superb resistance to aromatic hydrocarbons. In certain embodiments, the present invention comprises epoxide-$CO_2$-based polyols characterized in that they gain less than 5% mass when immersed in aromatic hydrocarbon liquid for 1 week. In certain embodiments, they gain less than 5% mass when immersed in toluene for 1 week. In certain embodiments, they gain less than 1% mass when immersed in xylenes for 1 week.

EXAMPLES

The present invention is illustrated by the following examples. It is to be understood that the particular examples, materials, amounts, and procedures are to be interpreted broadly in accordance with the scope and spirit of the invention as set forth herein.

Example 1: General Methods of Making Polyols and Prepolymers

Preparation of PC Polyol 1 and PC Polyol 2

PC Polyol 1 and PC Polyol 2 were prepared by methods disclosed in, for example, PCT publication WO2010/028362, using a polymerization catalyst. Polymerization catalysts include those disclosed in, for example, R.-R. Ang et al., *Journal of Cleaner Production.* 102 (2015) 1-17; Zhang, et al., *Chem. Rev.* 2018 (118), 839-885; Liu et al., *Current Opinion in Green and Sustainable Chemistry* 2017 (3), 61-66; or Quin, et. al., *Journal of CO2 Utilization* 2015 (11), 3-9; U.S. Pat. Nos. 7,304,172 and 6,870,004; EP Patent No. EP 2258745B1; PCT Publication Nos. WO 2010/022388, WO 2008/136591, WO 2008/150033, WO 2009/137540, WO 2010/013948, WO 2010/147421, WO 2012/037282, WO 2013/022932, WO 2013/012895, WO 2013/

096602, WO 2014/031811, WO 2016/012785, WO 2016/012786, and WO 2010/028362; and in Chinese Patent Publication Nos. CN 2007/10010706 and 2008/10229276. PC Polyol 1 was prepared from a polyol(propylene glycol) initiator and comprises polymer chains of formula:

Example 2: General Methods of Characterizing Polyurethane Samples

An initial screen was performed to identify initial blends for further study. The prepolymers were cast as thin films

Q11

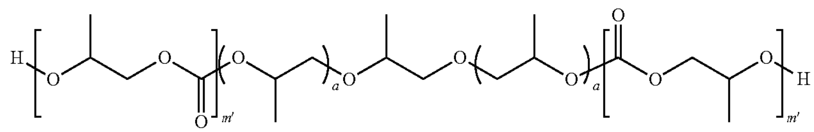

and a minimum of three test bars were prepared for each prepolymer. The test bars were used to measure tensile strength and ultimate elongation on the Instron according to ASTM D412.

where, on average within the composition, the sum of the a moieties within each polymer chain is about 16, and the sum of the m' moieties within each polymer chain is about 10.

PC Polyol 1 has an OH #of about 56, a functionality of 2.0, and a wt % of $CO_2$ of about 20. The number average molecular weight of PC Polyol 1 is about 2,000 g/mol.

PC Polyol 2 was prepared from a dipropylene glycol initiator and comprises polymer chains of formula:

Lap Shear Strength

Sample Preparation: 20 g of 4% NCO-terminated prepolymers were weighed into a 50-mL vial. Next, surfactant BYK-A530 (0.01 wt %) and catalyst 4,4'-(Oxydi-2,1-eth-

Q10

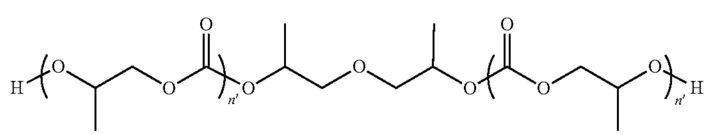

where, on average within the composition, the sum of the n' moieties within each polymer chain is about 9.

PC Polyol 2 has an OH #of about 112, a functionality of 2.0, and a wt % of $CO_2$ of about 40.

Preparation of Isocyanate (NCO)-Terminated Prepolymers

Polyols (see Table 5) were first added to the reactor and maintained at 90° C. under vacuum for an hour to remove dissolved gas and water. Then, MDI was added to the polyol at 70° C. and the reaction was carried out at 90° C. until the target NCO content of 4% was achieved.

TABLE 5

Types of Polyols

| Polyol | Polyol Class | Structural Features | Mn | OH # | Viscosity (cP) |
|---|---|---|---|---|---|
| PC Polyol 1 | Polycarbonate | See above | 2000 | 56 | 1000-1500 at 75° C. |
| PC Polyol 2 | Polycarbonate | See above | 1000 | 110 | 5000-7000 at 75° C. |
| Eternacoll UH 200 (hereafter, "UH 200") | Polycarbonate | Polycarbonate | 2000 | 56 | 2000-2600 at 75° C. |
| Jeffox PPG 2000 (hereafter, "PPG 2000") | Polyether | Polypropylene glycol | 2000 | 54.5-57.5 | 370 at 25° C. |
| PTMEG 2000 | Polyether | Polytetrahydrofuran | 2000 | 56 | 1400 at 40° C. |
| Stepanpol PC-1011-55 (hereafter, "DEG-AA") | Polyester | Diethylene glycol/adipic acid copolymer | 2000 | 52-58 | 800-1350 at 60° C. |

anediyl) bismorpholine (DMDEE, 0.1%) were added to the vial. The mixture was blended at 600 rpm at 90° C. for 2-3 minutes. The mixture was then held under vacuum at 90° C. for 2-4 hours to degas. Samples were used for making joints after complete degassing, which was determined by observing bubbles no longer forming in the mixture.

Figure 1B:
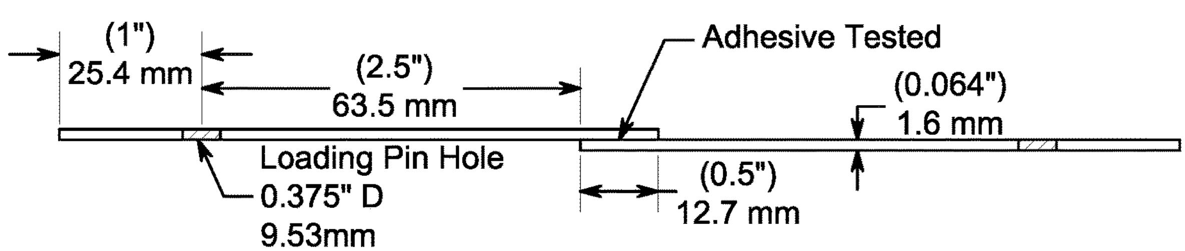
Figure 2:
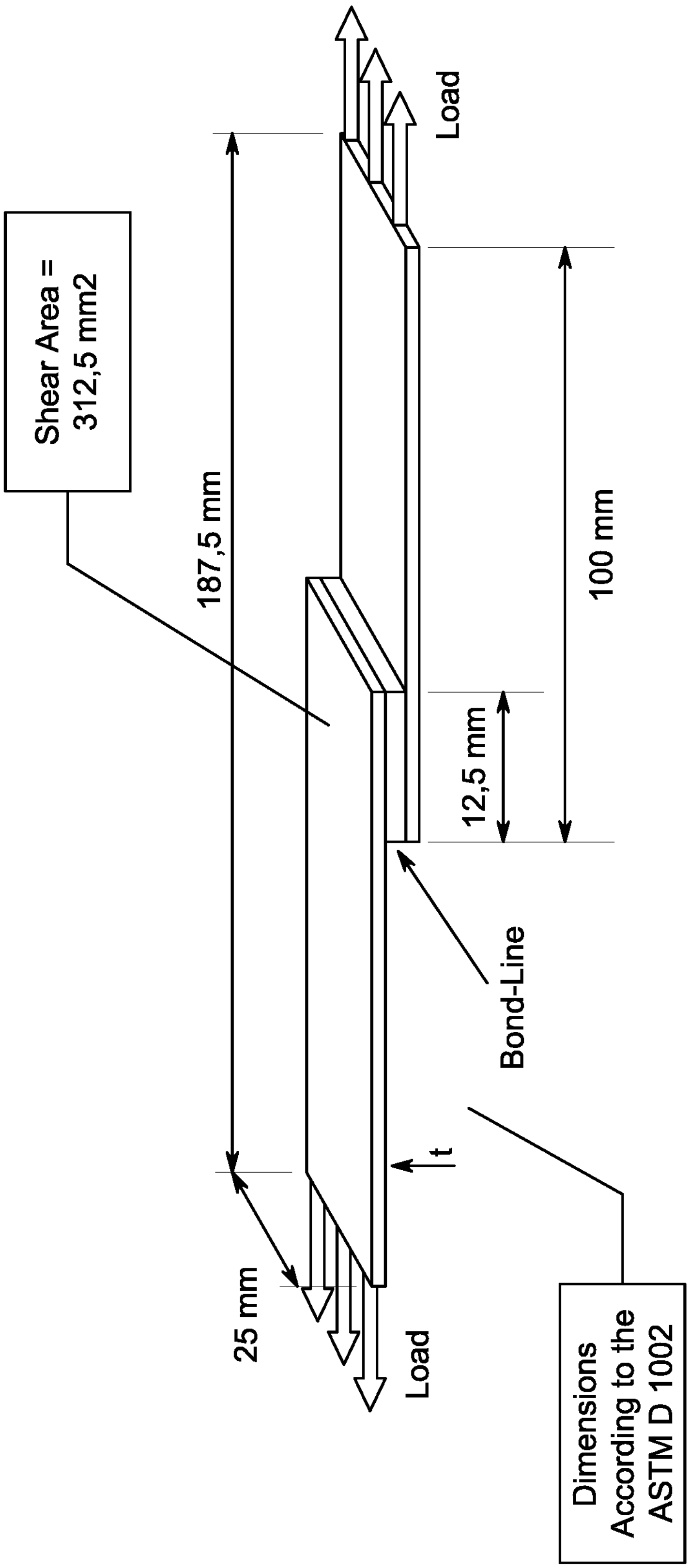
FIG. 2 depicts exemplary dimensions of samples and substrates that may be used in accordance with ASTM D1002.

Substrate Preparation: Aluminum, polyvinyl chloride (PVC), and polycarbonate (PC) were used as substrates. Substrate dimension was (101.6 mm length and 25.4 mm width) as recommended in ASTM D1002. To prepare the substrates, each was wiped with isopropanol and then placed in the oven at 70° C. for 2-3 hours. Lap shear samples were prepared by using a 0.5 mm thick piece of Teflon sheet to ensure uniform adhesive thickness. Overlap length between substrate was kept around 0.5 inch as shown in FIG. 1B. Approximately 0.2 g of prepolymer (molten state 110-115° C.) was applied to a square area of 12.5 mm*25.4 mm of one substrate by spatula and then immediately joined to the other substrate. These single lap joints were kept at 40° C. with relative humidity of 40% for 8-10 days.

Curing Conditions: Samples were cured at 40° C. with 40% humidity for 8-10 days. Completion of curing was confirmed using FTIR by observing the absorbance around 2200 $cm^1$. Uncured samples exhibit a larger absorbance, which reduces in intensity as the curing takes place. The completion of curing can also be visually observed by carefully checking the dryness or tackiness on the broken samples. If the sample is wet or tacky after breaking the joint on Instron, it is not completely cured. A completely cured sample should be dry and show no tackiness after joint break.

ASTM Method: ASTM D1002 was used for lap shear strength measurement. Lap shear joint strength was measured using a crosshead speed of 1.3 mm/min. Shear stress (lap shear strength) present in the adhesive layer was measured by the dividing the load at failure by the shear area. It will be appreciated that actual shear area dimensions can vary, and may be normalized in accordance with ASTM D1002.

Shear Stress=Load/Shear Area

Shear Area=Overlap Length*Substrate Width

Figure 3:
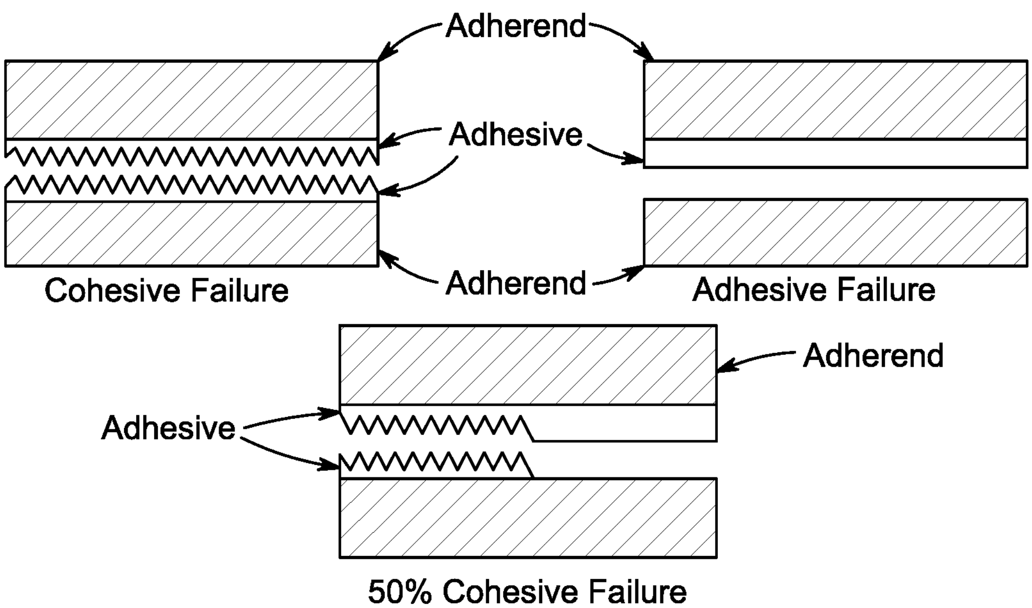
FIG. 3 depicts different failure modes described in Example 2.

Failure Mode: As is understood, when measuring lap shear strength, there are different types of failure modes, e.g., cohesive failure, adhesive failure, and substrate failure. FIG. 3 illustrates the differences between each failure mode.

Cohesive Failure (CF): Cohesive Failure is characterized by failure of the adhesive sample itself and is associated with a breakdown of intermolecular bonding forces within the adhesive sample. Cohesive failure is observed where the interfacial strength (i.e., bond between the adhesive sample and the substrate) is materially greater than the cohesive strength of the adhesive sample.

Adhesive Failure (AF): Adhesive Failure is characterized by failure of the joint at the adhesive-substrate interface and is observed when the cohesive strength of the adhesive sample is materially greater than the interfacial strength (i.e., bond between the adhesive sample and substrate).

Substrate Failure (SF): Substrate Failure is characterized by failure of the adherent (e.g., substrate) instead of the adhesive sample and is associated with a breakdown of bonding forces within the substrate. Substrate Failure is observed when the interfacial strength (i.e., bond between the adhesive sample and substrate) is materially greater than the strength of the substrate itself.

As is understood, mixed failure modes, e.g., samples that exhibit some cohesion failure and some adhesion failure, can be observed. Additionally or alternatively, a mixed failure mode is a result of partial failure of the joint at the adhesive-substrate interface.

Alternative method(s) of measuring lap shear strength: Additionally or alternatively, lap shear strength is measured by other methods known in the field. For example, in some aspects, lap shear strength is measured according to ISO 4587.

Example 3: Preparation and Initial Characterization of PUs 1-8

Initial studies were performed to assess strength of polyurethane adhesives derived from blends of certain polycarbonate polyols and compared to polyurethane adhesives derived form conventional polyols. PUs 1-8 were prepared according to Example 1, as disclosed in Table 6, and characterized according to Example 2, as disclosed in Table 7. PUs 1-8 were also compared to a conventional hotmelt polyurethane based adhesive, Henkel's Technomelt PUR 3631, as disclosed in Table 7 as PU-A. In this initial study, lap shear strength was measured on three substrates: aluminum, PVC and PC, as indicated in Table 7.

Example 3 demonstrates that the addition of PC Polyol 2, even as low as 10%, to PC Polyol 1 significantly improves lap shear strength on aluminum and PVC substrates. The lap shear strength of the samples for polycarbonate are comparable and often result in substrate failure. Without wishing to be bound be a particular theory, it is hypothesized that an increase in wettability or surface interaction between the adhesive and substrate leads to the improved lap shear strength when using blends of PC Polyol 1 and PC Polyol 2, which is supported by the observed change in failure mode from adhesive failure to cohesive failure.

Example 3 also demonstrates that PUs 1-4, derived from PC Polyol 1 or a blend of PC Polyol 1 and 2, displayed high lap shear strengths when compared to convention polyols used in PUs 5-8 or a traditional hot melt polyurethane adhesive (PU-A), which was observed across multiple substrates.

TABLE 6

Formulations and Properties of PUs 1-8.

| Reagent (wt %)[a] | PU1 | PU2 | PU3 | PU4 | PU5 | PU6 | PU7 | PU8 |
|---|---|---|---|---|---|---|---|---|
| PC Polyol 1 | 100 | 90 | 75 | 50 | 0 | 0 | 0 | 0 |
| PC Polyol 2 | 0 | 10 | 25 | 50 | 0 | 0 | 0 | 0 |
| PPG 2000 | 0 | 0 | 0 | 0 | 0 | 100 | 0 | 0 |
| PTMEG 2000 | 0 | 0 | 0 | 0 | 0 | 0 | 100 | 0 |
| UH 200 | 0 | 0 | 0 | 0 | 0 | 0 | 0 | 100 |
| DEG-AA | 0 | 0 | 0 | 0 | 100 | 0 | 0 | 0 |
| NCO (%) | 4.29 | 4.23 | 4.16 | 3.54 | 3.88 | 3.95 | 3.5 | 3.5 |
| Viscosity (cps/75° C.)[b] | 8500 | 17400 | 42350 | 212000 | 6300 | N/A | N/A | N/A |

[a]All weight percents represent the weight percent of total polyols exclusive of other co-reactives and additives.
[b]Viscosity values were obtained from the corresponding polyurethane prepolymers.

TABLE 7

Mechanical Properties of PUs 1-8.

| PU Sample | Lap Shear Strength (psi) | Substrate | Failure Mode |
|---|---|---|---|
| PU1 | 414 | PVC | Adhesive |
| PU2 | 691 | PVC | Adhesive |
| PU3 | 1196 | PVC | Substrate |
| PU4 | 756 | PVC | Substrate |
| PU5 | 560 | PVC | Adhesive |
| PU6 | 318 | PVC | Adhesive |
| PU7 | 647 | PVC | Adhesive |
| PU8 | 682 | PVC | Adhesive |
| PU-A | 475 | PVC | N/A |
| PU1 | 370 | Aluminum | Adhesive |
| PU2 | 756 | Aluminum | Adhesive |
| PU3 | 1139 | Aluminum | Cohesive |
| PU4 | 1194 | Aluminum | Cohesive |
| PU5 | 396 | Aluminum | Adhesive |
| PU6 | 307 | Aluminum | Adhesive |
| PU7 | 592 | Aluminum | Adhesive |
| PU8 | 383 | Aluminum | Adhesive |
| PU-A | 260 | Aluminum | N/A |
| PU1 | 1731 | Polycarbonate | Cohesive |
| PU2 | 1449 | Polycarbonate | Substrate |
| PU3 | 1772 | Polycarbonate | Substrate |
| PU4 | 1459 | Polycarbonate | Substrate |
| PU5 | 1833 | Polycarbonate | Substrate |
| PU6 | 840 | Polycarbonate | Cohesive |
| PU7 | 2005 | Polycarbonate | Substrate |
| PU8 | 1814 | Polycarbonate | Substrate |
| PU-A | 965 | Polycarbonate | N/A |

Example 4: Preparation and Initial Characterization of PUs 1-4 and 9-11

Based on the preliminary studies shown in Example 4, further studies were performed to assess the optimal blends of PC Polyol 1 and PC Polyol 2. PUs 9-11 were prepared according to Example 1, as disclosed in Table 8 and characterized according to Example 2 using aluminum as a substrate, as also disclosed in FIG. 4. The lap shear strengths measured for PC Polyol 2 are an extrapolation from blends PC Polyol 1 and PC Polyol 2, since it is not possible to measure the mechanical properties of a polyurethane adhesive derived solely from PC Polyol 2 given its brittleness.

When developing polyurethane adhesives derived from blends of polyols, it is generally expected that the adhesive comprised of a blend will consist of a weighted average of the properties of adhesives derived from a single polyol (e.g., adhesives derived solely from PC Polyol 1 (PU1) or PC Polyol 2 (PU11)).

Figure 4:
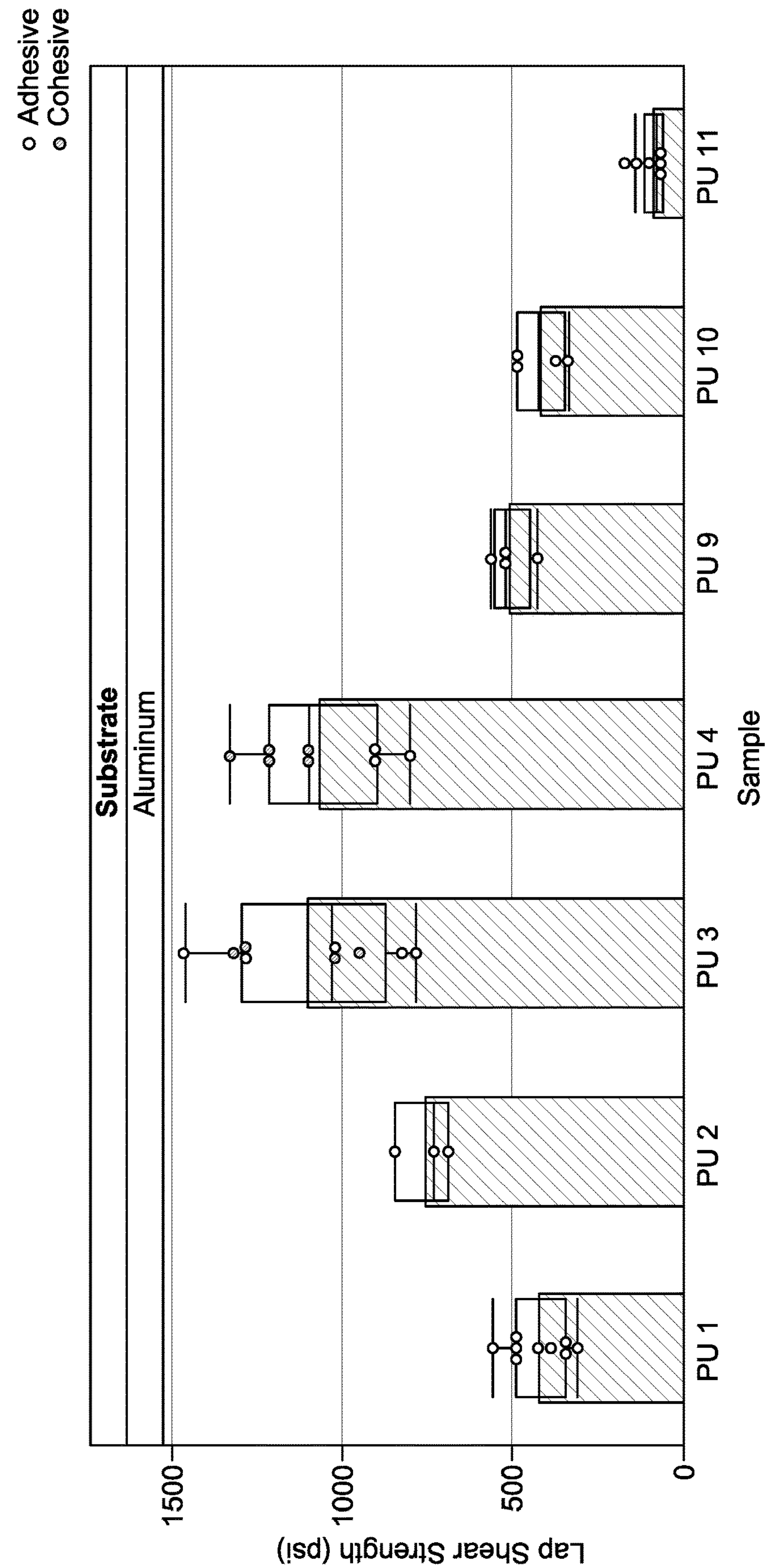
FIG. 4 depicts the lap shear strengths of blends of different ratios of PC Polyol 1 and PC Polyol 2 described in Example 4.

Here, it was observed that in some instances, the polyurethane adhesive derived from a blend displayed strengths that are unexpectedly improved as compared to the adhesives composed solely of PC Polyol 1 or PC Polyol 2, as shown in FIG. 4. PU3 and PU4 experienced both adhesive and cohesive failure, whereas only adhesive failure was observed in PU1, PU2, PU9, PU10, and PU11.

TABLE 8

Formulations of PUs 1-4 and 9-11.

| Reagent (wt %)[a] | PU1 | PU2 | PU3 | PU4 | PU9 | PU10 | PU11 |
|---|---|---|---|---|---|---|---|
| PC Polyol 1 | 100 | 90 | 75 | 50 | 40 | 30 | 0 |
| PC Polyol 2 | 0 | 10 | 25 | 50 | 60 | 70 | 100 |

[a]All weight percents represent the weight percent of total polyols exclusive of other co-reactives and additives.

EXEMPLARY ENUMERATED EMBODIMENTS

The following numbered embodiments, while non-limiting, are exemplary of certain aspects of the present disclosure:

1. A composition comprising:

polyol subcomponent (i), which comprises one or more aliphatic polycarbonate polyols having formula PS1:

PS1

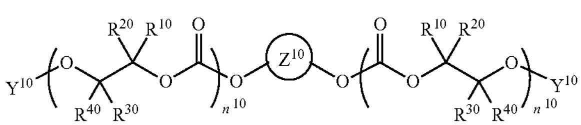

wherein, $R^{10}$, $R^{20}$, $R^{30}$, and $R^{40}$ are, at each occurrence in the polymer chain, independently selected from the group consisting of —H, fluorine, an optionally substituted $C_{1-30}$ aliphatic group, an optionally substituted $C_{1-40}$ heteroaliphatic group, and an optionally substituted aryl group, where any two or more of $R^{10}$, $R^{20}$, $R^{30}$, and $R^{40}$ may optionally be taken together with intervening atoms to form one or more optionally substituted rings optionally containing one or more heteroatoms;

$Y^{10}$ is, at each occurrence, independently —H, a reactive group, or a site of attachment to chain-extending moieties or isocyanates;

$n^{10}$ is at each occurrence, independently an integer from about 2 to about 50; and

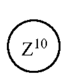

is selected from the group consisting of an optionally substituted bivalent $C_{1-6}$ hydrocarbon chain and

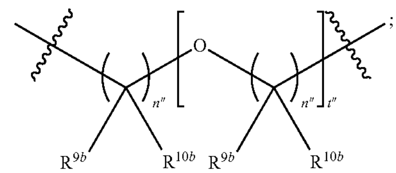

$R^{9b}$ and $R^{10b}$ are, at each occurrence in the polymer chain, independently selected from the group consisting of hydrogen and optionally substituted $C_{1-6}$ aliphatic;

each n" is, at each occurrence within a polymer chain, independently an integer from 1 to 4; and each t" is, at each occurrence within a polymer chain, independently an integer from 1 to 3;

and polyol subcomponent (ii), which comprises one or more aliphatic polycarbonate polyols having formula PS2:

PS2

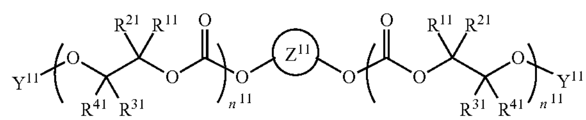

wherein, $R^{11}$, $R^{21}$, $R^{31}$, and $R^{41}$ are, at each occurrence in the polymer chain, independently selected from the group consisting of —H, fluorine, an optionally substituted $C_{1-30}$ aliphatic group, an optionally substituted $C_{1-40}$ heteroaliphatic group, and an optionally substituted aryl group, where any two or more of $R^{11}$, $R^{21}$, $R^{31}$, and $R^{41}$ may optionally be taken together with intervening atoms to form one or more optionally substituted rings optionally containing one or more heteroatoms;

$Y^{11}$ is, at each occurrence, independently —H, a reactive group, or a site of attachment to chain-extending moieties or isocyanates;

$n^{11}$ is, at each occurrence, independently an integer from about 2 to about 50; and

is a polyether.

2. The composition according to embodiment 1, wherein R10, R20, R30, R40, R11, R21, R31, and R41 are, independently at each occurrence in the polymer chain, selected from the group consisting of hydrogen and optionally substituted C1-6 aliphatic.

3. The composition according to embodiment 1 or 2, wherein $R^{10}$, $R^{20}$, $R^{30}$, $R^{40}$, $R^{11}$, $R^{21}$, $R^{31}$, and $R^{41}$ are, independently at each occurrence in the polymer chain, selected from the group consisting of hydrogen and methyl.

4. The composition according to any one of embodiments 1-3, wherein

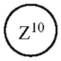

is derived from a dihydric alcohol selected from the group consisting of 1,2-ethanediol, 1,2-propanediol, 1,3-propanediol, 1,2-butanediol, 1,3-butanediol, 1,4-butanediol, 1,5-pentanediol, 2,2-dimethylpropane-1,3-diol, 2-butyl-2-ethylpropane-1,3-diol, 2-methyl-2,4-pentane diol, 2-ethyl-1,3-hexane diol, 2-methyl-1,3-propane diol, 1,5-hexanediol, and 1,6-hexanediol.

5. The composition according to any one of embodiments 1-3, wherein

is derived from a dihydric alcohol selected from the group consisting of diethylene glycol, triethylene glycol, tetraethylene glycol, dipropylene glycol, and tripropylene glycol.

6. The composition according to embodiment 5, wherein

is derived from dipropylene glycol.

7. The composition according to any one of embodiments 1-6, wherein

is derived from poly(propylene glycol) having a $M_n$ between about 234 and about 2000 g/mol.

10. The composition according to any one of embodiments 1-3 and 5-9, wherein one or more aliphatic polycarbonate polyols of formula PS1 are of formula Q10:

Q10

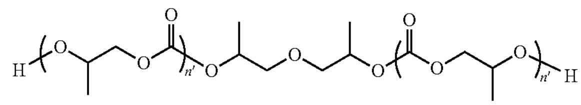

wherein, each n' is, at each occurrence, independently an integer from about 2 to about 50.

11. The composition according to embodiment 10, wherein each n' is, at each occurrence, independently an integer from about 2 to about 10.

12. The composition according to embodiment 10 or 11, wherein each n' is, at each occurrence, independently an integer from about 4 to about 5.

13. The composition according to embodiment 10, wherein the sum of the n' moieties within each polymer chain is between about 6 to about 12.

14. The composition according to embodiment 10 or 13, wherein the sum of the n' moieties within each polymer chain is about 9.

15. The composition according to any one of embodiments 1-14, wherein one or more aliphatic polycarbonate polyols of formula PS2 are of formula Q11:

Q11

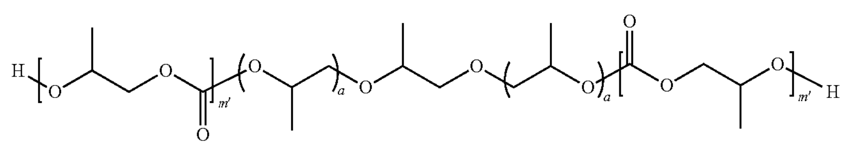

8. The composition according to embodiment 7, wherein

is derived from poly(propylene glycol) having a $M_n$ between about 900 g/mol and 1,100 g/mol.

9. The composition according to embodiment 8, wherein

is derived from poly(propylene glycol) having a $M_n$ of about 1000 g/mol.

wherein, each a is, at each occurrence, independently an integer from about 2 to about 50; and each m' is, at each occurrence, independently an integer from about 2 to about 50.

16. The composition according to embodiment 15, wherein each a is, at each occurrence, independently an integer from about 5 to about 12.

17. The composition according to embodiment 15 or 16, wherein each a is, at each occurrence, independently about 8.

18. The composition according to embodiment 15, wherein the sum of the a moieties within each polymer chain is between about 12 and about 20.

19. The composition according to embodiment 15 or 18, wherein the sum of the a moieties within each polymer chain is about 16.

20. The composition according to any one of embodiments 15-19, wherein each m' is, at each occurrence, independently an integer from about 3 to about 7.

21. The composition according to embodiment any one of embodiments 15-20, wherein each m' is, at each occurrence, independently about 5.

22. The composition according to any one of embodiments 15-19, wherein the sum of the m' moieties within each polymer chain is between about 5 and about 15.

23. The composition according to any one of embodiments 15-19 or 22, wherein the sum of the m' moieties within each polymer chain is about 10.

24. The composition according to any one of embodiments 1-23, wherein polyol subcomponent (i) has a Mn between about 500 g/mol and about 1,500 g/mol.

25. The composition according to any one of embodiments 1-24, wherein polyol subcomponent (i) has a Mn of about 1,000 g/mol.

26. The composition according to any one of embodiments 1-25, wherein polyol subcomponent (ii) has a Mn between about 500 g/mol and about 2,500 g/mol.

27. The composition according to any one of embodiments 1-26, wherein polyol subcomponent (ii) has a Mn of about 2,000 g/mol.

28. The composition according to any one of embodiments 1-27, wherein polyol subcomponent (i) is characterized in that, on average in the polyol subcomponent (i) composition, the percentage of carbonate linkages is 85% or greater.

29. The composition according to any one of embodiments 1-28, wherein polyol subcomponent (i) is characterized in that, on average in the polyol subcomponent (i) composition, the percentage of carbonate linkages is 99% or greater.

30. The composition according to any one of embodiments 1-29, wherein polyol subcomponent (ii) is characterized in that, on average in the polyol subcomponent (ii) composition, the percentage of carbonate linkages is 85% or greater.

31. The composition according to any one of embodiments 1-30, wherein polyol subcomponent (ii) is characterized in that, on average in the polyol subcomponent (ii) composition, the percentage of carbonate linkages is 99% or greater.

32. The composition according to any one of embodiments 1-31, wherein the composition comprises about 0.1-60 weight percent of polyol subcomponent (i) and about 40-99.9 weight percent of polyol subcomponent (ii).

33. The composition according to any one of embodiments 1-32, wherein the composition comprises about 10-50 weight percent of polyol subcomponent (i) and about 50-90 weight percent of polyol subcomponent (ii).

34. The composition according to any one of embodiments 1-33, wherein the composition comprises about 25-50 weight percent of polyol subcomponent (i) and about 50-75 weight percent of polyol subcomponent (ii).

35. The composition according to any one of embodiments 1-32, wherein the composition comprises about 5-15 weight percent of polyol subcomponent (i) and about 85-95 weight percent of polyol subcomponent (ii).

36. The composition according to any one of embodiments 1-32 or 35, wherein the composition comprises about 10 weight percent of polyol subcomponent (i) and about 90 weight percent of polyol subcomponent (ii).

37. The composition according to any one of embodiments 1-33, wherein the composition comprises about 20-30 weight percent of polyol subcomponent (i) and about 70-80 weight percent of polyol subcomponent (ii).

38. The composition according to any one of embodiments 1-34 or 37, wherein the composition comprises about 25 weight percent of polyol subcomponent (i) and about 75 weight percent of polyol subcomponent (ii).

39. The composition according to any one of embodiments 1-32, wherein the composition comprises about 45-55 weight percent of polyol subcomponent (i) and about 45-55 weight percent of polyol subcomponent (ii).

40. The composition according to any one of embodiments 1-34 or 39, wherein the composition comprises about 50 weight percent of polyol subcomponent (i) and about 50 weight percent of polyol subcomponent (ii).

41. An isocyanate-terminated prepolymer derived from a composition according to any one of embodiments 1-40.

42. A polyurethane composition comprising the reaction product of i) a composition according to any one of embodiments 1-40 and an isocyanate, or ii) an isocyanate-terminated prepolymer of embodiment 41.

43. The polyurethane composition according to embodiment 42, wherein the polyurethane composition is a one-component polyurethane composition.

44. The polyurethane composition according to embodiment 42, wherein the polyurethane composition is a two-component polyurethane composition.

45. The polyurethane composition according to any one of embodiments 42-44, wherein the polyurethane composition is a hot-melt polyurethane composition.

46. The polyurethane composition according to embodiment 42, wherein the polyurethane composition is a waterborne polyurethane dispersion (PUD) composition.

47. The polyurethane composition according to embodiment 42, wherein the polyurethane composition is a solvent-borne polyurethane composition.

48. The polyurethane compositions according to any one of embodiments 42-47, wherein the polyurethane composition is a coating or adhesive composition.

49. The polyurethane composition according to any one of embodiments 42-48, wherein the polyurethane composition is characterized in that a performance property is improved compared to a reference polyurethane composition.

50. The polyurethane composition according to embodiment 49, wherein the improved performance property is strength, stability, or both.

51. The polyurethane composition according to embodiment 50, wherein the improved performance property is lap shear strength, tensile strength, hydrolytic stability, thermal stability, or combinations thereof.

52. The polyurethane composition according to any one of embodiments 49-51, wherein the improved performance property is lap shear strength measured according to ASTM D1002 or ISO 4587 or tensile strength measure according to ASTM D412.

53. The polyurethane composition according to any one of embodiments 49-52, wherein the reference polyurethane composition is a corresponding polyurethane composition lacking polyol subcomponent (i), a corresponding polyurethane composition lacking polyol subcomponent (ii), a polyurethane composition composed solely of a polycarbonate polyol that is different from either polyol subcomponent (i) or polyol subcomponent (ii), a polyurethane composition composed solely of a polyether polyol, or a polyurethane composition composed solely of a polyester polyol.

54. The polyurethane composition according to any one of embodiments 49-53, wherein the polyurethane composition is characterized in that the lap shear strength measured according to ASTM D1002 or ISO 4587 is at least 10, 20, 30, 40, 50, 60, 70, 80, 90, 100, 125, 150, 200, 250, 300, 350, 400, 450, or 500% greater as compared to the reference polyurethane composition.

55. The polyurethane composition according to any one of embodiments 49-54, wherein the polyurethane composition is characterized in that the tensile strength measure according to ASTM D412 is at least 10, 20, 30, 40, 50, 60, 70, 80, 90, 100, 125, 150, 200, 250, or 300% greater as compared to the reference polyurethane composition.

56. The polyurethane composition according to any one of embodiments 49-55, wherein the polyurethane composition is characterized in that it is about the same density compared to the reference polyurethane composition.

57. The polyurethane composition according to any one of embodiments 49-56, wherein the polyurethane composition is characterized in that the lap shear strength is measured on a substrate selected from the group consisting of a metal, ceramic, textile, woven and/or non-woven fabric, foam, polyester, polyolefin, polystyrene, polyvinyl chloride (PVC), polycarbonate (PC), acrylonitrile butadiene styrene (ABS), acrylic, rubber, plastic, glass, wood, and combinations thereof.

58. The polyurethane composition according to any one of embodiments 49-57, wherein the polyurethane composition is characterized in that the lap shear strength is measured on a substrate selected from the group consisting of aluminum, stainless steel, pine, maple, metal to plastic, and PVC to ABS.

59. A method for producing a polyurethane composition, the method comprising the steps of:

(a) providing a composition according to any one of embodiments 1-40;

(b) providing a composition comprising one or more isocyanate reagents; and (c) mixing the compositions in (a) and (b) and allowing the mixture to cure into the polyurethane composition.

60. A method for producing a polyurethane composition, the method comprising the steps of:

(a) providing a composition comprising isocyanate-terminated prepolymers according to embodiment 41; and (b) allowing the composition in (a) to cure into the polyurethane composition.

61. A method for producing a polyurethane composition, the method comprising the steps of:

(a) providing a composition comprising one or more isocyanate reagents;

(b) providing a composition comprising a first polycarbonate polyol;

(c) mixing the compositions in (a) and (b) and allowing the mixture to cure;

(d) providing a composition comprising a second polycarbonate polyol that is structurally different from the first polycarbonate polyol; and (e) mixing the compositions in (c) and (d) and allowing the mixture to cure.

62. The method of embodiment 61, wherein the first polycarbonate polyol in step (b) is polyol subcomponent (i) having formula PS1, P2b, or Q10.

63. The method of embodiment 61 or 62, wherein the second polycarbonate polyol in step (d) is polyol subcomponent (ii) having formula PS2, Q7, or Q11.

64. The method of embodiment 61, wherein the first polycarbonate polyol in step (b) is polyol subcomponent (ii) having formula PS2, Q7, or Q11.

65. The method of embodiment 61 or 62, wherein the second polycarbonate polyol in step (d) is polyol subcomponent (i) having formula PS1, P2b, or Q10.

EQUIVALENTS

All material cited in this application, including, but not limited to, patents and patent applications, regardless of the format of such literature and similar materials, are expressly incorporated herein by reference in their entirety. In the event that one or more of the incorporated literature and similar materials differs from or contradicts this application, including but not limited to defined terms, term usage, described techniques, or the like, this application controls.

What is claimed is:

1. A composition comprising:

polyol subcomponent (i), which comprises one or more aliphatic polycarbonate polyols having formula PS1:

PS1

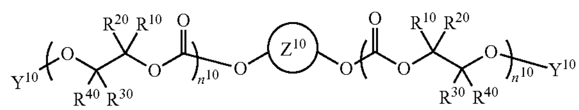

wherein, $R^{10}$, $R^{20}$, $R^{30}$, and $R^{40}$ are, at each occurrence in the polymer chain, independently selected from the group consisting of —H, fluorine, an optionally substituted $C_{1-30}$ aliphatic group, an optionally substituted $C_{1-40}$ heteroaliphatic group, and an optionally substituted aryl group, where any two or more of $R^{10}$, $R^{20}$, $R^{30}$, and $R^{40}$ may optionally be taken together with intervening atoms to form one or more optionally substituted rings optionally containing one or more heteroatoms;

$Y^{10}$ is, at each occurrence, independently —H, a reactive group, or a site of attachment to chain-extending moieties or isocyanates;

$n^{10}$ is at each occurrence, independently an integer from about 2 to about 50; and

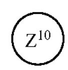

is selected from the group consisting of an optionally substituted bivalent $C_{1-6}$ hydrocarbon chain and;

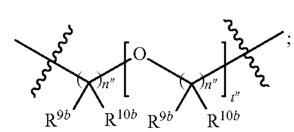

;

$R^{9b}$ and $R^{10b}$ are, at each occurrence in the polymer chain, independently selected from the group consisting of hydrogen and optionally substituted $C_{1-6}$ aliphatic;

each n" is, at each occurrence within a polymer chain, independently an integer from 1 to 4; and each t" is, at each occurrence within a polymer chain, independently an integer from 1 to 3;

and polyol subcomponent (ii), which comprises one or more aliphatic polycarbonate polyols having formula PS2:

PS2

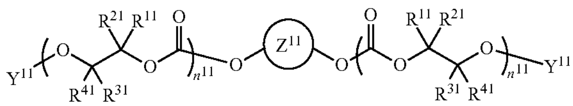

wherein, $R^{11}$, $R^{21}$, $R^{31}$, and $R^{41}$ are, at each occurrence in the polymer chain, independently selected from the group consisting of —H, fluorine, an optionally substituted $C_{1-30}$ aliphatic group, an optionally substituted $C_{1-40}$ heteroaliphatic group, and an optionally substituted aryl group, where any two or more of $R^{11}$, $R^{21}$, $R^{31}$, and $R^{41}$ may optionally be taken together with intervening atoms to form one or more optionally substituted rings optionally containing one or more heteroatoms;

$Y^{11}$ is, at each occurrence, independently —H, a reactive group, or a site of attachment to chain-extending moieties or isocyanates;

$n^{11}$ is, at each occurrence, independently an integer from about 2 to about 50; and

is a polyether.

2. The composition according to claim 1, wherein $R^{10}$, $R^{20}$, $R^{30}$, $R^{40}$, $R^{11}$, $R^{21}$, $R^{31}$, and $R^{41}$ are, independently at each occurrence in the polymer chain, selected from the group consisting of hydrogen and methyl.

3. The composition according to claim 1, wherein

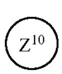

is derived from a dihydric alcohol selected from the group consisting of diethylene glycol, triethylene glycol, tetraethylene glycol, dipropylene glycol, and tripropylene glycol.

4. The composition according to claim 1, wherein

is derived from poly (propylene glycol) having a $M_n$ between about 900 g/mol and 1,100 g/mol.

5. The composition according to claim 1, wherein one or more aliphatic polycarbonate polyols of formula PS1 are of formula Q10:

Q10

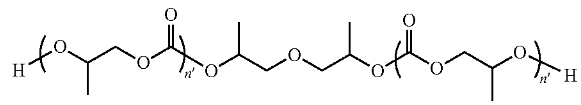

wherein, each n' is, at each occurrence, independently an integer from about 2 to about 50.

6. The composition according to claim 5, wherein:

each n' is, at each occurrence, independently an integer from about 4 to about 5; or the sum of the n' moieties within each polymer chain is about 9.

7. The composition according to claim 1, wherein one or more aliphatic polycarbonate polyols of formula PS2 are of formula Q11:

Q11

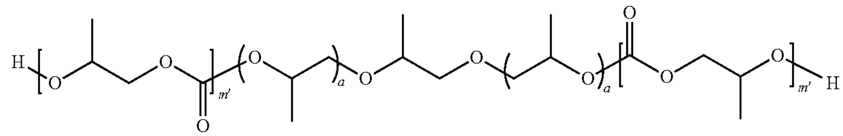

wherein, each a is, at each occurrence, independently an integer from about 2 to about 50; and each m' is, at each occurrence, independently an integer from about 2 to about 50.

8. The composition according to claim 7, wherein:

each a is, at each occurrence, independently about 8; or the sum of the a moieties within each polymer chain is about 16.

9. The composition according to claim 1, wherein:

each m' is, at each occurrence, independently about 5, or the sum of the m' moieties within each polymer chain is about 10.

10. The composition according to claim 1, wherein polyol subcomponent (i) has a $M_n$ between about 500 g/mol and about 1,500 g/mol.

11. The composition according to claim 1, wherein polyol subcomponent (ii) has a $M_n$ between about 500 g/mol and about 2,500 g/mol.

12. The composition according to claim 1, wherein polyol subcomponent 1 is characterized in that, on average in the polyol subcomponent (i) composition, the percentage of carbonate linkages is 99% or greater.

13. The composition according to claim 1, wherein polyol subcomponent (ii) is characterized in that, on average in the polyol subcomponent (ii) composition, the percentage of carbonate linkages is 99% or greater.

14. The composition according to claim 1, wherein:

the composition comprises about 0.1-60 weight percent of polyol subcomponent (i) and about 40-99.9 weight percent of polyol subcomponent (ii);

the composition comprises about 10-50 weight percent of polyol subcomponent (i) and about 50-90 weight percent of polyol subcomponent (ii);

the composition comprises about 25-50 weight percent of polyol subcomponent (i) and about 50-75 weight percent of polyol subcomponent (ii);

the composition comprises about 5-15 weight percent of polyol subcomponent (i) and about 85-95 weight percent of polyol subcomponent (ii);

the composition comprises about 10 weight percent of polyol subcomponent (i) and about 90 weight percent of polyol subcomponent (ii);

the composition comprises about 20-30 weight percent of polyol subcomponent (i) and about 70-80 weight percent of polyol subcomponent (ii);

the composition comprises about 25 weight percent of polyol subcomponent (i) and about 75 weight percent of polyol subcomponent (ii);

the composition comprises about 45-55 weight percent of polyol subcomponent (i) and about 45-55 weight percent of polyol subcomponent (ii); or the composition comprises about 50 weight percent of polyol subcomponent (i) and about 50 weight percent of polyol subcomponent (ii).

15. An isocyanate-terminated prepolymer derived from a composition according to claim 1.

16. A polyurethane composition comprising the reaction product of i) a composition according to claim 1 and an isocyanate, or ii) an isocyanate-terminated prepolymer of claim 15.

17. The polyurethane composition according to claim 16, wherein:

the polyurethane composition is a one-component polyurethane composition, a two-component polyurethane composition, a hot-melt polyurethane composition, a waterborne polyurethane dispersion (PUD) composition, or a solvent-borne polyurethane composition, or the polyurethane composition is a coating or adhesive composition.

18. A method for producing a polyurethane composition, the method comprising the steps of:

(a) providing a composition according to claim 1;

(b) providing a composition comprising one or more isocyanate reagents; and (c) mixing the compositions in (a) and (b) and allowing the mixture to cure into the polyurethane composition.

19. A method for producing a polyurethane composition, the method comprising the steps of:

(a) providing a composition comprising isocyanate-terminated prepolymers according to claim 15; and (b) allowing the composition in (a) to cure into the polyurethane composition.

20. A method for producing a polyurethane composition, the method comprising the steps of:

(a) providing a composition comprising one or more isocyanate reagents;

(b) providing a composition comprising a first polycarbonate polyol;

(c) mixing the compositions in (a) and (b) and allowing the mixture to cure;

(d) providing a composition comprising a second polycarbonate polyol that is structurally different from the first polycarbonate polyol; and (e) mixing the compositions in (c) and (d) and allowing the mixture to cure.

* * * * *